(12) United States Patent
Kim et al.

(10) Patent No.: US 9,906,641 B2
(45) Date of Patent: *Feb. 27, 2018

(54) SYSTEM AND METHOD OF PROVIDING VOICE-MESSAGE CALL SERVICE

(71) Applicant: SAMSUNG ELECTRONICS CO., LTD., Suwon-si (KR)

(72) Inventors: Hong-chul Kim, Seoul (KR); Seon-ae Kim, Suwon-si (KR); Hyun-jae Shin, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/721,352

(22) Filed: May 26, 2015

(65) Prior Publication Data

US 2015/0340037 A1    Nov. 26, 2015

(30) Foreign Application Priority Data

May 23, 2014   (KR) .......................... 10-2014-0062569
May 21, 2015   (KR) .......................... 10-2015-0071231

(51) Int. Cl.
*G10L 15/00* (2013.01)
*G10L 15/26* (2006.01)
(Continued)

(52) U.S. Cl.
CPC ........... *H04M 1/7255* (2013.01); *G10L 15/26* (2013.01); *H04L 51/046* (2013.01); *H04L 51/36* (2013.01);
(Continued)

(58) Field of Classification Search
CPC ..... G10L 15/265; G10L 15/063; G10L 15/22; G10L 13/08; G06F 17/30884;
(Continued)

(56) References Cited

U.S. PATENT DOCUMENTS 6,006,183 A * 12/1999 Lai .......................... G10L 15/22
704/235
6,181,778 B1 * 1/2001 Ohki .................... G09B 21/009
348/14.01

(Continued)

FOREIGN PATENT DOCUMENTS

JP      2010-041301 A    2/2010
KR  10-2010-0051912 A    5/2010

(Continued)

OTHER PUBLICATIONS

Communication issued Sep. 11, 2015 by the International Searching Authority in related International Application No. PCT/KR2015/005143.

(Continued)

*Primary Examiner* — Anne Thomas-Homescu
(74) *Attorney, Agent, or Firm* — Sughrue Mion, PLLC

(57) ABSTRACT

Provided are a system and method of providing a voice-message call service. A mobile device that performs a call with an external mobile device comprises a control unit configured to obtain text, the text converted from voice data that is exchanged between the mobile device and the external mobile device, during the call between the mobile device and the external mobile device, and obtain input text input to the mobile device and provided text that is received from the external mobile device; and a display unit configured to arrange the text, the input text, and the provided text and display the arranged text, input text, and provided text on a screen of the device, during the call between the mobile device and the external mobile device.

17 Claims, 57 Drawing Sheets

(51) Int. Cl.

| | | |
|---|---|---|
| *G10L 15/06* | (2013.01) | |
| *G10L 21/00* | (2013.01) | |
| *G10L 25/00* | (2013.01) | |
| *G10L 13/00* | (2006.01) | |
| *G10L 13/08* | (2013.01) | |
| *G10L 15/18* | (2013.01) | |
| *G10L 15/04* | (2013.01) | |
| *G10L 19/00* | (2013.01) | |
| *G06F 17/28* | (2006.01) | |
| *H04M 1/725* | (2006.01) | |
| *H04W 88/02* | (2009.01) | |
| *H04W 4/14* | (2009.01) | |
| *H04W 4/12* | (2009.01) | |
| *H04W 4/18* | (2009.01) | |
| *H04M 3/42* | (2006.01) | |
| *H04M 7/00* | (2006.01) | |
| *H04M 1/65* | (2006.01) | |
| *G06F 15/16* | (2006.01) | |
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |
| *G06F 3/00* | (2006.01) | |
| *H04L 12/58* | (2006.01) | |

(52) U.S. Cl.
CPC ....... *H04M 1/651* (2013.01); *H04M 1/72552* (2013.01); *H04M 3/42382* (2013.01); *H04M 7/0042* (2013.01); *H04W 4/12* (2013.01); *H04W 4/14* (2013.01); *H04W 4/18* (2013.01); *H04W 88/02* (2013.01); *H04L 51/066* (2013.01); *H04M 3/42391* (2013.01); *H04M 2201/40* (2013.01); *H04M 2201/60* (2013.01); *H04M 2207/18* (2013.01)

(58) Field of Classification Search
CPC .... G06F 17/289; G06F 3/0237; G06F 3/0481; G06F 3/04886; G11C 2207/16; G10Q 10/107; G10Q 10/10; H04L 29/08072; H04L 29/12066; H04L 29/06; H04L 29/08108; H04M 1/271; H04W 4/12; H04W 4/14; H04N 5/44543
See application file for complete search history.

(56) References Cited

U.S. PATENT DOCUMENTS

| | | | | |
|---|---|---|---|---|
| 7,117,152 B1* | 10/2006 | Mukherji | ........... | G10L 15/26 704/209 |
| 7,133,899 B2* | 11/2006 | Rowe | ........... | H04M 3/493 370/473 |
| 7,669,134 B1* | 2/2010 | Christie | ........... | G06Q 10/107 715/751 |
| 8,005,909 B2* | 8/2011 | Raman | ........... | G06F 17/30867 705/319 |
| 8,060,565 B1* | 11/2011 | Swartz | ........... | G10L 13/00 704/4 |
| 8,145,791 B2* | 3/2012 | Thatcher | ........... | G06Q 10/107 709/206 |
| 8,296,139 B2* | 10/2012 | Da Palma | ........... | G10L 15/30 369/25.01 |
| 8,340,726 B1* | 12/2012 | Fujisaki | ........... | H04M 19/04 345/168 |
| 8,438,233 B2* | 5/2013 | Mallet | ........... | G06Q 50/01 709/203 |
| 8,442,576 B2* | 5/2013 | Park | ........... | H04L 12/581 455/416 |
| 8,447,285 B1* | 5/2013 | Bladon | ........... | G10L 15/26 370/300 |
| 8,498,670 B2* | 7/2013 | Cha | ........... | G06F 1/1624 455/418 |
| 8,509,123 B2* | 8/2013 | Katis | ........... | H04L 12/1827 370/260 |
| 8,543,397 B1* | 9/2013 | Nguyen | ........... | G06F 3/04883 704/235 |
| 8,821,297 B1* | 9/2014 | Nagata | ........... | H04L 51/046 463/1 |
| 9,031,537 B2* | 5/2015 | Ortiz | ........... | G06Q 10/06 379/88.13 |
| 9,235,733 B2* | 1/2016 | Birdwell | ........... | G06K 5/00 |
| 2004/0039256 A1* | 2/2004 | Kawatahara | ........... | A61B 5/00 600/300 |
| 2004/0254795 A1* | 12/2004 | Fujii | ........... | G06F 17/3043 704/277 |
| 2004/0267527 A1* | 12/2004 | Creamer | ........... | G10L 15/26 704/235 |
| 2005/0048992 A1* | 3/2005 | Wu | ........... | H04M 3/493 455/466 |
| 2005/0049879 A1* | 3/2005 | Audu | ........... | G10L 15/26 704/277 |
| 2005/0154586 A1* | 7/2005 | Liu | ........... | H04M 3/42 704/235 |
| 2005/0159957 A1* | 7/2005 | Roth | ........... | G10L 15/22 704/276 |
| 2006/0200778 A1* | 9/2006 | Gritzman | ........... | G06F 3/0481 715/781 |
| 2006/0205384 A1* | 9/2006 | Chang | ........... | H04M 1/72538 455/410 |
| 2006/0217159 A1* | 9/2006 | Watson | ........... | H04M 1/72522 455/563 |
| 2006/0234735 A1* | 10/2006 | Digate | ........... | H04L 12/581 455/466 |
| 2006/0281495 A1* | 12/2006 | Yang | ........... | H04M 1/7255 455/563 |
| 2006/0293888 A1* | 12/2006 | Jindal | ........... | H04M 3/42221 704/235 |
| 2008/0037741 A1 | 2/2008 | Bear et al. | | |
| 2008/0097759 A1* | 4/2008 | Shin | ........... | H04M 1/2474 704/246 |
| 2008/0098087 A1* | 4/2008 | Lubeck | ........... | G06Q 10/00 709/218 |
| 2008/0146256 A1* | 6/2008 | Hawkins | ........... | H04M 1/72522 455/466 |
| 2008/0155030 A1* | 6/2008 | Fortier | ........... | H04L 51/04 709/206 |
| 2008/0162132 A1* | 7/2008 | Doulton | ........... | G10L 15/265 704/235 |
| 2008/0201437 A1* | 8/2008 | Ludwig | ........... | H04L 51/04 709/206 |
| 2008/0262845 A1* | 10/2008 | Keohane | ........... | G11B 27/034 704/260 |
| 2009/0049138 A1* | 2/2009 | Jones | ........... | G06Q 10/107 709/206 |
| 2009/0235335 A1* | 9/2009 | Mendiola | ........... | H04L 63/104 726/4 |
| 2009/0244000 A1 | 10/2009 | Thompson et al. | | |
| 2009/0254616 A1* | 10/2009 | Cheung | ........... | H04L 12/1827 709/204 |
| 2009/0326939 A1* | 12/2009 | Toner | ........... | H04M 1/656 704/235 |
| 2009/0327885 A1* | 12/2009 | Aoki | ........... | G06Q 10/10 715/700 |
| 2010/0004010 A1* | 1/2010 | Shin | ........... | H04L 12/581 455/466 |
| 2010/0023871 A1* | 1/2010 | Bederson | ........... | G06F 3/0486 715/745 |
| 2010/0106498 A1* | 4/2010 | Morrison | ........... | G10L 15/265 704/235 |

(56) References Cited

U.S. PATENT DOCUMENTS

| | | | |
|---|---|---|---|
| 2010/0111270 A1* | 5/2010 | Langos | H04M 3/533 379/88.14 |
| 2010/0158213 A1* | 6/2010 | Mikan | H04M 3/42221 379/88.14 |
| 2010/0179756 A1* | 7/2010 | Higgins | G01C 21/20 701/414 |
| 2010/0211389 A1 | 8/2010 | Marquardt | |
| 2010/0223345 A1* | 9/2010 | Gupta | G06Q 10/109 709/206 |
| 2010/0241962 A1* | 9/2010 | Peterson | G06F 3/0481 715/720 |
| 2010/0323728 A1* | 12/2010 | Gould | H04M 3/42391 455/466 |
| 2011/0035284 A1* | 2/2011 | Moshfeghi | G06Q 30/02 705/14.58 |
| 2011/0086607 A1* | 4/2011 | Wang | H04M 3/5116 455/404.1 |
| 2011/0087970 A1* | 4/2011 | Swink | H04L 51/32 715/752 |
| 2011/0087972 A1* | 4/2011 | Swink | H04L 51/32 715/752 |
| 2011/0099507 A1* | 4/2011 | Nesladek | G01C 21/265 715/780 |
| 2011/0105190 A1* | 5/2011 | Cha | G06F 17/276 455/566 |
| 2011/0177797 A1* | 7/2011 | Vendrow | H04M 3/4234 455/414.1 |
| 2011/0195739 A1* | 8/2011 | Deleus | H04W 4/00 455/518 |
| 2011/0197146 A1* | 8/2011 | Goto | G06F 3/0482 715/753 |
| 2011/0202347 A1* | 8/2011 | Moore | G06Q 20/085 704/260 |
| 2011/0231194 A1* | 9/2011 | Lewis | G10L 21/06 704/276 |
| 2011/0231379 A1* | 9/2011 | Kruglick | G06F 17/30899 707/706 |
| 2011/0252346 A1* | 10/2011 | Chaudhri | G06F 3/04817 715/765 |
| 2011/0319104 A1* | 12/2011 | Williams | H04M 1/72552 455/466 |
| 2012/0036556 A1* | 2/2012 | LeBeau | G06F 3/048 726/3 |
| 2012/0059651 A1* | 3/2012 | Delgado | H04W 4/008 704/235 |
| 2012/0069974 A1* | 3/2012 | Zhu | H04M 1/2745 379/88.14 |
| 2012/0072835 A1* | 3/2012 | Gross | G06Q 30/0269 715/243 |
| 2012/0094721 A1* | 4/2012 | Brondmo | H04L 12/588 455/566 |
| 2012/0110096 A1* | 5/2012 | Smarr | G06Q 10/10 709/206 |
| 2012/0148115 A1* | 6/2012 | Birdwell | G06K 9/00 382/116 |
| 2012/0154444 A1* | 6/2012 | Fernandez | G06T 11/60 345/655 |
| 2012/0173242 A1* | 7/2012 | Sarkar | G10L 19/018 704/260 |
| 2012/0197728 A1* | 8/2012 | Luna | G06Q 30/02 705/14.64 |
| 2012/0239761 A1* | 9/2012 | Linner | G06F 17/2765 709/206 |
| 2012/0252420 A1* | 10/2012 | Czaja | H04W 48/04 455/414.1 |
| 2012/0262271 A1* | 10/2012 | Torgersrud | G06F 21/32 340/5.53 |
| 2012/0316882 A1* | 12/2012 | Fiumi | G10L 15/30 704/270 |
| 2012/0324353 A1* | 12/2012 | Torbey | G06F 3/048 715/716 |
| 2013/0019176 A1* | 1/2013 | Miyashita | G06F 17/30746 715/728 |
| 2013/0024189 A1* | 1/2013 | Kim | G10L 13/04 704/201 |
| 2013/0055099 A1* | 2/2013 | Yao | G06Q 10/101 715/739 |
| 2013/0058471 A1* | 3/2013 | Garcia | H04M 3/42221 379/202.01 |
| 2013/0079052 A1 | 3/2013 | Levien et al. | |
| 2013/0080961 A1* | 3/2013 | Levien | H04L 51/36 715/773 |
| 2013/0096921 A1* | 4/2013 | Kuwamoto | G08G 1/0962 704/260 |
| 2013/0109302 A1* | 5/2013 | Levien | H04W 4/00 455/39 |
| 2013/0110509 A1* | 5/2013 | Cath | G10L 15/30 704/235 |
| 2013/0111365 A1* | 5/2013 | Chen | H04L 51/10 715/756 |
| 2013/0111579 A1* | 5/2013 | Newman | G06F 3/0488 726/17 |
| 2013/0117274 A1* | 5/2013 | Li | H04M 1/274583 707/741 |
| 2013/0120447 A1* | 5/2013 | Kim | G06T 11/60 345/629 |
| 2013/0121481 A1* | 5/2013 | Mikan | H04L 51/10 379/88.14 |
| 2013/0151605 A1* | 6/2013 | Papakipos | G06Q 10/10 709/204 |
| 2013/0238339 A1* | 9/2013 | Fleizach | G06F 17/275 704/260 |
| 2013/0238340 A1* | 9/2013 | Walsh | G10L 13/04 704/260 |
| 2013/0262103 A1* | 10/2013 | Reiswig | G10L 25/60 704/235 |
| 2013/0290567 A1* | 10/2013 | Seymour | H04L 67/2823 709/246 |
| 2013/0297319 A1* | 11/2013 | Kim | G10L 15/22 704/275 |
| 2013/0300666 A1* | 11/2013 | Archer | G10L 15/26 345/168 |
| 2013/0307997 A1* | 11/2013 | O'Keefe | H04L 51/10 348/207.1 |
| 2013/0331073 A1* | 12/2013 | Balan | H04W 4/16 455/415 |
| 2014/0012927 A1* | 1/2014 | Gertzfield | G06Q 50/01 709/206 |
| 2014/0037075 A1* | 2/2014 | Bouzid | H04M 3/42204 379/88.03 |
| 2014/0038578 A1* | 2/2014 | Bouzid | H04M 3/42204 455/418 |
| 2014/0045467 A1* | 2/2014 | Qiao | H04W 4/12 455/412.1 |
| 2014/0051399 A1* | 2/2014 | Walker | H04L 65/1083 455/412.1 |
| 2014/0063071 A1* | 3/2014 | Leventhal | G06F 3/04812 345/661 |
| 2014/0067395 A1* | 3/2014 | Balasubramanian | G06F 17/30654 704/251 |
| 2014/0067669 A1* | 3/2014 | Meeks | G06Q 10/107 705/44 |
| 2014/0068468 A1* | 3/2014 | Yoon | H04L 65/403 715/758 |
| 2014/0088962 A1* | 3/2014 | Corfield | G10L 15/26 704/235 |
| 2014/0142953 A1* | 5/2014 | Kim | G10L 15/22 704/275 |
| 2014/0189539 A1* | 7/2014 | St. Clair | G06F 3/048 715/753 |
| 2014/0298248 A1* | 10/2014 | Kang | G06F 3/04842 715/781 |
| 2014/0316781 A1* | 10/2014 | Jang | H04M 1/6075 704/235 |
| 2014/0317502 A1* | 10/2014 | Brown | G06F 9/4446 715/706 |

(56) References Cited

U.S. PATENT DOCUMENTS

| | | | |
|---|---|---|---|
| 2014/0334271 A1* | 11/2014 | Park | G04G 21/04 368/10 |
| 2014/0337032 A1* | 11/2014 | Aleksic | G10L 15/32 704/257 |
| 2014/0378173 A1* | 12/2014 | Jacquin | H04W 4/14 455/466 |
| 2015/0018040 A1* | 1/2015 | He | H04M 1/72522 455/558 |
| 2015/0051898 A1* | 2/2015 | Cuthbert | G06F 3/167 704/3 |
| 2015/0051908 A1* | 2/2015 | Romriell | G06F 17/273 704/235 |
| 2015/0079967 A1* | 3/2015 | Mullins | H04W 48/04 455/419 |
| 2015/0088501 A1* | 3/2015 | Recker | H04R 25/43 704/235 |
| 2015/0100317 A1* | 4/2015 | Tsuji | G10L 15/06 704/243 |
| 2015/0140978 A1* | 5/2015 | Zilmer | H04L 51/36 455/416 |
| 2015/0207908 A1* | 7/2015 | Hosoda | G06F 1/1626 455/566 |
| 2015/0215247 A1* | 7/2015 | Gandhi | H04L 67/22 709/206 |
| 2015/0309720 A1* | 10/2015 | Fisher | G06F 3/04845 715/752 |
| 2015/0310863 A1* | 10/2015 | Chen | G10L 15/26 704/235 |
| 2015/0317293 A1* | 11/2015 | Greisson | G06F 17/24 715/256 |
| 2015/0326949 A1* | 11/2015 | Burton | H04N 21/8133 704/235 |
| 2015/0339745 A1* | 11/2015 | Peter | G06Q 30/0613 705/26.42 |
| 2016/0180850 A1* | 6/2016 | Hashimoto | G10L 15/265 704/2 |
| 2016/0328142 A1* | 11/2016 | Lee | G06F 3/14 |
| 2017/0034546 A1* | 2/2017 | Badros | H04L 65/4084 |

FOREIGN PATENT DOCUMENTS

| | | |
|---|---|---|
| WO | WO2008048479 A2 * | 4/2008 |
| WO | 2014/061876 A1 | 4/2014 |

OTHER PUBLICATIONS

Communication issued Oct. 19, 2015 by the European Patent Office in European Application No. 15169020.3.

Communication dated Dec. 21, 2017, by the European Patent Office in copending Application No. 15 169 020.3.

* cited by examiner

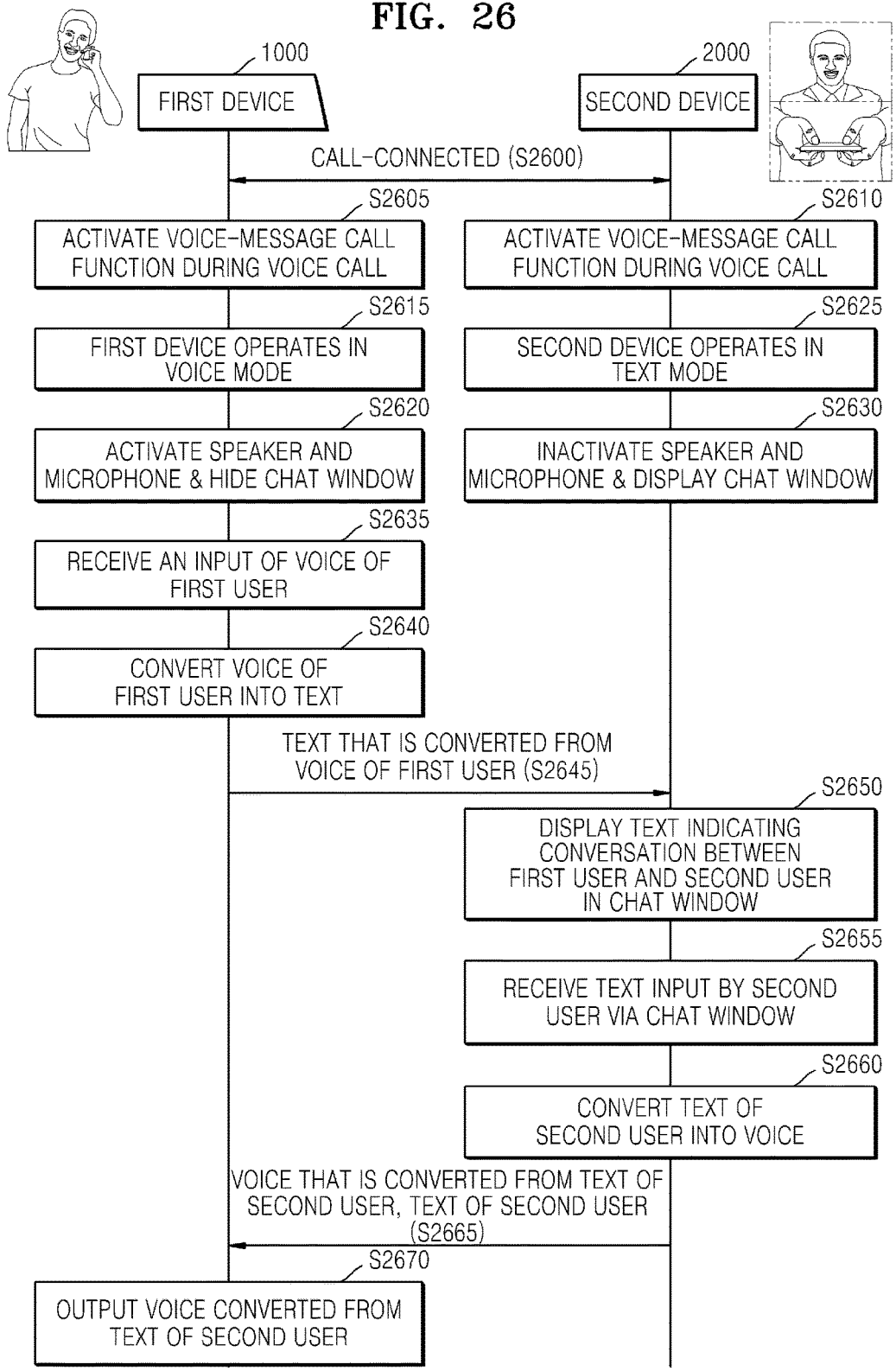

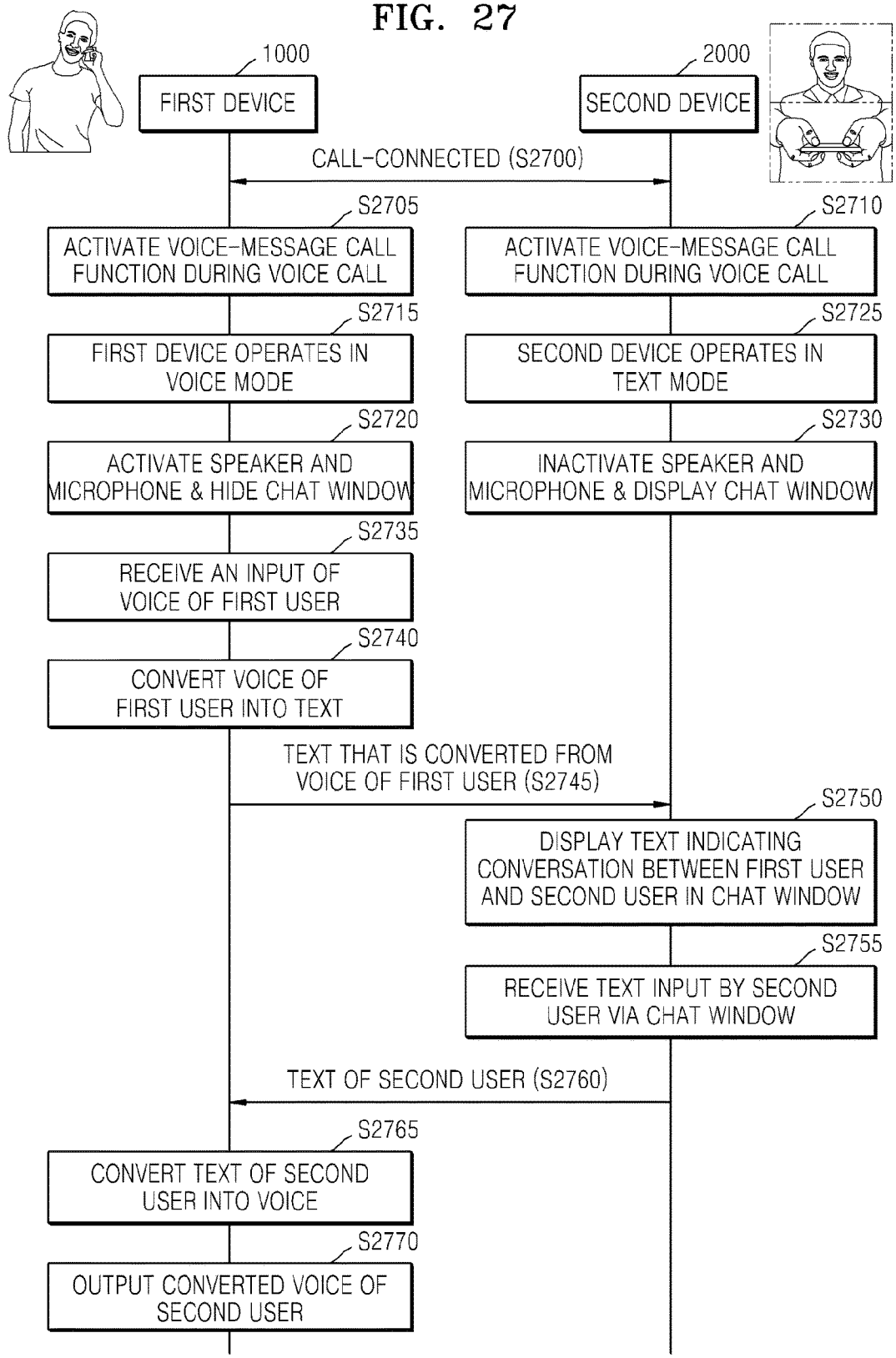

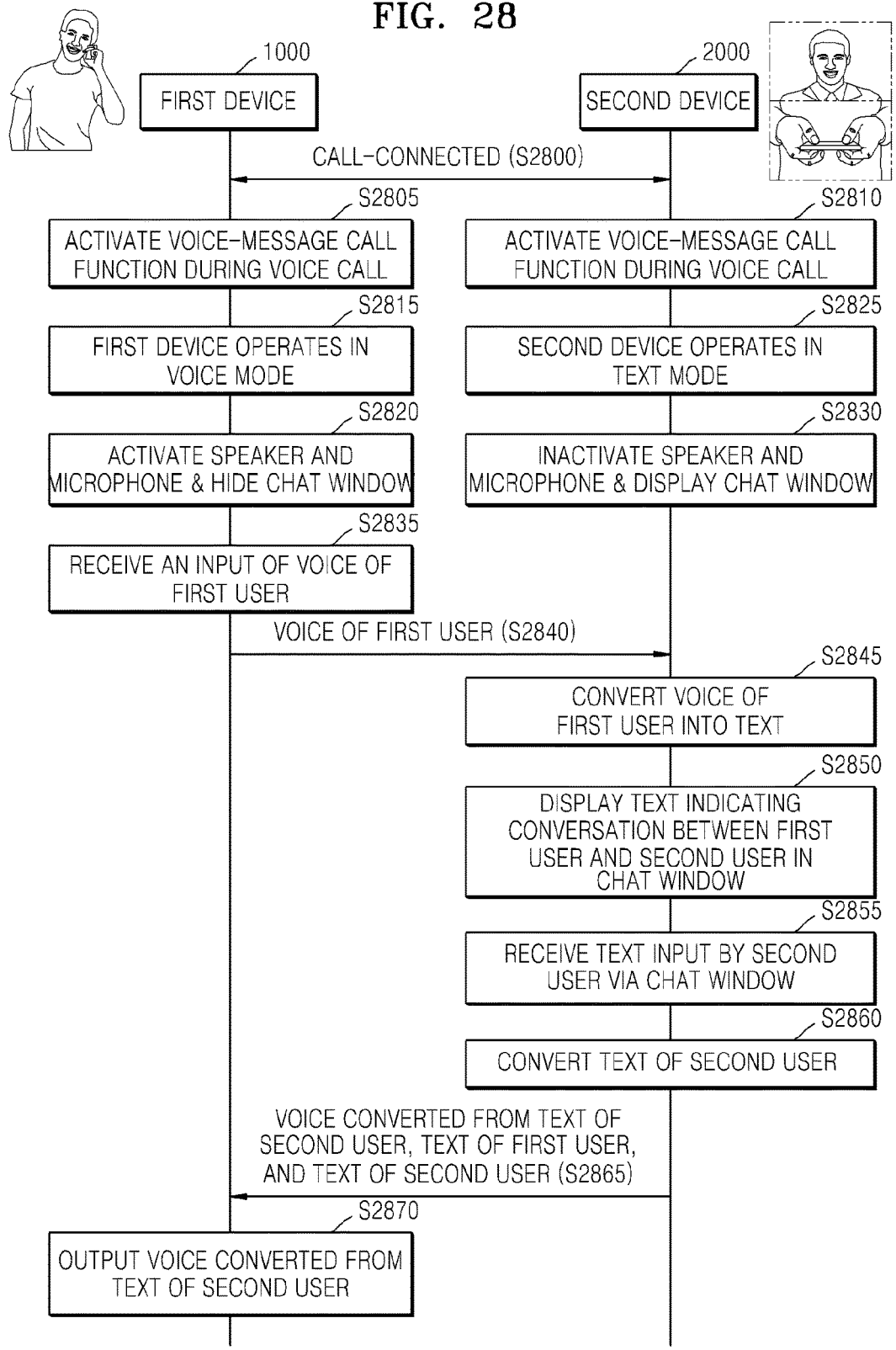

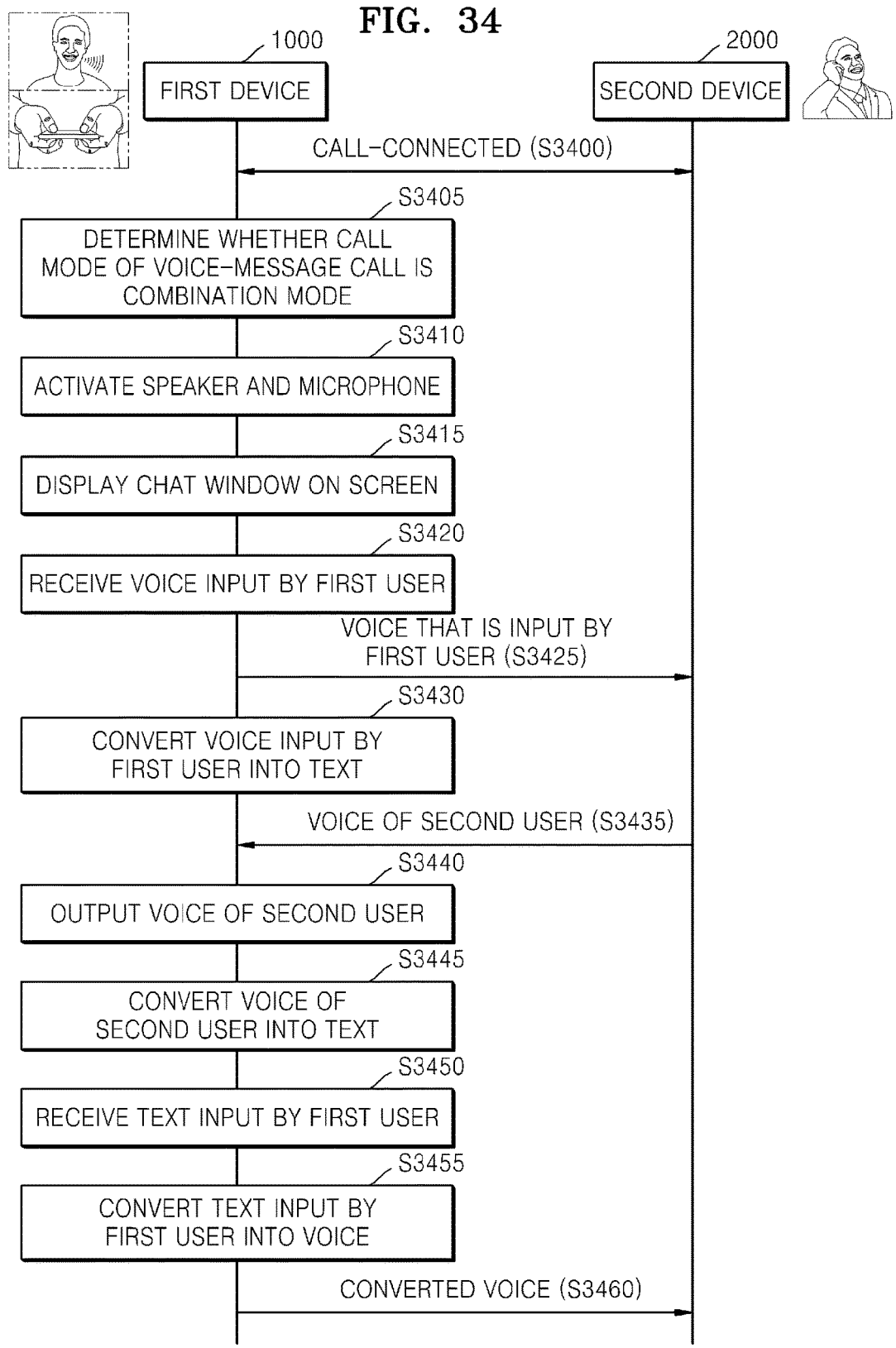

SYSTEM AND METHOD OF PROVIDING VOICE-MESSAGE CALL SERVICE

CROSS-REFERENCE TO RELATED APPLICATIONS

This application priority from Korean Patent Application No. 10-2014-0062569, filed on May 23, 2014, and Korean Patent Application No. 10-2015-0071231, filed on May 21, 2015, in the Korean Intellectual Property Office, the disclosure of which is incorporated herein by reference in its entirety.

BACKGROUND

1. Field

Aspects of exemplary embodiments relate to a system and method of providing a voice-message call service, and more particularly, to a system and method of providing a voice call and a text service via a voice-message call service.

2. Description of the Related Art

Due to developments in a multimedia technology and a network technology, a user may communicate with another user by using various devices. In particular, the user may have a conversation with another user by using a voice call service and a text messaging service.

However, an environment in which the user may have a conversation with the other user by using a device, such as a noisy environment or an automobile environment, may inappropriate for a voice call or a text exchange, respectively.

Accordingly, there is a demand for a technology that allows a user to co-use a voice call service and a text exchange service, or to efficiently switch and use the voice call service and the text exchange service.

SUMMARY

Aspects of the exemplary embodiments include a system and method of providing a voice-message call service, whereby a voice call and a text service may be co-provided via the voice-message call service.

Aspects of the exemplary embodiments include a system and method of providing a voice-message call service capable of distinguishing between texts that indicate a conversation between users during a voice-message call.

Aspects of the exemplary embodiments include a system and method of providing a voice-message call service capable of advising a user of a change in a call mode during a voice-message call.

Additional aspects will be set forth in part in the description which follows and, in part, will be apparent from the description, or may be learned by practice of the presented embodiments.

According to an aspect of an exemplary embodiment, there is provided a mobile device that performs a call with an external mobile device, the mobile device including a control unit configured to obtain converted voice data that is exchanged between the mobile device and the external mobile device and converted into converted text, during the call between the mobile device and the external mobile device, and obtain input text input to the mobile device and provided text that is received from the external mobile device; and a display unit for arranging the converted text, the input text, and the provided text and displaying the arranged converted text, input text, and provided text on a screen of the device, during the call between the mobile device and the external mobile device.

According to an aspect of an exemplary embodiment, there is provided a method of a mobile device performing a call with an external mobile device, the method including obtaining converted voice data that is exchanged between the mobile device and the external mobile device and converted into converted text, during the call between the mobile device and the external mobile device, obtaining input text that is input to the device, obtaining provided text that is provided from the external mobile device, and arranging the converted text, the input text, and the provided text and displaying the arranged converted text, input text, and provided text on a screen of the device, during the call between the mobile device and the external mobile device.

According to an aspect of an exemplary embodiment, there is provided a system that provides a call between a first mobile device and a second mobile device, the system including a server including a communication unit configured to receive a voice of a first user from the first mobile device; and a control unit configured to convert the voice of the first user into text, wherein the communication unit is further configured to transmit the converted text to the second device; the first mobile device configured to provide the voice of the first user to the server; and the second mobile device configured to display the converted text, which is transmitted to the second mobile device, in a chat window that is displayed on a screen of the second mobile device during the call, wherein the chat window displays a conversation between the first user and a second user.

BRIEF DESCRIPTION OF THE DRAWINGS

The above and other aspects will become apparent and more readily appreciated from the following description of the exemplary embodiments, taken in conjunction with the accompanying drawings in which:

FIG. 4 illustrates an example in which a voice-message call function of the first device is activated when the first device receives a call, according to an exemplary embodiment;

FIG. 5 illustrates an example in which a voice-message call function of the first device is activated during a voice call, according to an exemplary embodiment;

FIG. 26 is a flowchart of a method of performing a voice-message call, the method performed by the first device that operates in a voice mode and the second device that operates in a text mode, according to an exemplary embodiment;

FIG. 27 is a flowchart of a method of performing a voice-message call, the method performed by the first device that operates in a voice mode and the second device that operates in a text mode, according to an exemplary embodiment;

FIG. 28 is a flowchart of a method of performing a voice-message call, the method performed by the first device that operates in a voice mode and the second device that operates in a text mode, according to an exemplary embodiment;

FIG. 34 is a flowchart of a method of performing a voice-message call with the second device, the method performed by the first device that operates in a combination mode, according to an exemplary embodiment;

DETAILED DESCRIPTION

Figure 1:
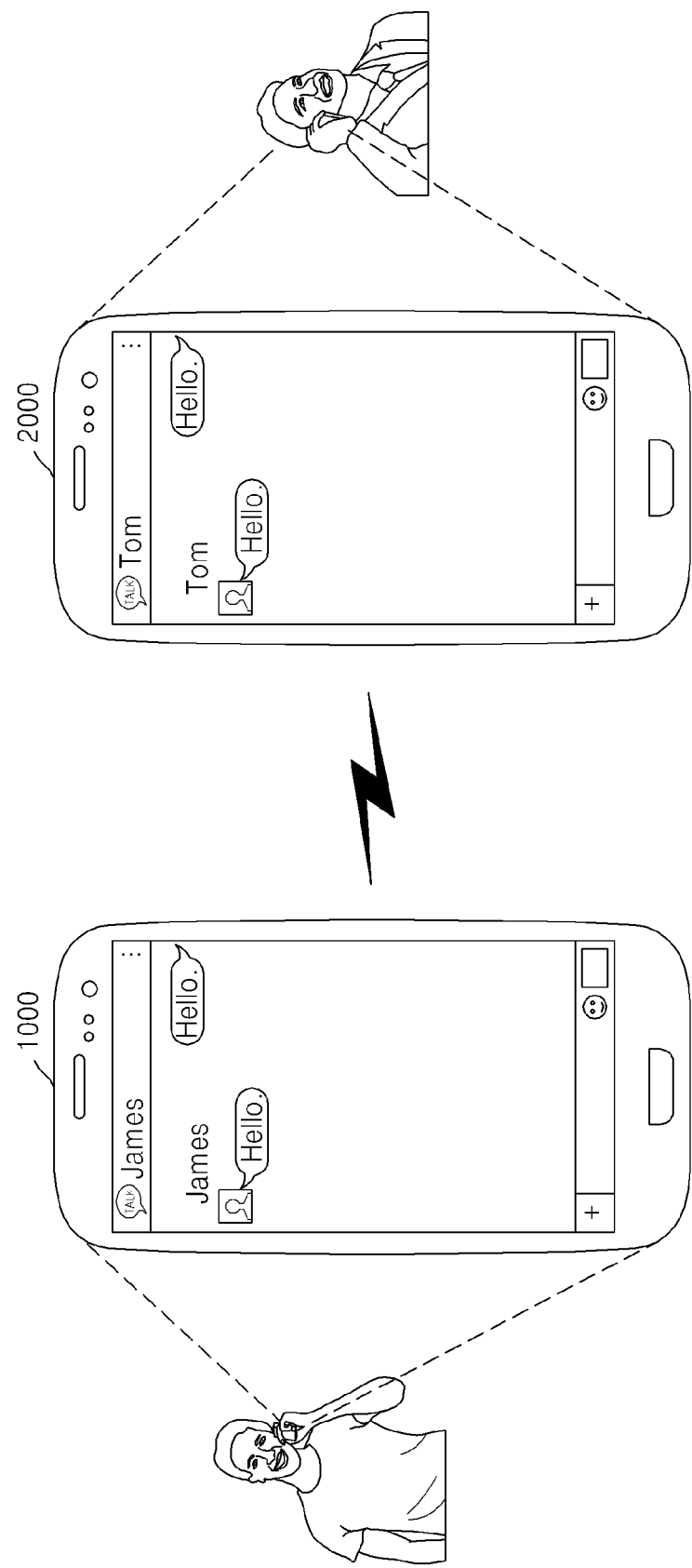
FIG. 1 illustrates a voice-message call service according to an exemplary embodiment.

Hereinafter, exemplary embodiments will be described more fully with reference to the accompanying drawings. However, the exemplary embodiments may be embodied in many different forms and should not be construed as being limited to the exemplary embodiments set forth herein; rather, these exemplary embodiments are provided so that this disclosure will be thorough and complete, and will fully convey the concept of the exemplary embodiments to those of ordinary skill in the art. In the following description, well-known functions or constructions will not be described in detail not to obscure the exemplary embodiments with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present.

Throughout the specification, a voice-message call service may indicate a service that co-provides a voice call service and a chat (messaging) service. A user may perform a voice call with a user of another device by using a device, and may also exchange a message with the user of the other device during the voice call. For example, a call mode of the voice-message call service may include at least two selected from a voice mode, a text mode, and a combination mode.

Throughout the specification, the voice mode may indicate a call mode during which a user may perform a voice call with another user.

Throughout the specification, the text mode may indicate a call mode during which a user may communicate with another user via an exchange of a text message.

Throughout the specification, the combination mode may indicate a call mode during which a user may perform a voice call with another user and may simultaneously exchange a text message with the other user using a single call connection (session) of the call mode.

For one example, during the combination mode, the user may perform a voice call with the other user by using a speakerphone function of a device and may simultaneously communicate with the other user by exchanging a text message with the other user over the same communication connection. For another example, during the combination mode, the user may perform a voice call with the other user without using the speakerphone function and may simulta- neously communicate with the other user by exchanging a text message with the other user over the same communication connection.

Also, various techniques may be used to transmit voice data and text data between devices. For example, voice data or text data may be transmitted and received between the devices by using a mobile communication service of which the user is a member or wireless techniques (e.g., Wi-Fi or Bluetooth) that may be used in the devices. For example, when an LTE or a Wi-Fi communication technology is used, voice data and text data may both be transmitted and received between the devices via a packet network. In this case, the voice data may be transmitted by using a VoLTE technology. Alternatively, when WCDMA is used, voice data may be transmitted via a circuit network and text data may be transmitted via a packet network. The voice data and the text data may be transmitted over separate communication connections. When the packet network is used, a communication connection between the devices may be a TCP/IP connection. When the circuit network is used, the communication connection between the device may be a call connection.

As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments will be described more fully with reference to the accompanying drawings.

FIG. 1 illustrates a voice-message call service according to an exemplary embodiment.

Referring to FIG. 1, the first device 1000 may perform a voice-message call with a second device 2000. The voice-message call may be initiated as a single communication connection or session that supports both the voice service and the messaging service. The first device 1000 and the second device 2000 may perform a voice call with each other, and during the voice call, the first device 1000 may display a text indicating a conversation between users on a screen of the first device 1000. Also, during the voice call, the second device 2000 may also display the text indicating the conversation between the users on a screen of the second device 2000. For example, the first device 1000 and the second device 2000 may display chat windows showing the conversation between the users on the screens of the first device 1000 and the second device 2000, respectively. The chat window may be a window via which messages are transmitted and received. The first user of the first device 1000 and the second user of the second device 2000 may communicate with each other by inputting messages to the chat window.

Accordingly, the user of the first device 1000 and the user of the second device 2000 may co-use a voice call service and a chat service during the voice-message call. In this regard, seamless switching between voice and messaging may be accomplished during the voice-message call. Alternatively, both the voice and messaging may be simultaneously performed during the voice-message call.

The voice-message call may comprise one or more channels, over which voice data and text data may be transmitted. For example, voice data may be transmitted over a voice channel and text data may be transmitted over a voice channel. Alternatively, a data channel may also be included in the voice-message call, for transmission of data.

Each of the first device 1000 and the second device 2000 may be, but is not limited to, a smart phone, a tablet personal computer (PC), a PC, a smart television (TV), a mobile phone, a personal digital assistant (PDA), a laptop computer, a media player, a micro-server, a global positioning system (GPS) device, an electronic book terminal, a terminal for digital broadcasting, a navigation device, a kiosk, an MP3 player, a digital camera, a wearable device, and other mobile or non-mobile computing devices. Also, each of the first device 1000 and the second device 2000 may include various devices such as an electronic blackboard, a touch table, etc. that may receive a touch input. Also, each of the first device 1000 and the second device 2000 may be a watch, glasses, a hair band, or a ring that has a communication function and a data processing function.

Figure 2:
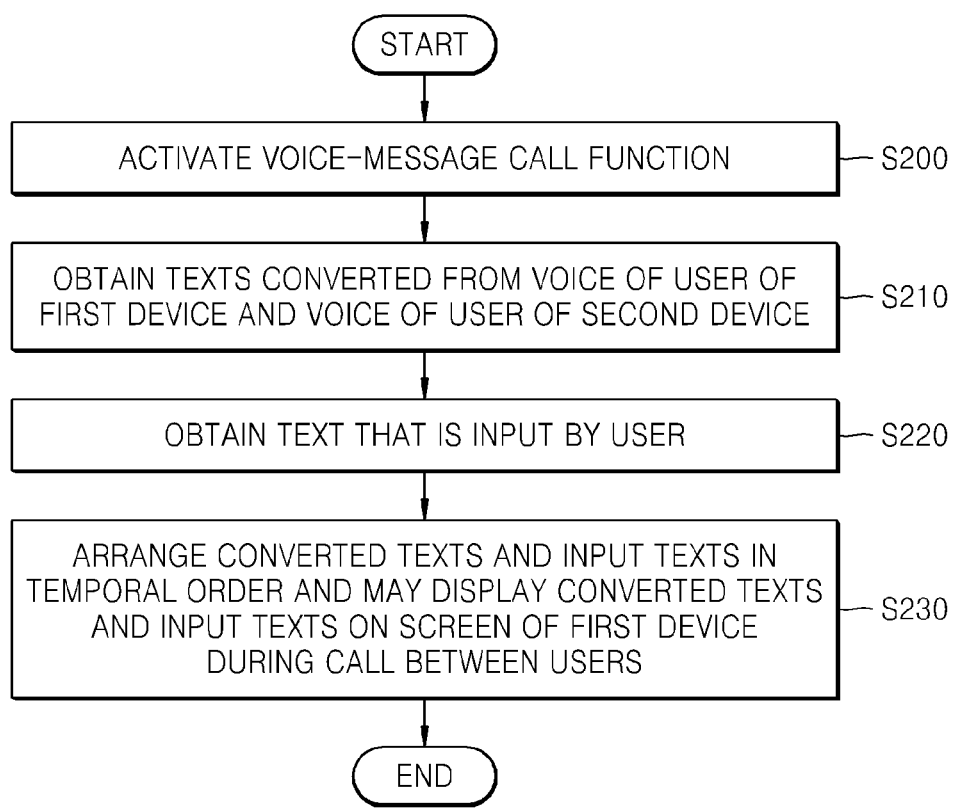
FIG. 2 is a flowchart of a method of displaying a text that is converted from a voice and a text that is input by a user, the method performed by a first device during a voice-message call, according to an exemplary embodiment.

FIG. 2 is a flowchart of a method of displaying a text that is converted from a voice and a text that is input by a user, the method performed by the first device 1000 during a voice-message call, according to an exemplary embodiment.

In operation S200, the first device 1000 may activate a voice-message call function. When the first device 1000 sends a call to the second device 2000, the first device 1000 may activate the voice-message call function. Alternatively, when the first device 1000 receives a call from the second device 2000, the first device 1000 may activate the voice-message call function. Alternatively, while the first device 1000 performs a call with the second device 2000, the first device 1000 may activate the voice-message call function.

Also, when the voice-message call function is activated, the first device 1000 may advise the second device 2000 that the voice-message call function is activated in the first device 1000. In this case, the first device 1000 may advise the second device 2000 of a call mode of the voice-message call of the first device 1000. The call mode of the voice-message call will be described at a later time.

Also, when the voice-message call function is activated, various techniques may be used to transmit voice data and text data. For example, voice data or text data may be transmitted and received between the first device 1000 and the second device 2000 by using a mobile communication service of which the user is a member or wireless techniques (e.g., Wi-Fi or Bluetooth) that may be used in the devices. For example, when an LTE or a Wi-Fi communication technology is used, voice data and text data may both be transmitted and received between the first devices 1000 and the second device 2000 via a packet network. In this case, the voice data may be transmitted by using a VoLTE technology. Alternatively, when WCDMA is used, voice data may be transmitted via a circuit network and text data may be transmitted via a packet network.

The voice data and the text data may be transmitted over separate communication connections. When the packet network is used, a communication connection between the devices may be a TCP/IP connection. When the circuit network is used, the communication connection between the device may be a call connection.

In operation S210, the first device 1000 may obtain texts that are converted from a voice of a user of the first device 1000 and a voice of a user of the second device 2000. The first device 1000 may convert the voice of the user of the first device 1000 into a text and thus may obtain the converted text. Also, the first device 1000 may receive the voice of the user of the second device 2000 from the second device 2000, may convert the voice into a text, and thus may obtain the converted text. However, a method of obtaining the converted text, the method performed by the first device 1000, is not limited thereto. The voice of the user of the first device 1000 or the voice of the user of the second device 2000 may be converted into a text by various devices or a server that mediates communication between the first device 1000 and the second device 2000, and the first device 1000 may receive the converted text from the various devices and the server.

In operation S220, the first device 1000 may obtain a text that is input by a user. The first device 1000 may obtain a text that is input by the user of the first device 1000 during the voice-message call. Also, during the voice-message call, the first device 1000 may receive, from the second device 2000, a text that is input to the second device 2000 by the user of the second device 2000.

In operation S230, the first device 1000 may arrange the converted texts and the input texts in a sequentially temporal order and may display the converted texts and the input texts on a screen of the first device 1000 during a call between the users. The first device 1000 may arrange the converted texts and the input texts in the temporal order, based on input times of the voices and the texts. For example, based on a time when the user of the first device 1000 inputs the voice into the first device 1000, a time when the user of the second device 2000 inputs the voice into the second device 2000, a time when the user of the first device 1000 inputs the text into the first device 1000, and a time when the user of the second device 2000 inputs the text into the second device 2000, the first device 1000 may arrange the converted texts and the input texts.

FIGS. 3A through 5 illustrate examples in which a voice-message call function is activated, according to exemplary embodiments.

Figure 3A:
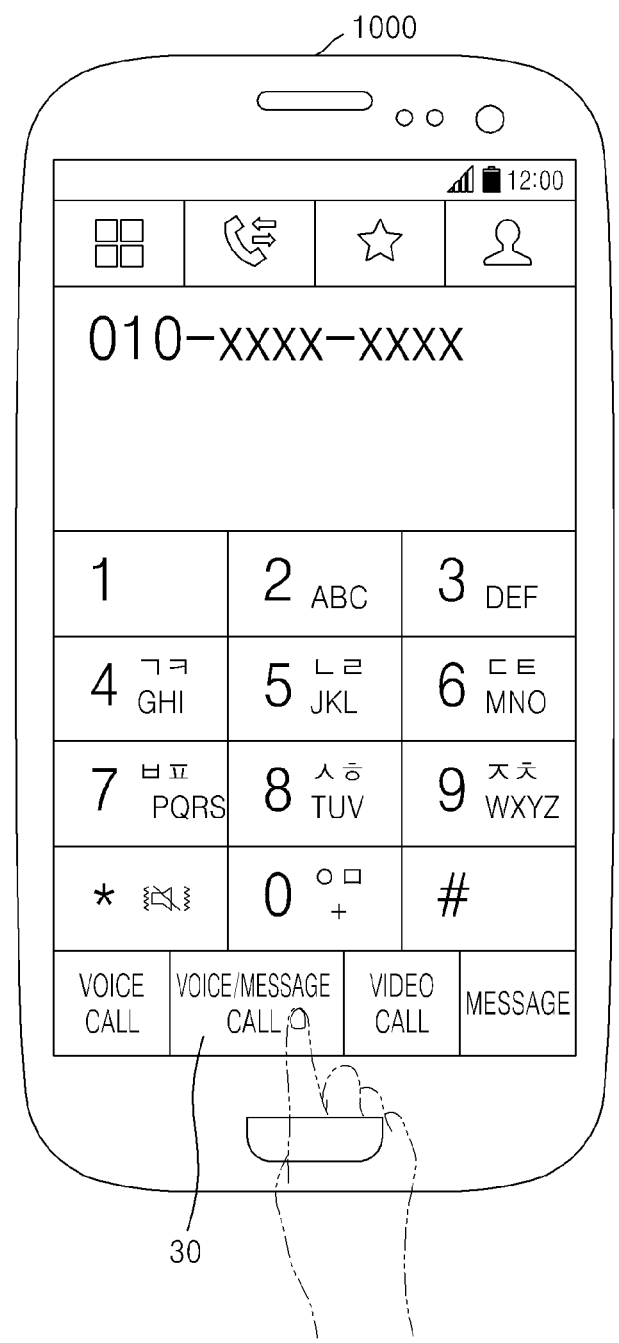
FIGS. 3A through 5 illustrate examples in which a voice-message call function is activated, according to exemplary embodiments.

FIG. 3A illustrates an example in which a voice-message call function of the first device 1000 is activated when the first device 1000 sends a call, according to an exemplary embodiment.

Referring to FIG. 3A, a user of the first device 1000 may input a telephone number of the second device 2000 and then may select a "voice-message call" button 30. Accordingly, the first device 1000 may activate the voice-message call function and may initiate a call to the second device 2000.

Figure 3B:
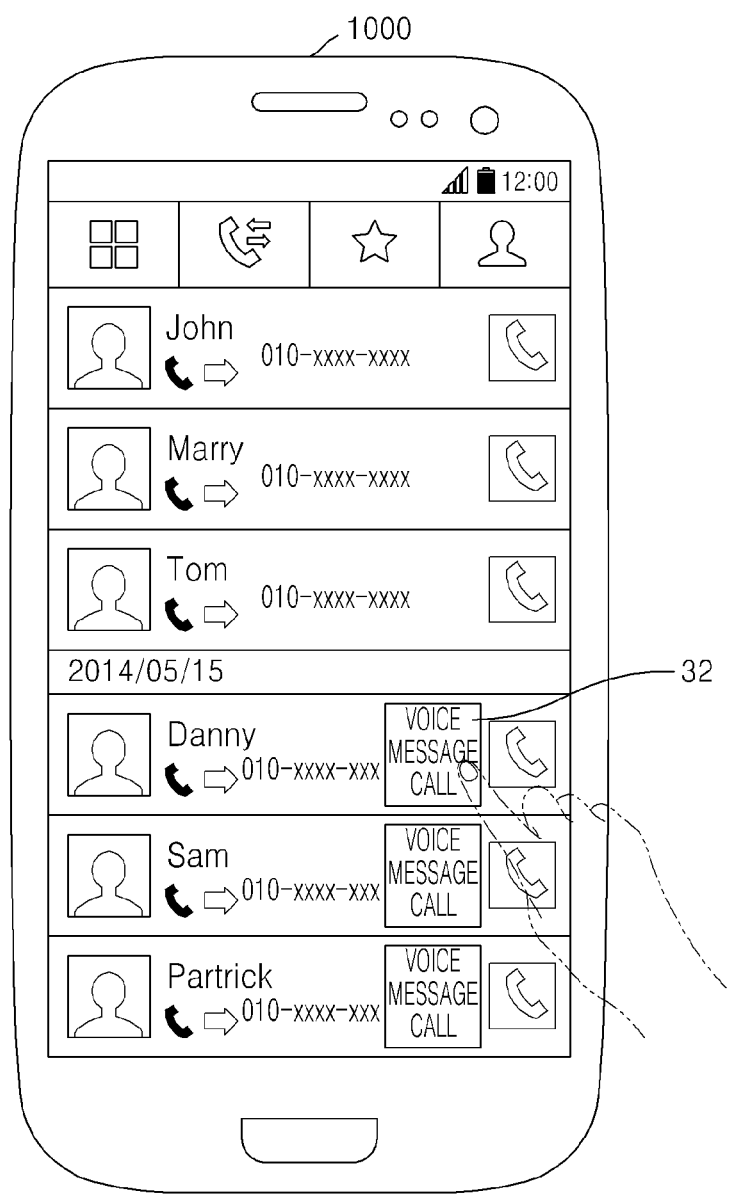

FIG. 3B illustrates an example in which a voice-message call function of the first device 1000 is activated based on a user input of selecting a button in a phone book that is displayed on a screen of the first device 1000, according to an exemplary embodiment.

Referring to FIG. 3B, the first device 1000 may display the phone book on the screen of the first device 1000, and a user of the first device 1000 may select a voice-message call button 32 included in a field of a user list where a telephone number of the second device 2000 is displayed, wherein the user list is included in the displayed phone book. Accordingly, the first device 1000 may activate the voice-message call function and may initiate a call to the second device 2000.

Figure 4:
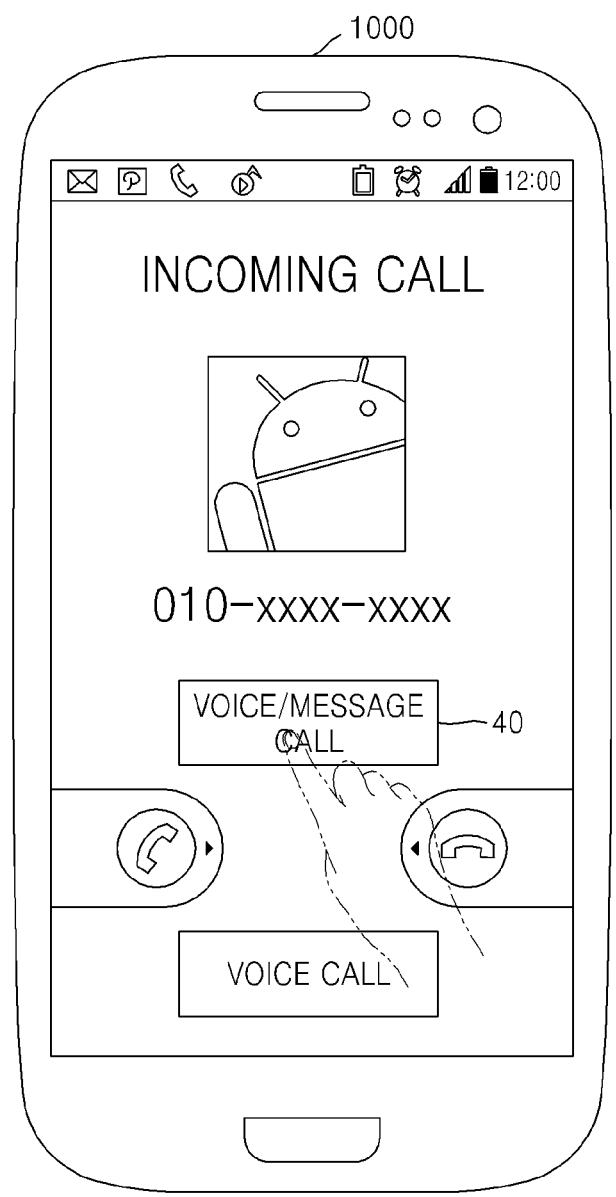

FIG. 4 illustrates an example in which a voice-message call function of the first device 1000 is activated when the first device 1000 receives a call, according to an exemplary embodiment.

Referring to FIG. 4, when the first device 1000 receives a call from the second device 2000, a user of the first device 1000 may select a "voice-message call" button 40. Accordingly, the first device 1000 may activate the voice-message call function and may receive the call from the second device 2000. Alternatively, when the first device 1000 initiates a voice-message call, the second device 2000 may automatically accept the voice-message call.

Figure 5:
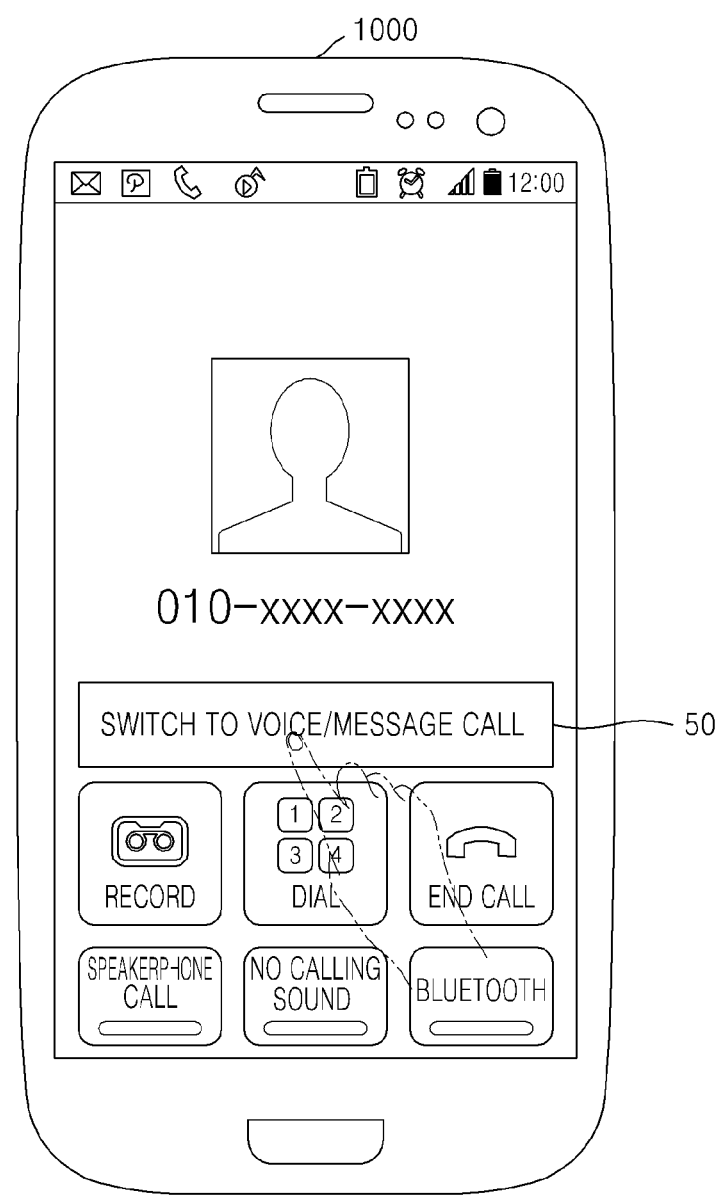

FIG. 5 illustrates an example in which a voice-message call function of the first device 1000 is activated during a voice call, according to an exemplary embodiment.

Referring to FIG. 5, a user of the first device 1000 may select a "voice-message call" button 50 during a voice call with a user of the second device 2000. Accordingly, the first device 1000 may activate the voice-message call function and may perform a voice-message call with the second device 2000. Alternatively, the second device 2000 may activate the voice-message call function during a voice call with the first device 1000. In this regard, the call may be initiated as a voice call, and the voice-message call may be initiated during the voice call.

Figure 6:
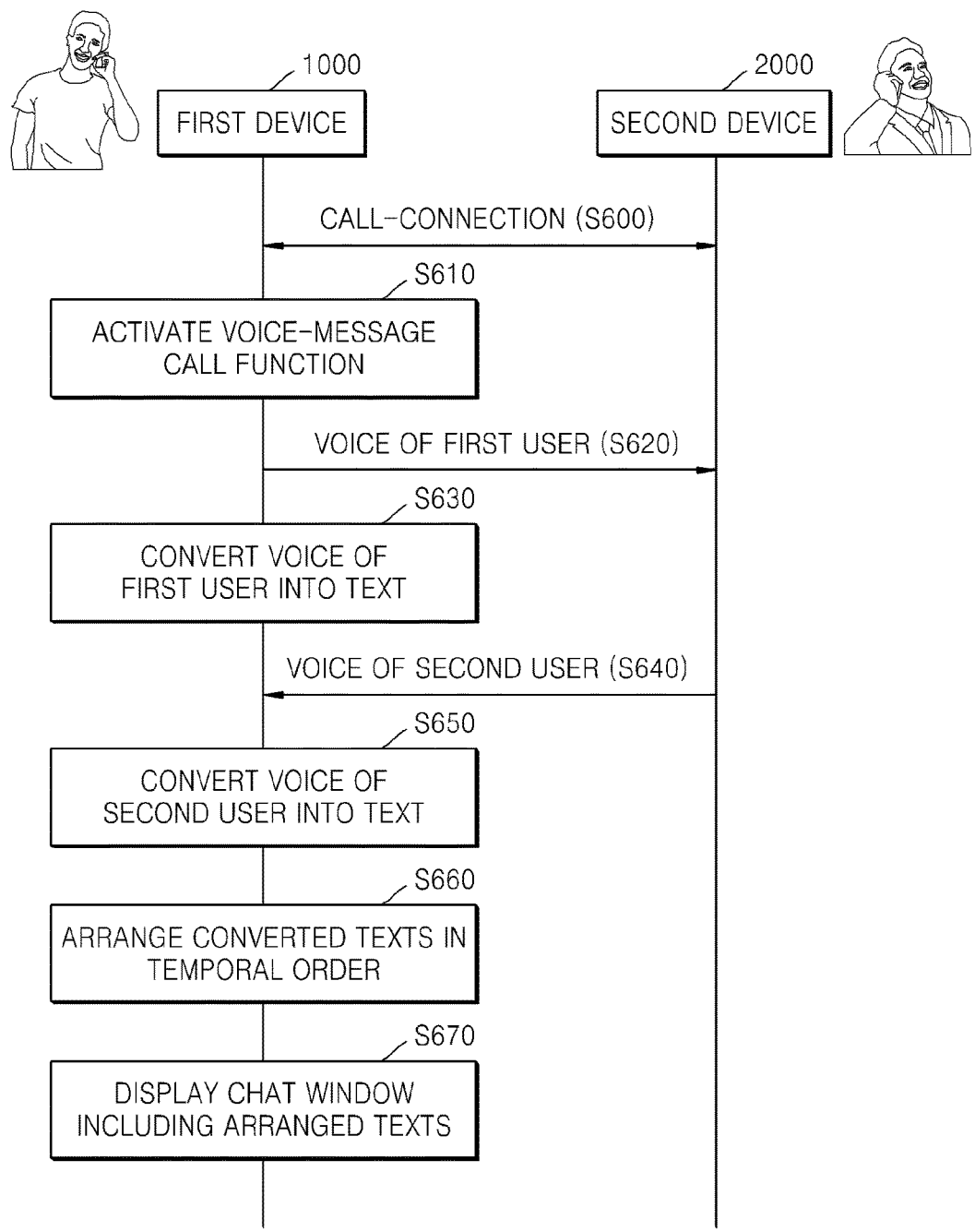
FIG. 6 is a flowchart of a method of performing a voice-message call with a second device of which voice-message call function is not activated, the method performed by the first device of which voice-message call function is activated, according to an exemplary embodiment.

FIG. 6 is a flowchart of a method of performing a voice-message call with the second device 2000 of which voice-message call function is not activated, the method performed by the first device 1000 of which voice-message call function is activated, according to an exemplary embodiment.

Referring to FIG. 6, the first device 1000 of which voice-message call function is activated may perform the voice-message call with the second device 2000, and the second device 2000 of which voice-message call function is not activated may perform a voice call with the first device 1000.

In operation S600, the first device 1000 is call-connected with the second device 2000. The first device 1000 may transmit a request for call-connection to the second device 2000 or may receive a request for call-connection from the second device 2000, so that the first device 1000 may be call-connected with the second device 2000.

In operation S610, the first device 1000 may activate a voice-message call function. The first device 1000 may activate the voice-message call function, based on a user input, or automatically. In operation S610, the first device 1000 activates the voice-message call function after the first device 1000 is call-connected with the second device 2000. However, one or more exemplary embodiments are not limited thereto. For example, the first device 1000 may activate the voice-message call function when the first device 1000 sends a call or receives a call, or while the first device 1000 performs a call.

In operation S620, the first device 1000 may transmit a voice of a user of the first device 1000 (hereinafter, the user of the first device 1000 is referred as a first user of the first device 1000) to the second device 2000. The first device 1000 may obtain the voice of the first user via a microphone, and may transmit the obtained voice to the second device 2000.

In operation S630, the first device 1000 may convert the voice of the first user into a text. The first device 1000 may convert the voice of the first user into the text by using various Speech-To-Text (STT) techniques.

In operation S640, the first device 1000 may receive a voice of a user of the second device 2000 (hereinafter, the user of the second device 2000 is referred as a second user of the second device 2000) from the second device 2000. In this case, the second device 2000 may obtain the voice of the second user by using a microphone in the second device 2000, and may transmit the obtained voice of the second user to the first device 1000.

In operation S650, the first device 1000 may convert the voice of the second user into a text. The first device 1000 may convert the voice of the second user into the text by using the various STT techniques.

In operation S660, the first device 1000 may arrange the converted texts in a temporal order. For example, the first device 1000 may arrange the text converted from the voice of the first user and the text converted from the voice of the second user, according to a time when the voice of the first user is input to the first device 1000 and a time when the voice of the second user is received. Also, for example, the first device 1000 may arrange the text converted from the voice of the first user and the text converted from the voice of the second user, according to the time when the voice of the first user is input to the first device 1000 and a time when the voice of the second user is input to the second device 2000. However, one or more exemplary embodiments are not limited thereto.

In operation S670, the first device 1000 may display a chat window including the arranged texts on a screen of the first device 1000. The first device 1000 may display the chat window on the screen of the first device 1000 while the first device 1000 performs the voice-message call. Also, the first device 1000 may display the chat window on the screen of the first device 1000 or may hide the chat window in the screen of the first device 1000, depending on a call mode of the voice-message call.

Figure 7:
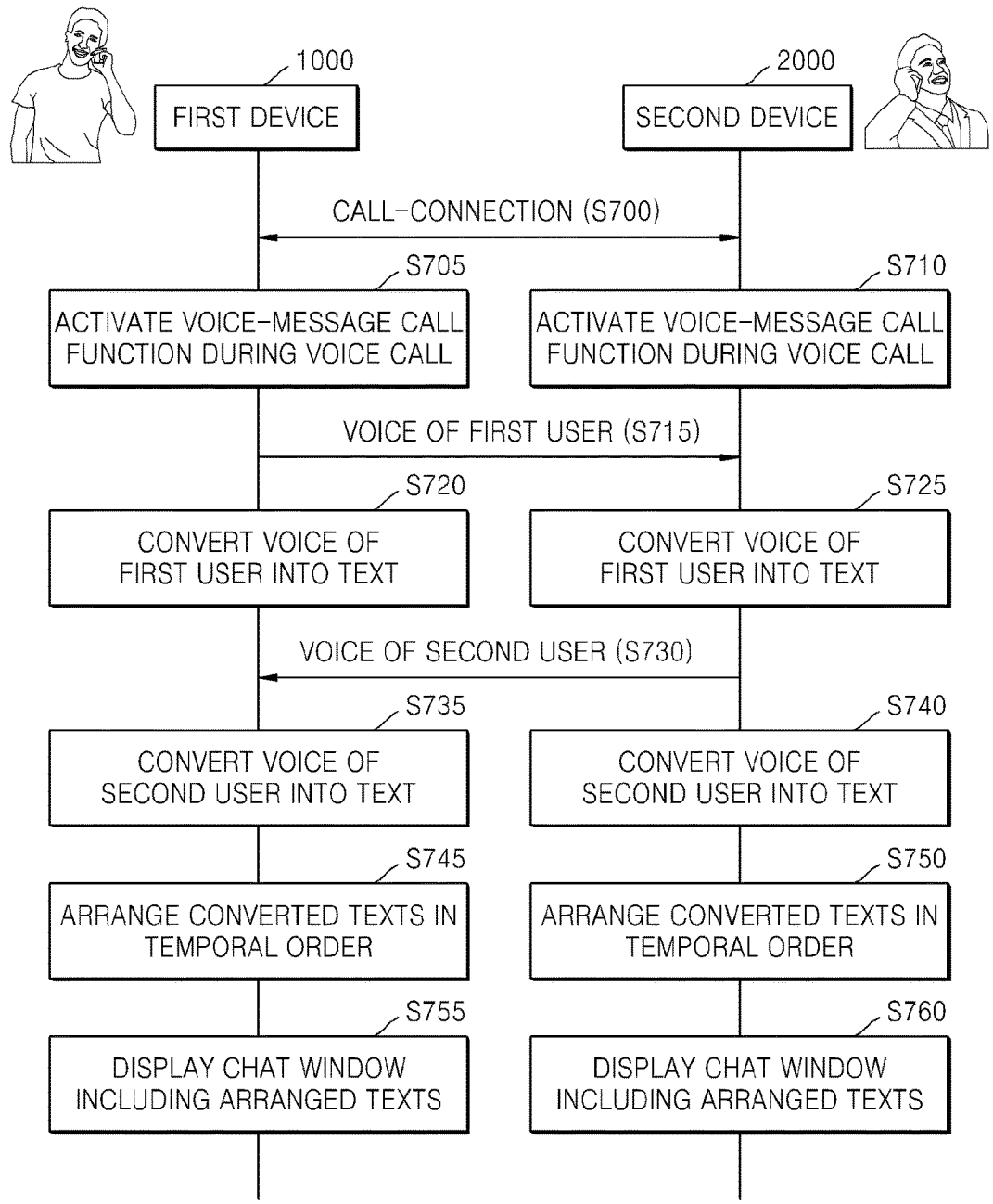
FIG. 7 is a flowchart of a method of performing a voice-message call in a mutual manner, the method performed by the first device and the second device, according to an exemplary embodiment.

FIG. 7 is a flowchart of a method of performing a voice-message call in a mutual manner, the method performed by the first device 1000 and the second device 2000, according to an exemplary embodiment. In the embodiment of FIG. 7, the first device 1000 may convert a voice of a first user and a voice of a second user into texts, and the second device 2000 may convert the voice of the first user and the voice of the second user into the texts.

In operation S700, the first device 1000 and the second device 2000 are call-connected with each other. The first device 1000 may be call-connected with the second device 2000 by transmitting a request for call-connection to the second device 2000, or by receiving a request for call-connection from the second device 2000.

In operation S705, the first device 1000 may activate a voice-message call function. The first device 1000 may activate the voice-message call function, based on a user input. In operation S705, the first device 1000 activates the voice-message call function after the first device 1000 is call-connected with the second device 2000. However, one or more exemplary embodiments are not limited thereto. For example, the first device 1000 may activate the voice-message call function when the first device 1000 sends a call or receives a call, or while the first device 1000 performs a call.

In operation S710, the second device 2000 may activate a voice-message call function. The second device 2000 may activate the voice-message call function, based on a user input. In operation S710, the second device 2000 activates the voice-message call function after the second device 2000 is call-connected with the first device 1000. However, one or more exemplary embodiments are not limited thereto. For example, the second device 2000 may activate the voice-message call function when the second device 2000 sends a call or receives a call, or while the second device 2000 performs a call.

In operation S715, the first device 1000 may transmit the voice of the first user to the second device 2000. The first device 1000 may obtain the voice of the first user via a microphone in the first device 1000, and may transmit the obtained voice to the second device 2000.

In operation S720, the first device 1000 may convert the voice of the first user into a text. The first device 1000 may convert the voice of the first user into the text by using various STT techniques.

In operation S725, the second device 2000 may convert the voice of the first user, which is received from the first device 1000, into a text. The second device 2000 may convert the voice of the first user into the text by using the various STT techniques.

In operation S730, the second device 2000 may transmit the voice of the second user to the first device 1000. The second device 2000 may obtain the voice of the second user via a microphone in the second device 2000, and may transmit the obtained voice to the first device 1000.

In operation S735, the first device 1000 may convert the voice of the second user, which is received from the second device 2000, into a text. The first device 1000 may convert the voice of the second user into the text by using various STT techniques.

In operation S740, the second device 2000 may convert the voice of the second user into a text. The second device 2000 may convert the voice of the second user into the text by using various STT techniques.

In operation S745, the first device 1000 may arrange the converted texts in a temporal order. For example, the first device 1000 may arrange the text converted from the voice of the first user and the text converted from the voice of the second user, according to a time when the voice of the first user is input to the first device 1000 and a time when the voice of the second user is received. Also, for example, the first device 1000 may sequentially arrange the text converted from the voice of the first user and the text converted from the voice of the second user, according to the time when the voice of the first user is input to the first device 1000 and a time when the voice of the second user is input to the second device 2000. However, one or more exemplary embodiments are not limited thereto.

In operation S750, the second device 2000 may arrange the converted texts in a temporal order. For example, the second device 2000 may sequentially arrange the text converted from the voice of the first user and the text converted from the voice of the second user, according to a time when the voice of the second user is input to the second device 2000 and a time when the voice of the first user is received. Also, for example, the second device 2000 may arrange the text converted from the voice of the first user and the text converted from the voice of the second user, according to the time when the voice of the second user is input to the second device 2000 and a time when the voice of the first user is input to the first device 1000. However, one or more exemplary embodiments are not limited thereto.

In operation S755, the first device 1000 may display a chat window including the arranged texts on a screen of the first device 1000. The first device 1000 may display the chat window on the screen of the first device 1000 while the first device 1000 performs the voice-message call. Also, the first device 1000 may display the chat window on the screen of the first device 1000 or may hide the chat window in the screen of the first device 1000, depending on a call mode of the voice-message call.

In operation S760, the second device 2000 may display a chat window including the arranged texts on a screen of the second device 2000. The second device 2000 may display the chat window on the screen of the second device 2000 while the second device 2000 performs the voice-message call. Also, the second device 2000 may display the chat window on the screen of the second device 2000 or may hide the chat window in the screen of the second device 2000, depending on a call mode of the voice-message call.

Figure 8:
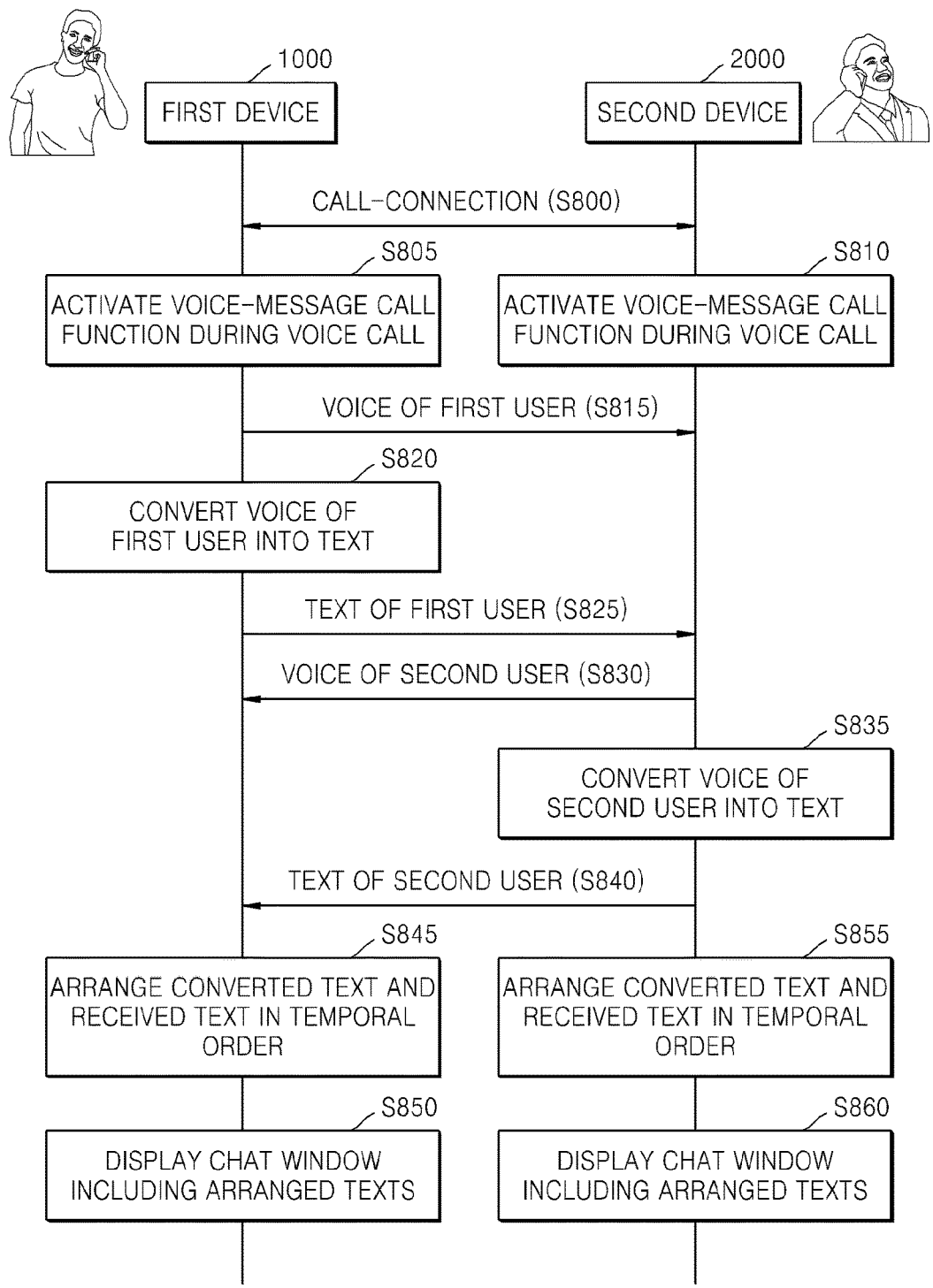
FIG. 8 is a flowchart of a method of performing a voice-message call in a mutual manner, the method performed by the first device and the second device, according to another exemplary embodiment.

FIG. 8 is a flowchart of a method of performing a voice-message call in a mutual manner, the method performed by the first device 1000 and the second device 2000, according to another exemplary embodiment. In the embodiment of FIG. 8, the first device 1000 may convert a voice of a first user into a text, and the second device 2000 may convert a voice of a second user into a text.

In operation S800, the first device 1000 and the second device 2000 are call-connected with each other.

In operation S805, the first device 1000 may activate a voice-message call function, and in operation S810, the second device 2000 may activate a voice-message call function. In the embodiment of FIG. 8, the first device 1000 and the second device 2000 activate the voice-message call functions, respectively, after the first device 1000 and the second device 2000 are call-connected with each other, but one or more exemplary embodiments are not limited thereto, as the devices 1000 and 2000 may automatically initiate voice-message call functions.

In operation S815, the first device 1000 may transmit the voice of the first user to the second device 2000. The first device 1000 may obtain the voice of the first user via a microphone in the first device 1000, and may transmit the obtained voice to the second device 2000.

In operation S820, the first device 1000 may convert the voice of the first user into a text. The first device 1000 may convert the voice of the first user into the text by using various STT techniques.

In operation S825, the first device 1000 may transmit the text of the first user to the second device 2000.

In operation S830, the second device 2000 may transmit the voice of the second user to the first device 1000. The second device 2000 may obtain the voice of the second user via a microphone in the second device 2000, and may transmit the obtained voice to the first device 1000.

In operation S835, the second device 2000 may convert the voice of the second user into a text. The second device 2000 may convert the voice of the second user into the text by using various the STT techniques.

In operation S840, the second device 2000 may transmit the text of the second user to the first device 1000.

In operation S845, the first device 1000 may arrange the converted text and the received text in a temporal order. For example, the first device 1000 may arrange the text that is converted by the first device 1000 from the voice of the first user and the text of the second user that is received from the second device 2000, in the temporal order.

In operation S850, the first device 1000 may display a chat window including the arranged texts on a screen of the first device 1000. The first device 1000 may display the chat window on the screen of the first device 1000 while the first device 1000 performs the voice-message call.

In operation S855, the second device 2000 may arrange the converted text and the received text in a temporal order. For example, the second device 2000 may arrange the text that is converted from the voice of the second user by the second device 2000 and the text of the first user that is received from the first device 1000, in the temporal order.

In operation S860, the second device 2000 may display a chat window including the arranged texts on a screen of the second device 2000. The second device 2000 may display the chat window on the screen of the second device 2000 while the second device 2000 performs the voice-message call.

Figure 9:
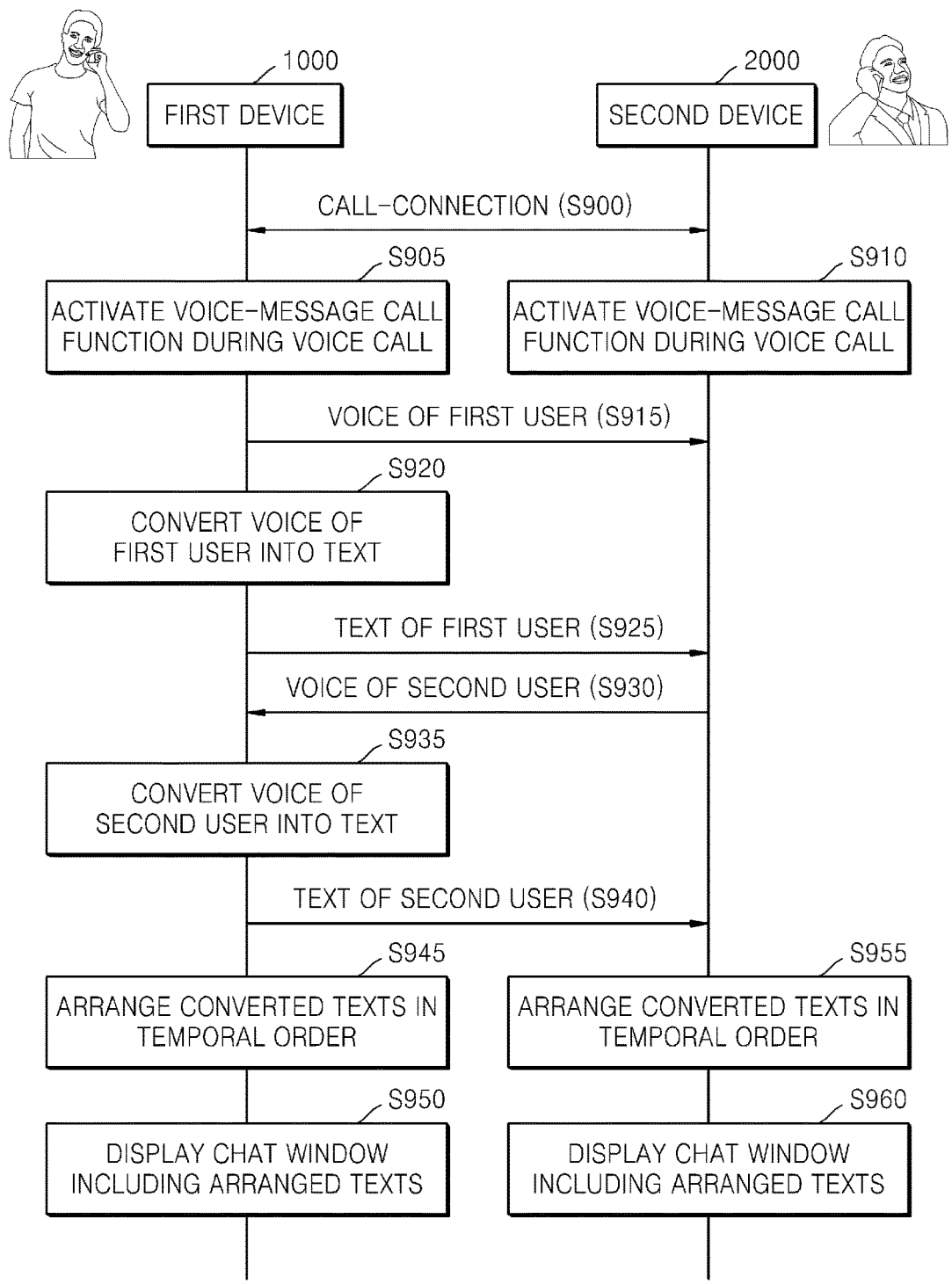
FIG. 9 is a flowchart of a method of performing a voice-message call in a mutual manner, the method performed by the first device and the second device, according to another exemplary embodiment.

FIG. 9 is a flowchart of a method of performing a voice-message call in a mutual manner, the method performed by the first device 1000 and the second device 2000, according to another exemplary embodiment. In the embodiment of FIG. 9, the first device 1000 may convert a voice of a first user and a voice of a second user into texts.

Operations S900 through S930 of FIG. 9 correspond to operations S800 through S830 of FIG. 8, thus, detailed descriptions thereof are omitted here.

In operation S935, the first device 1000 may convert the voice of the second user into the text. The first device 1000 may convert the voice of the second user into the text by using various STT techniques.

In operation S940, the first device 1000 may transmit the text of the second user to the second device 2000.

In operation S945, the first device 1000 may arrange the converted texts in a temporal order. For example, the first device 1000 may arrange the text that is converted by the first device 1000 from the voice of the first user and the text that is converted by the first device 1000 from the voice of the second user, in the temporal order.

In operation S950, the first device 1000 may display a chat window including the arranged texts on a screen of the first device 1000. The first device 1000 may display the chat window on the screen of the first device 1000 while the first device 1000 performs the voice-message call.

In operation S955, the second device 2000 may arrange the converted texts in a temporal order. The second device 2000 may arrange the text of the first user that is received from the first device 1000 and the text of the second user, in the temporal order.

In operation S960, the second device 2000 may display a chat window including the arranged texts on a screen of the second device 2000. The second device 2000 may display the chat window on the screen of the second device 2000 while the second device 2000 performs the voice-message call.

Figure 10:
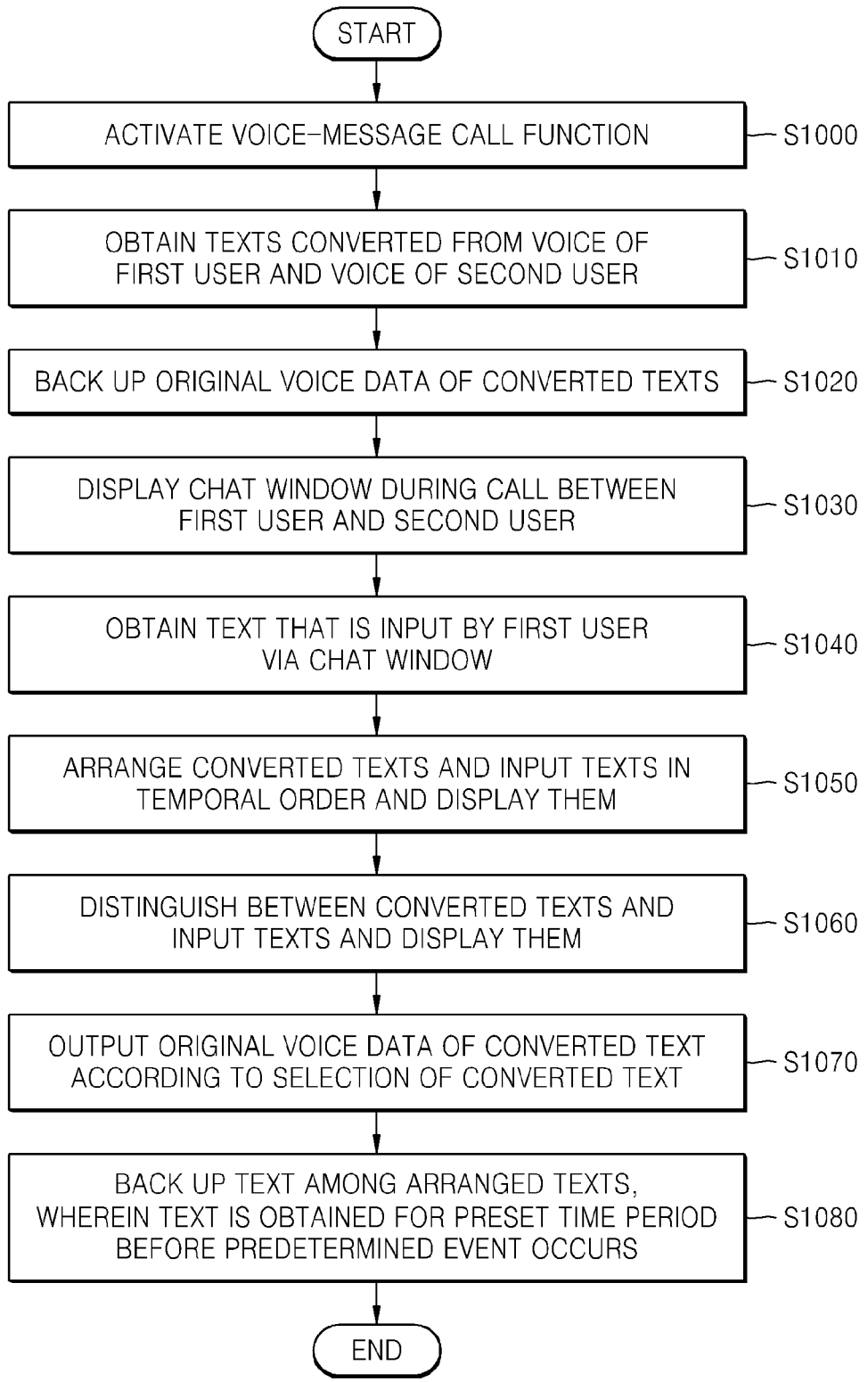
FIG. 10 is a flowchart of displaying a chat window during a voice-message call, the method performed by the first device, according to an exemplary embodiment.

FIG. 10 is a flowchart of displaying a chat window during a voice-message call, the method performed by the first device 1000, according to an exemplary embodiment.

In operation S1000, the first device 1000 may activate a voice-message call function. When the first device 1000 initiates a call to the second device 2000, the first device 1000 may activate the voice-message call function. Alternatively, when the first device 1000 receives a call from the second device 2000, the first device 1000 may activate the voice-message call function. Alternatively, while the first device 1000 performs a call with the second device 2000, the first device 1000 may activate the voice-message call function.

In operation S1010, the first device 1000 may obtain texts that are converted from a voice of a first user and a voice of a second user. The first device 1000 may convert a voice of a user of the first device 1000 into a text and thus may obtain the converted text. Also, the first device 1000 may receive a voice of a user of the second device 2000 from the second device 2000, may convert the received voice into a text, and thus may obtain the converted text. However, a method of obtaining a converted text, the method performed by the first device 1000, is not limited thereto. The voice of the user of the first device 1000 and the voice of the user of the second device 2000 may be converted into the texts by various devices or a server, and the first device 1000 may receive the converted texts from the various devices and the server. For example, the texts may be received from the device 2000 or the server, which may mediate a communication session between the first device 1000 and the second device 2000.

In operation S1020, the first device 1000 may back up original voice data of the converted texts. The first device 1000 may back up voice data of the first user that corresponds to the text that is converted from the voice of the first user. Also, the first device 1000 may back up voice data of the second user that corresponds to the text that is converted from the voice of the second user.

In operation S1030, the first device 1000 may display a chat window on a screen of the first device 1000 during a call between the first user and the second user. The first device 1000 may display the chat window on the screen of the first device 1000 to show contents of a conversation between the first user and the second user.

In operation S1040, the first device 1000 may obtain a text that is input by the first user via the chat window. Also, the first device 1000 may receive, from the second device 2000, a text that the second user inputs to the second device 2000 during the voice-message call.

In operation S1050, the first device 1000 may arrange the converted texts and the input texts in a temporal order and may display them in the chat window. The first device 1000 may arrange the converted texts and the input texts in the temporal order, based on input times of the voices and the texts. For example, the first device 1000 may arrange the converted texts and the input texts, based on a time when the first user inputs the voice into the first device 1000, a time when the second user inputs the voice into the second device 2000, a time when the first user inputs the text into the first device 1000, and a time when the second user inputs the text into the second device 2000.

In operation S1060, the first device 1000 may distinguish between the converted texts and the input texts and may display them. The first device 1000 may distinguish the text converted from the voice of the first user and the text converted from the voice of the second user from the text input by the first user and the text input by the second user, and may display them. In this regard, a user may distinguish text input by a user and voice input by a user that is converted into text form and displayed.

In order to distinctively display the converted texts, the first device 1000 may display a separate icon around the converted texts. Alternatively, the first device 1000 may distinctively display a color, a thickness, or a font of the converted texts. However, one or more exemplary embodiments are not limited thereto.

In operation S1070, when at least one converted text among the converted texts is selected, the first device 1000 may output original voice data of the selected converted text. When the converted text is selected in the chat window by the first user, the first device 1000 may extract the original voice data of the selected converted text from a memory, and may output the extracted original voice data via a speaker in the first device 1000.

In operation S1080, the first device 1000 may back up a text among the arranged texts, wherein the text is obtained for a preset time period before a predetermined event occurs. For example, the predetermined event may include an end of a call between the first device 1000 and the second device 2000, reception of a user input for a text backup, or the like. For one example, when the call between the first device 1000 and the second device 2000 ends, the first device 1000 may back up a text that is obtained by the first device 1000 for five minutes before the call ends. For another example, when the first device 1000 receives the user input for the text backup, the first device 1000 may back up a text that is obtained by the first device 1000 for three minutes before the user input is received. However, a type of the event and a time value that are set for the text backup are not limited thereto.

The first device 1000 may back up all of the arranged texts in a server 3000. In this case, the first device 1000 may back up some of the arranged texts in the first device 1000 and may back up all of the arranged texts in the server 3000. Alternatively, the first device 1000 may back up some of the arranged texts and all of the arranged texts in the server 3000.

Referring to FIG. 10, the first device 1000 backs up the text among the arranged texts, wherein the text is obtained for the preset time period before the predetermined event occurs, but one or more exemplary embodiments are not limited thereto. The first device 1000 may analyze a conversation between the users by performing various natural language-based analyzing methods on all of the arranged texts, and may extract a part from the arranged texts which indicates important contents of the conversation between the users. Also, the first device 1000 may back up a text indicating the extracted part of the conversation in the first device 1000.

Figure 11A:
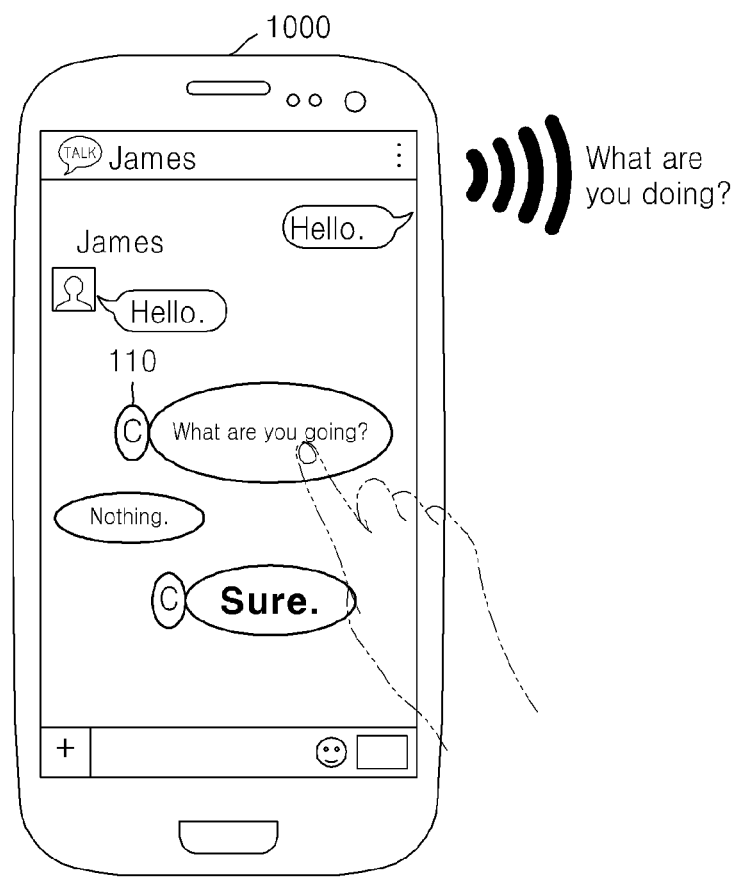
FIGS. 11A and 11B illustrate examples of a chat window that is displayed during a voice-message call, according to exemplary embodiments.
Figure 11B:
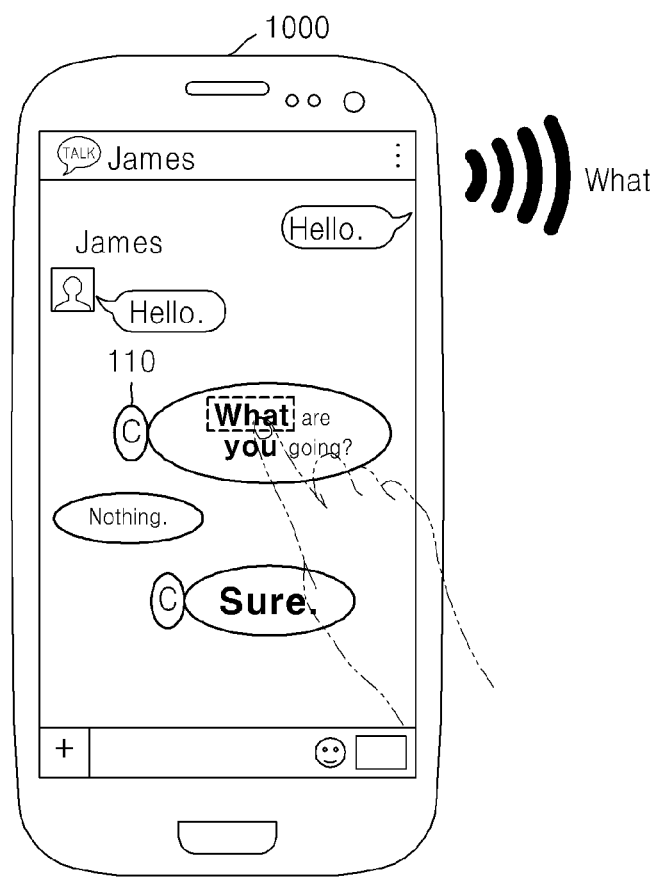

FIGS. 11A and 11B illustrate examples of a chat window that is displayed during a voice-message call, according to exemplary embodiments.

FIG. 11A indicates an example where a text that is converted from a voice is distinctively displayed in the chat window that is displayed during the voice-message call, according to an exemplary embodiment.

Referring to FIG. 11A, the chat window may be displayed on a screen of the first device 1000 during the voice-message call, and "Sure" and "What are you going?" that are texts converted from a voice of a user may be displayed in the chat window. Also, in order to indicate that "What are you going?" is the text that is converted from the voice, the first device 1000 may display an icon 110 around "What are you going?".

When a first user touches "What are you going?", the first device 1000 may output original voice data that corresponds to the touched text "What are you going?" via a speaker of the first device 1000. The first device 1000 may output the voice of the user who pronounces "What are you going?". In this regard, the original voice of the user may be buffered by the first device 1000, the second device 2000, or a server that mediates a connection between the devices. Accordingly, the buffered voice may be replayed upon request.

Accordingly, although a typographical error "going" exists in the text that is converted from the voice of the user, the user may listen to the original voice data of the converted text and thus may further correctly recognize contents of user conversation.

Also, the first device 1000 may indicate a level of reliability of conversion in relation to the text that is converted from the text. For example, when reliability of "Sure" is higher than reliability of "What are you going?", a size and a thickness of letters "Sure" may be greater than a size and a thickness of letters "What are you going?". However, one or more exemplary embodiments are not limited thereto, and thus, a color and a font of the letters "Sure" may be distinctively displayed. Also, a specific object that indicates a value of reliability may be displayed around the converted text.

FIG. 11B indicates an example where a text that is converted from a voice is distinctively displayed by a unit of a word in the chat window that is displayed during the voice-message call, according to an exemplary embodiment.

Referring to FIG. 11B, the first device 1000 may distinctively display reliability of "What are you going?" that is a text converted from a voice, by a unit of a word. For example, when reliability of "What" and "you" is higher than reliability of "are" and "going" in the text "What are you going?", a size and a thickness of letters "What" and "you" may be displayed greater than a size and a thickness of letters "are" and "going". However, one or more exemplary embodiments are not limited thereto, and thus, a color and a font of the letters "What" and "you" may be distinctively displayed.

Also, when a first user touches "What" of "What are you going?", the first device 1000 may output original voice data that corresponds to a touched word "What" via a speaker of the first device 1000. The first device 1000 may output a voice of a user who pronounces the word "What". Accordingly, a user may selectively request voice corresponding to a portion of a text message to be replayed.

Figure 12:
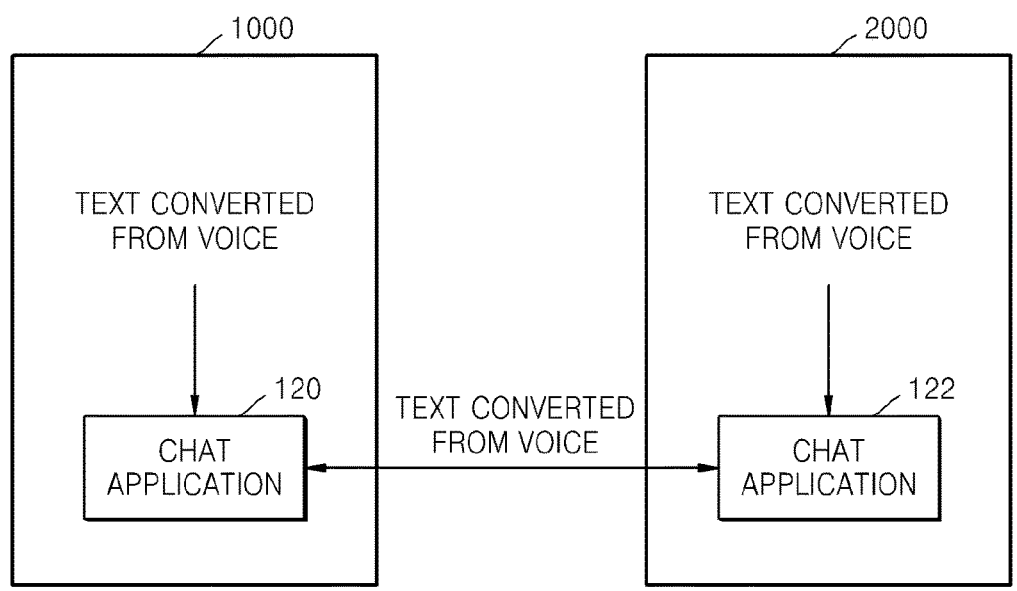
FIG. 12 illustrates an example where the first device and the second device exchange a text that is converted from a voice, via a specific chat application, according to an exemplary embodiment.

FIG. 12 illustrates an example where the first device 1000 and the second device 2000 exchange a text that is converted from a voice, via a specific chat application, according to an exemplary embodiment.

Referring to FIG. 12, a chat application 120 may be executed in the first device 1000, and a chat application 122 may be executed in the second device 2000. The chat application 120 and the chat application 122 may be same applications or may be compatible with each other.

Also, the first device 1000 may input a text that is converted from a voice and is obtained by the first device 1000 into the chat application 120, and may transmit the input text to the chat application 122 of the second device 2000 via the chat application 120.

Also, the second device 2000 may input a text that is converted from a voice and is obtained by the second device 2000 into the chat application 122, and may transmit the input text to the chat application 120 of the first device 1000 via the chat application 122.

Figure 13:
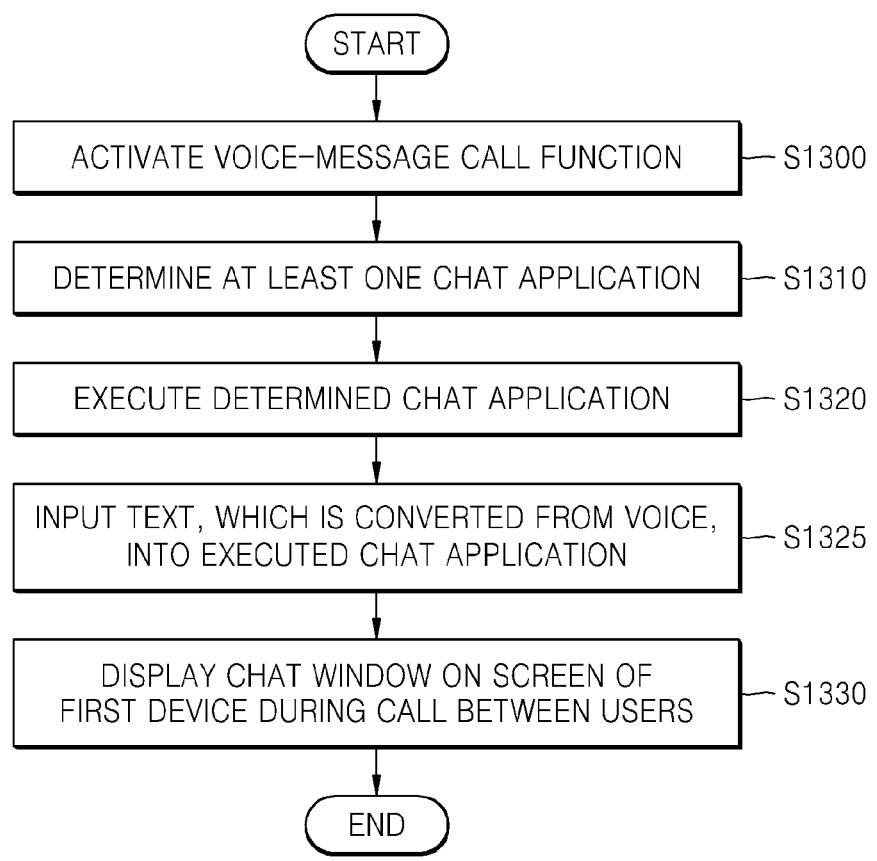
FIG. 13 is a flowchart of a method of determining a chat application to be executed by interoperating with a voice call when a voice-message call function is activated, the method performed by the first device, according to an exemplary embodiment.

FIG. 13 is a flowchart of a method of determining a chat application to be executed by interoperating with a voice call when a voice-message call function is activated, the method performed by the first device 1000, according to an exemplary embodiment.

In operation S1300, the first device 1000 may activate the voice-message call function. When the first device 1000 sends a request to initiate the call to the second device 2000, the first device 1000 may activate the voice-message call function. Alternatively, when the first device 1000 receives a call from the second device 2000, the first device 1000 may activate the voice-message call function. Alternatively, while the first device 1000 performs a call with the second device 2000, the first device 1000 may activate the voice-message call function.

In operation S1310, the first device 1000 may determine a chat application. The first device 1000 may determine the chat application to be used during a voice-message call. For one example, the first device 1000 may determine a chat application that is executable by interoperating with the voice-message call function of the first device 1000, as the chat application to be used during the voice-message call. For another example, the first device 1000 may determine a chat application that is installed in all of the first device 1000 and the second device 2000, as the chat application to be used during the voice-message call. However, one or more exemplary embodiments are not limited thereto. Alternatively, a user may select a chant application to be executed from among one or more chat applications when a call is initiated or a call request is received, as discussed below.

In operation S1320, the first device 1000 may execute the determined chat application, and in operation S1325, the first device 1000 may input a text, which is converted from a voice, into the executed chat application. For example, the first device 1000 may install a plug-in for a text automatic input in the executed chat application, and may input the text converted from the voice into the chat application via the installed plug-in. However, one or more exemplary embodiments are not limited thereto.

In operation S1330, the first device 1000 may display a chat window on a screen of the first device 1000 during a call between users. The first device 1000 may arrange, in the chat window, a text that is converted from a voice of the first user, a text that is input to the first device 1000 by the first user, a text that is converted from a voice of a second user, and a text that is input to the second device 2000 by the second user.

Also, the first device 1000 may display the chat window on the screen of the first device 1000 or may hide the chat window in the screen of the first device 1000, depending on a call mode of the voice-message call.

Figure 14:
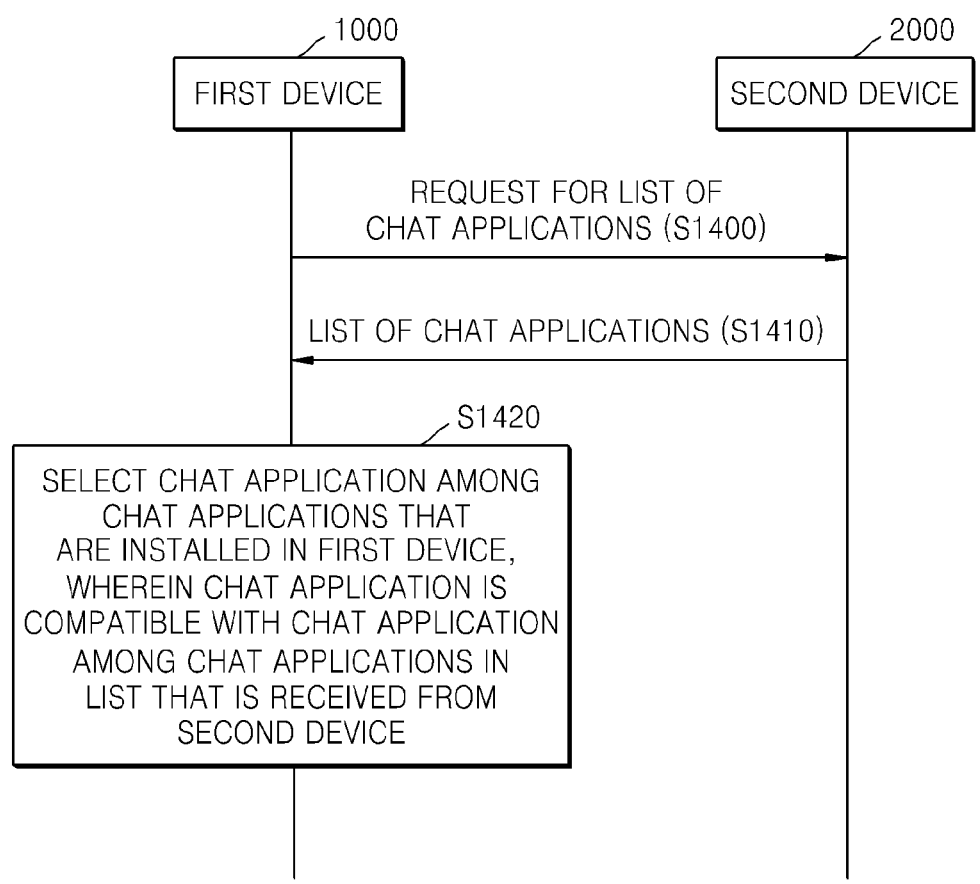
FIG. 14 is a flowchart of a method of determining a chat application to be used during a voice-message call, the method performed by the first device, according to an exemplary embodiment.

FIG. 14 is a flowchart of a method of determining a chat application to be used during a voice-message call, the method performed by the first device 1000, according to an exemplary embodiment.

In operation S1400, the first device 1000 may request the second device 2000 for a list of chat applications installed in the second device 2000, and in operation S1410, the second device 2000 may provide the list of the chat applications installed in the second device 2000 to the first device 1000.

In operation S1420, the first device 1000 may select a chat application among chat applications that are installed in the first device 1000, wherein the chat application is compatible with a chat application among the chat applications in the list that is received from the second device 2000.

For one example, a chat application that is compatible with a chat application 'A' may be a same chat application as the chat application 'A'. Also, for another example, the chat application that is compatible with the chat application 'A' may be chat application that is different from the chat application 'A' but is capable of exchanging a message with the chat application 'A'.

Referring to FIG. 14, the first device 1000 requests the second device 2000 for the list of the chat applications and thus receives the list of the chat applications from the second device 2000, but one or more exemplary embodiments are not limited thereto. When the first device 1000 and the second device 2000 are connected for a voice-message call, the first device 1000 may receive the list of the chat applications from the second device 2000 without a separate request.

Figure 15:
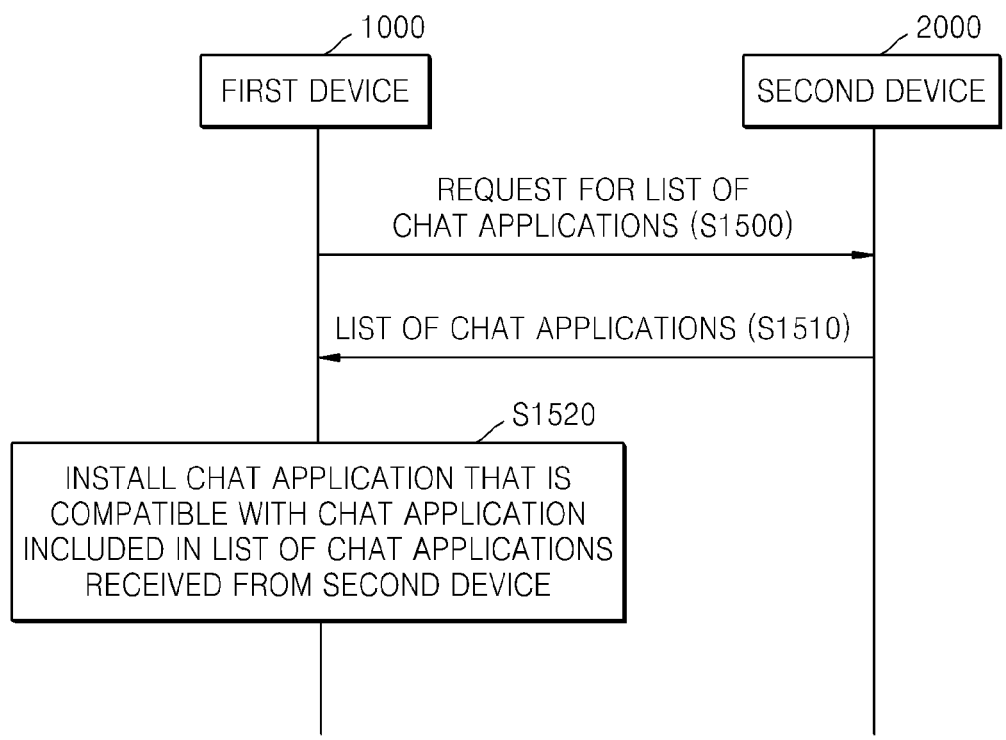
FIG. 15 is a flowchart of a method of installing a chat application to be used during a voice-message call, the method performed by the first device, according to an exemplary embodiment.

FIG. 15 is a flowchart of a method of installing a chat application to be used during a voice-message call, the method performed by the first device 1000, according to an exemplary embodiment.

In operation S1500, the first device 1000 may request the second device 2000 for a list of chat applications installed in the second device 2000, and in operation S1510, the second device 2000 may provide the list of the chat applications installed in the second device 2000 to the first device 1000.

In operation S1520, the first device 1000 may install a chat application that is compatible with a chat application included in the list of the chat applications received from the second device 2000. The first device 1000 may select the chat application that is compatible with the chat application included in the list of the chat applications received from the second device 2000, and may download the selected chat application from a predetermined server or the second device 2000. Also, the first device 1000 may install the downloaded chat application in the first device 1000.

Referring to FIG. 15, the first device 1000 requests the second device 2000 for the list of the chat applications and thus receives the list of the chat applications from the second device 2000, but one or more exemplary embodiments are not limited thereto. When the first device 1000 and the second device 2000 are connected for a voice-message call, the first device 1000 may receive the list of the chat applications from the second device 2000 without a separate request.

Figure 16A:
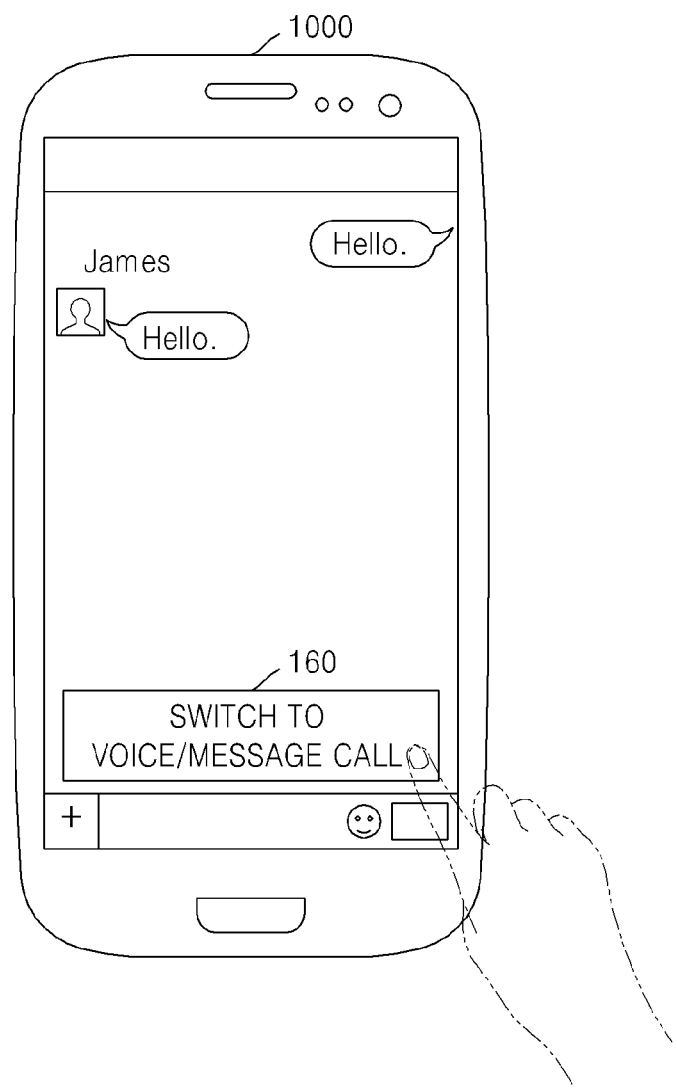
FIG. 16A illustrates an example where the first device activates a voice-message call function while the first device uses a chat service, according to an exemplary embodiment.

FIG. 16A illustrates an example where the first device 1000 activates a voice-message call function while the first device 1000 uses a chat service, according to an exemplary embodiment.

Referring to FIG. 16A, the first device 1000 may execute a chat application and may use a predetermined chat service. Also, when a first user selects a button 160 displayed on an execution screen of the chat application, the first device 1000 may activate the voice-message call function.

Figure 16B:
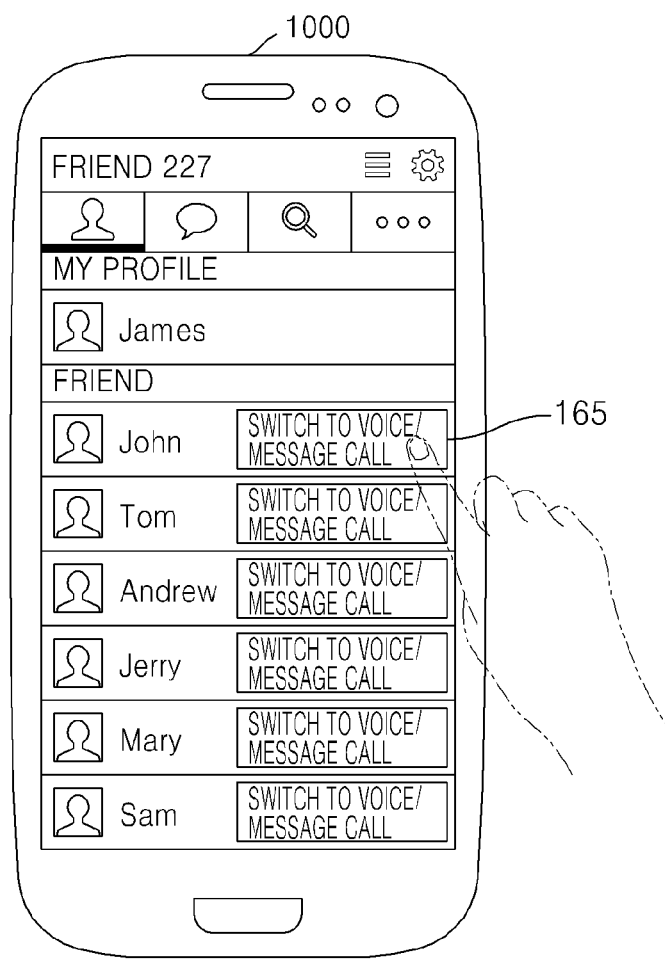
FIG. 16B illustrates an example where the first device initiates a voice-message call, according to a user input via a screen of a users list of a chat application, according to an exemplary embodiment.

FIG. 16B illustrates an example where the first device 1000 initiates a voice-message call, according to a user input via a screen of a users list of a chat application, according to an exemplary embodiment.

Referring to FIG. 16B, the first device 1000 may execute the chat application and may display the users list of the chat application. Also, the first device 1000 may receive a user input of selecting a button 165 for a voice call with "John" in the users list. Accordingly, the first device 1000 may initiate a voice-message call with a John's device.

Figure 17:
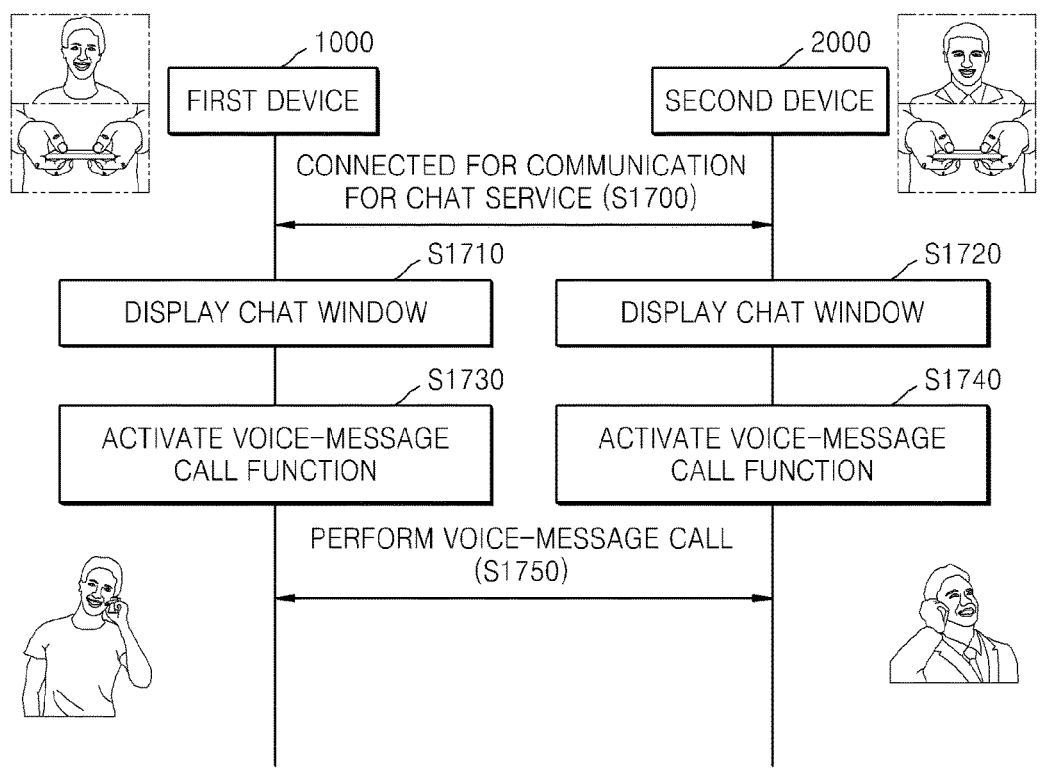
FIG. 17 is a flowchart of a method of performing a voice-message call while the first device and the second device use a chat service, the method performed by the first device and the second device, according to an exemplary embodiment.

FIG. 17 is a flowchart of a method of performing a voice-message call while the first device 1000 and the second device 2000 use a chat service, the method performed by the first device 1000 and the second device 2000, according to an exemplary embodiment.

In operation S1700, the first device 1000 and the second device 2000 are connected with each other for communication for a chat service. Also, in operation S1710, the first device 1000 may display a chat window on a screen of the first device 1000, and in operation S1720, the second device 2000 may display a chat window on a screen of the second device 2000. Afterward, the first device 1000 and the second device 2000 may exchange a message.

In operation S1730, the first device 1000 may activate a voice-message call function, and in operation S1740, the second device 2000 may activate a voice-message call function.

Also, in operation S1750, the first device 1000 and the second device 2000 may perform a voice-message call with each other.

FIGS. 18 through 21 illustrate examples where a call mode is changed during a voice-message call, according to exemplary embodiments.

The call mode of the voice-message call may include a voice mode and a text mode. The voice mode may indicate a mode during which a user may perform a voice call with another user, and the text mode may indicate a mode during which the user may communicate with the other user via an exchange of a text message.

Figure 18:
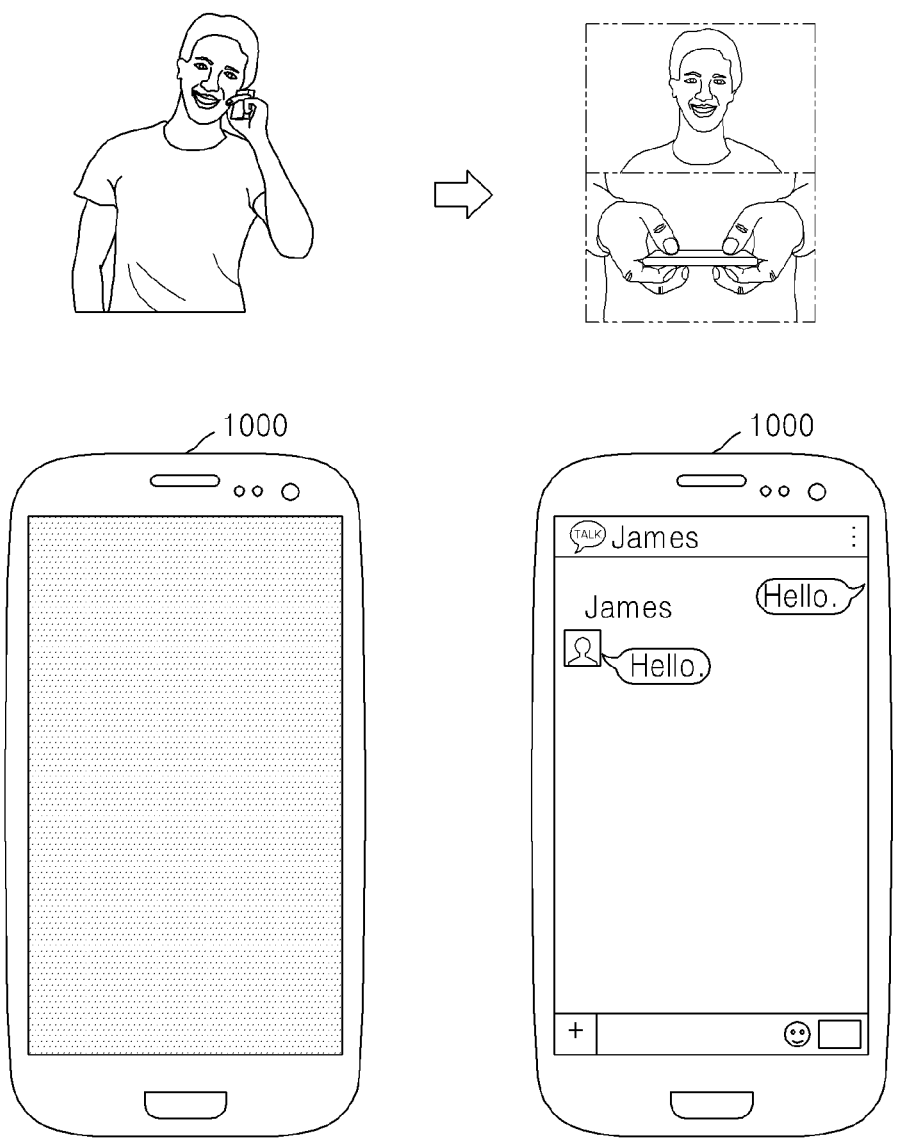
FIGS. 18 through 21 illustrate examples where a call mode is changed during a voice-message call, according to exemplary embodiments.

FIG. 18 illustrates an example where the first device 1000 automatically switches the call mode from the voice mode to the text mode during the voice-message call, according to an exemplary embodiment.

Referring to FIG. 18, when the first device 1000 is adjacent to a user's face, the first device 1000 may deactivate a screen of the first device 1000 and may operate in the voice mode. Afterward, when the first device 1000 is distant from the user's face, the first device 1000 may switch the call mode from the voice mode to the text mode and may display a chat window on the screen of the first device 1000. The first device 1000 may automatically detect orientation and position of the first device, and switch between the voice mode and the text mode as necessary.

Figure 19:
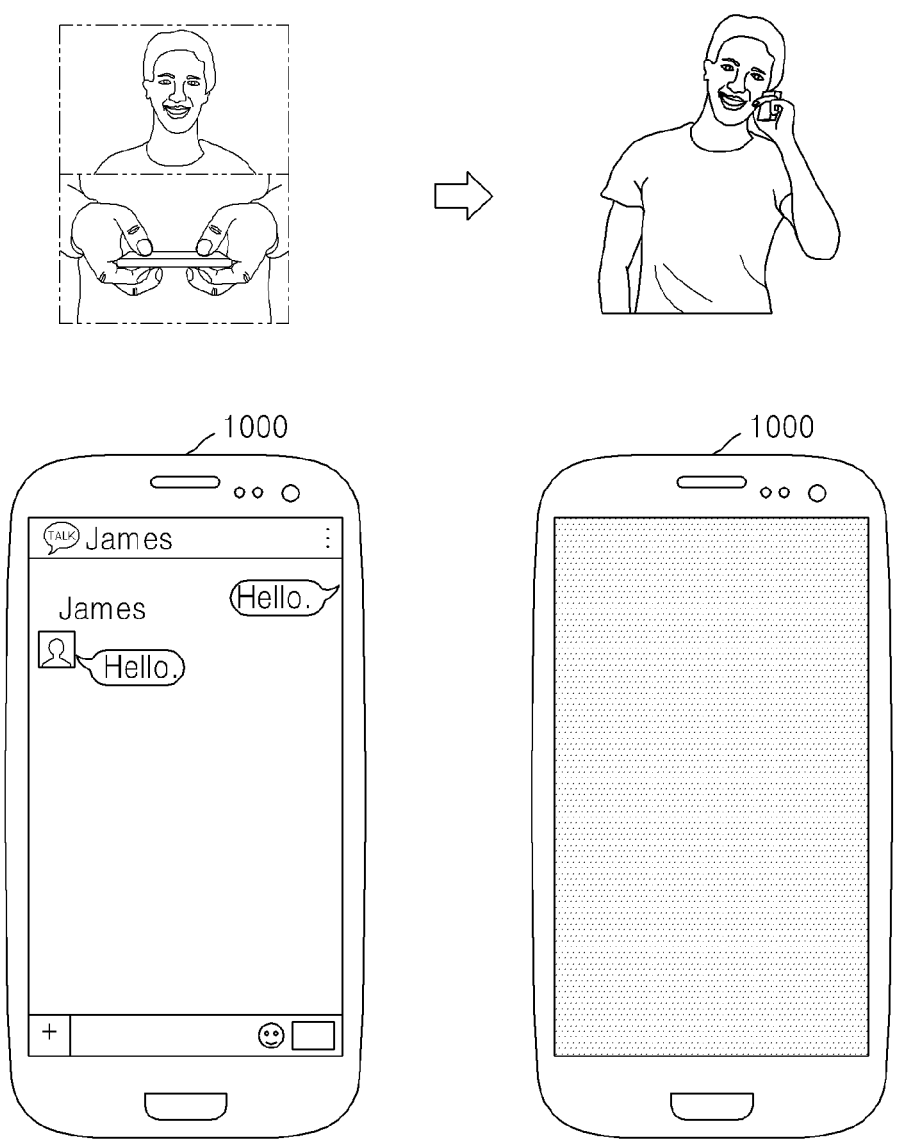

FIG. 19 illustrates an example where the first device 1000 automatically switches the call mode from the text mode to the voice mode during the voice-message call, according to an exemplary embodiment.

Referring to FIG. 19, when the first device 1000 is distant from a user's face, the first device 1000 may display a chat window on a screen of the first device 1000 and may operate in the text mode. Afterward, when the first device 1000 approaches the user's face, the first device 1000 may switch the call mode from the text mode to the voice mode and may deactivate the screen of the first device 1000. Again, the first device 1000 may automatically detect orientation and position of the first device, and switch between the voice mode and the text mode as necessary.

Figure 20:
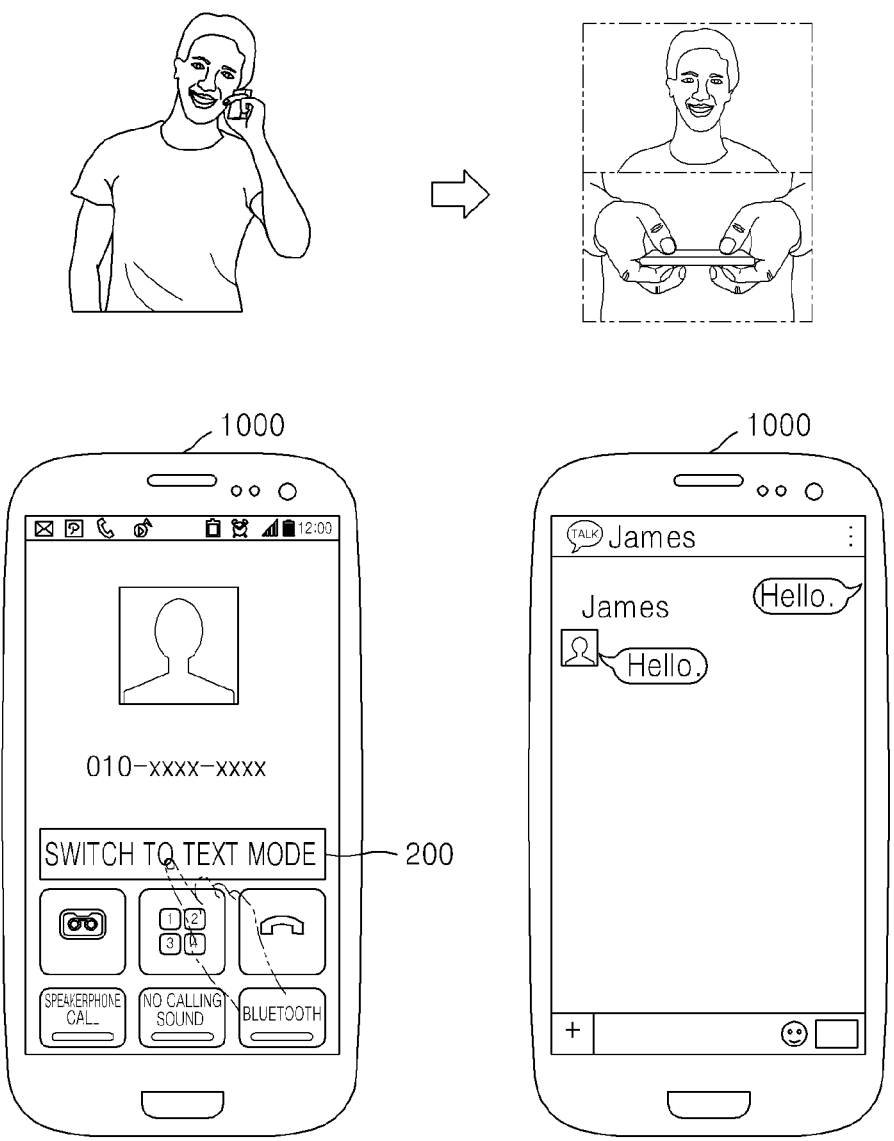

FIG. 20 illustrates an example where the first device 1000 manually switches the call mode from the voice mode to the text mode during the voice-message call, according to an exemplary embodiment.

Referring to FIG. 20, while the first device 1000 operates in the voice mode, when a first user selects a button 200 displayed on a screen of the first device 1000, the first device 1000 may switch the call mode from the voice mode to the text mode and may display a chat window on the screen of the first device 1000.

Figure 21:
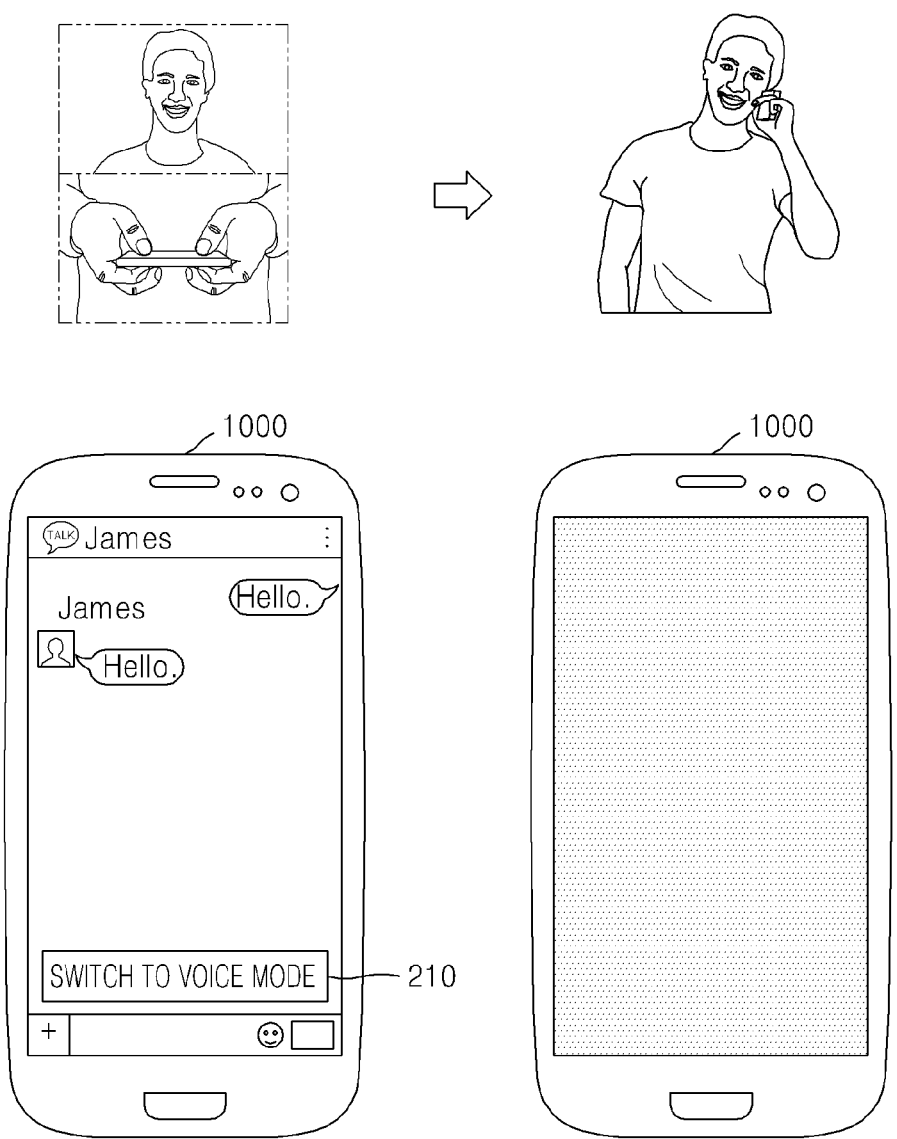

FIG. 21 illustrates an example where the first device 1000 manually switches the call mode from the text mode to the voice mode during the voice-message call, according to an exemplary embodiment.

Referring to FIG. 21, while the first device 1000 operates in the text mode, when a first user selects a button 210 displayed on a screen of the first device 1000, the first device 1000 may switch the call mode from the text mode to the voice mode and may inactivate the screen of the first device 1000.

Figure 22:
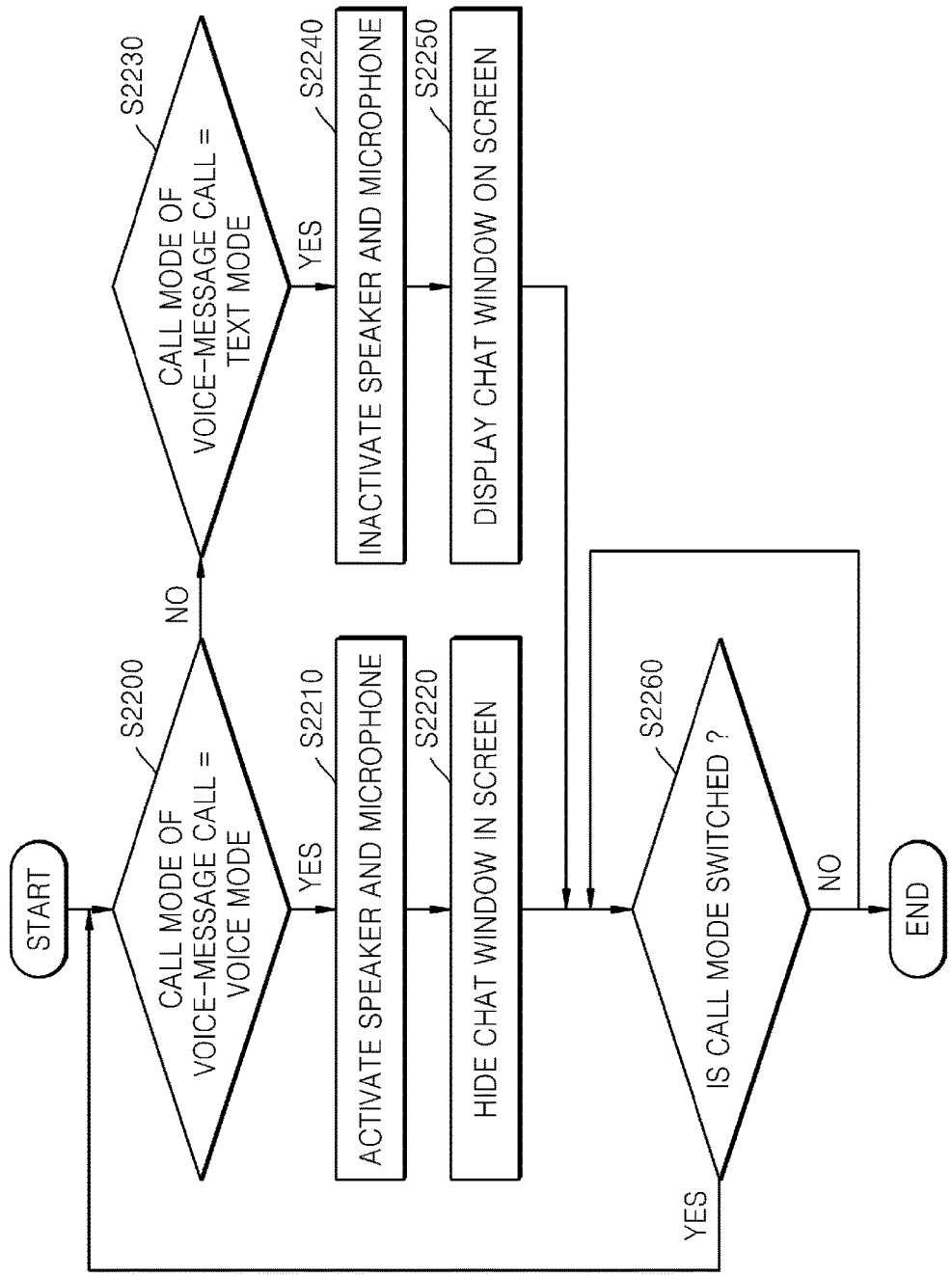
FIG. 22 is a flowchart of a method of switching a mode of a voice-message call, the method performed by the first device, according to an exemplary embodiment.

FIG. 22 is a flowchart of a method of switching a mode of a voice-message call, the method performed by the first device 1000, according to an exemplary embodiment.

In operation S2200, the first device 1000 may determine whether a call mode of the voice-message call is a voice mode. For one example, the first device 1000 may determine whether the first device 1000 is adjacent to a face of a first user by using a proximity sensor in the first device 1000, and thus may determine whether the call mode is the voice mode. For another example, the first device 1000 may determine whether a button for switching to the voice mode is selected by the first user, and thus may determine whether the call mode is the voice mode.

As a result of the determination in operation S2200, when the first device 1000 determines that the call mode is the voice mode, in operation S2210, the first device 1000 may activate a speaker and a microphone. Accordingly, the first device 1000 may obtain a voice of the first user via the activated microphone, and may output a voice of a second user via the activated speaker.

In operation S2220, the first device 1000 hides a chat window in a screen of the first device 1000. For example, the first device 1000 may hide the chat window in the screen of the first device 1000 by deactivating the screen of the first device 1000. Though the screen is deactivated, the first device 1000 may still buffer text equivalents of the voice conversation, in event the voice mode is switched to the text mode. The text equivalents may be buffered at the first device 1000, second device 2000, or a server.

As a result of the determination in operation S2200, if the call mode is not the voice mode, in operation S2230, the first device 1000 may determine whether the call mode of the voice-message call is a text mode. For one example, the first device 1000 may determine whether the first device 1000 is distant from the face of the first user by using the proximity sensor in the first device 1000, and thus may determine whether the call mode is the text mode. For another example, the first device 1000 may determine whether a button for switching to the text mode is selected by the first user, and thus may determine whether the call mode is the text mode.

As a result of the determination in operation S2230, when the first device 1000 determines that the call mode is the text mode, in operation S2240, the first device 1000 may activate the speaker and the microphone.

In operation S2250, the first device 1000 may display the chat window on the screen of the first device 1000. Also, the first device 1000 may display, in the chat window, a text that is input by the first user via the chat window. Also, the first device 1000 may display, in the chat window, a text that is converted from the voice of the second user and a text that is input to the second device 2000 by the second user.

In operation S2260, the first device 1000 may determine whether the call mode is switched. In operation S2260, if the first device 1000 determines that the call mode is switched, the first device 1000 may perform operation S2200.

Figure 23:
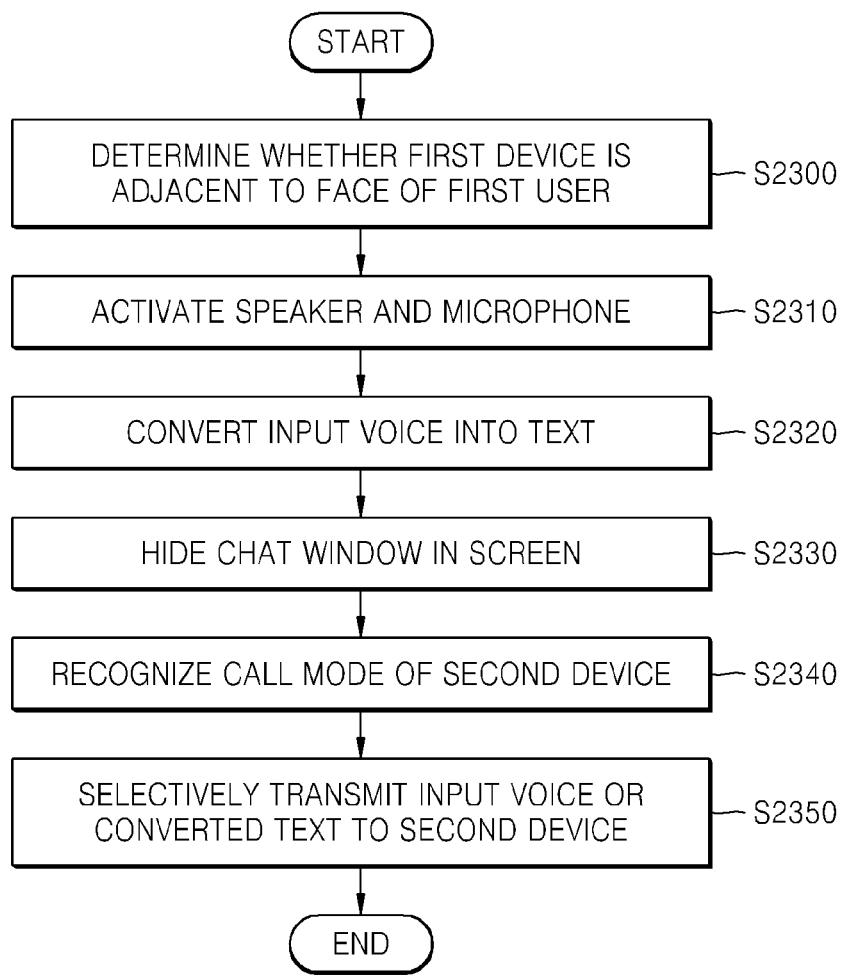
FIG. 23 is a flowchart of a method of performing a voice-message call during a voice mode, the method performed by the first device, according to an exemplary embodiment.

FIG. 23 is a flowchart of a method of performing a voice-message call during a voice mode, the method performed by the first device 1000, according to an exemplary embodiment.

In operation S2300, the first device 1000 may determine whether the first device 1000 is adjacent to a face of a first user. The first device 1000 may determine whether the first device 1000 is adjacent to the face of the first user by using a proximity sensor included in the first device 1000.

In operation S2310, the first device 1000 may activate a speaker and a microphone. The first device 1000 may determine that a call mode of the voice-message call is a voice mode, and thus may activate the speaker and the microphone in the first device 1000. Accordingly, the first device 1000 may receive an input of a voice of the first user via the microphone, and may output a voice of a second user via the speaker.

In operation S2320, the first device 1000 may convert the voice that is input from the first user into a text. The first device 1000 may convert the voice of the first user into the text by using various STT techniques.

In operation S2330, the first device 1000 hides a chat window in a screen of the first device 1000. The first device 1000 may hide the chat window in the screen of the first device 1000 by deactivating the screen of the first device 1000.

In operation S2340, the first device 100 may recognize a call mode of the second device 2000. The second device 2000 may transmit information indicating the call mode of the second device 2000 to the first device 1000, and the first device 1000 may recognize the call mode of the second device 2000, based on the information indicating the call mode that is received from the second device 2000.

In operation S2350, the first device 1000 may selectively transmit, to the second device 2000, at least one of the voice that is input by the first user and the text that is converted from the voice input by the first user. For one example, when the call mode of the second device 2000 is a voice mode, the first device 1000 may transmit the voice that is input by the first user to the second device 2000. For another example, when the call mode of the second device 2000 is a text mode, the first device 1000 may transmit, to the second device 2000, the text that is converted from the voice input by the first user. However, one or more exemplary embodiments are not limited thereto.

Figure 24:
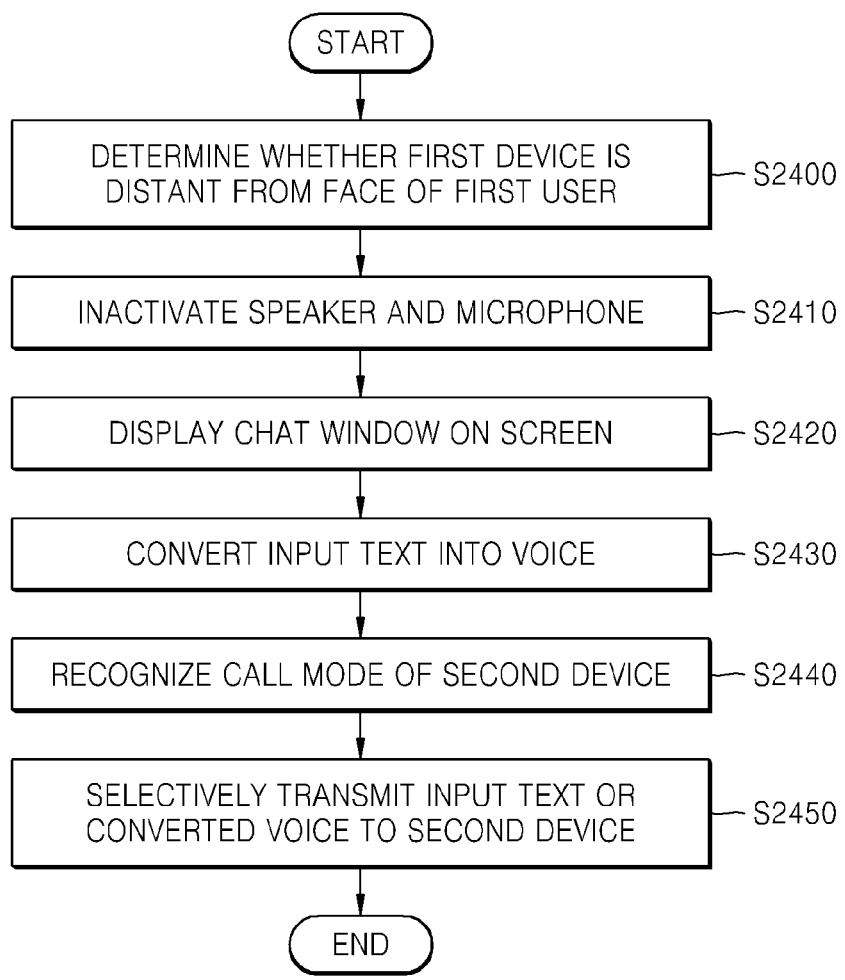
FIG. 24 is a flowchart of a method of performing a voice-message call during a text mode, the method performed by the first device, according to an exemplary embodiment.

FIG. 24 is a flowchart of a method of performing a voice-message call during a text mode, the method performed by the first device 1000, according to an exemplary embodiment.

In operation S2400, the first device 1000 may determine whether the first device 1000 is distant from a face of a first user. The first device 1000 may determine whether the first device 1000 is distant from the face of the first user by using a proximity sensor included in the first device 1000.

In operation S2410, the first device 1000 may inactivate a speaker and a microphone. The first device 1000 may determine that a call mode of the voice-message call is a text mode, and thus may deactivate the speaker and the microphone.

In operation S2420, the first device 1000 may display a chat window on a screen of the first device 1000. The first device 1000 may display, on the screen of the first device 1000, the chat window that shows a conversation between the first user and the second user.

In operation S2430, the first device 1000 may convert a text that is input by the first user into a voice. The first device 1000 may convert the text of the first user into the voice by using various Text-To-Speech (TTS) techniques. In this case, the first device 1000 may determine a tone of the converted voice of the first user, in consideration of a gender, an age, etc. of the first user.

In operation S2440, the first device 1000 may recognize a call mode of the second device 2000. The second device 2000 may transmit information indicating the call mode of the second device 2000 to the first device 1000, and the first device 1000 may recognize the call mode of the second device 2000, based on the information indicating the call mode that is received from the second device 2000.

In operation S2450, the first device 1000 may selectively transmit, to the second device 2000, at least one of the text that is input by the first user and the voice that is converted from the text input by the first user. For one example, when the call mode of the second device 2000 is a voice mode, the first device 1000 may transmit the voice that is converted from the text input by the first user to the second device 2000. For another example, when the call mode of the second device 2000 is a text mode, the first device 1000 may transmit the text that is input by the first user to the second device 2000. However, one or more exemplary embodiments are not limited thereto.

Figure 25:
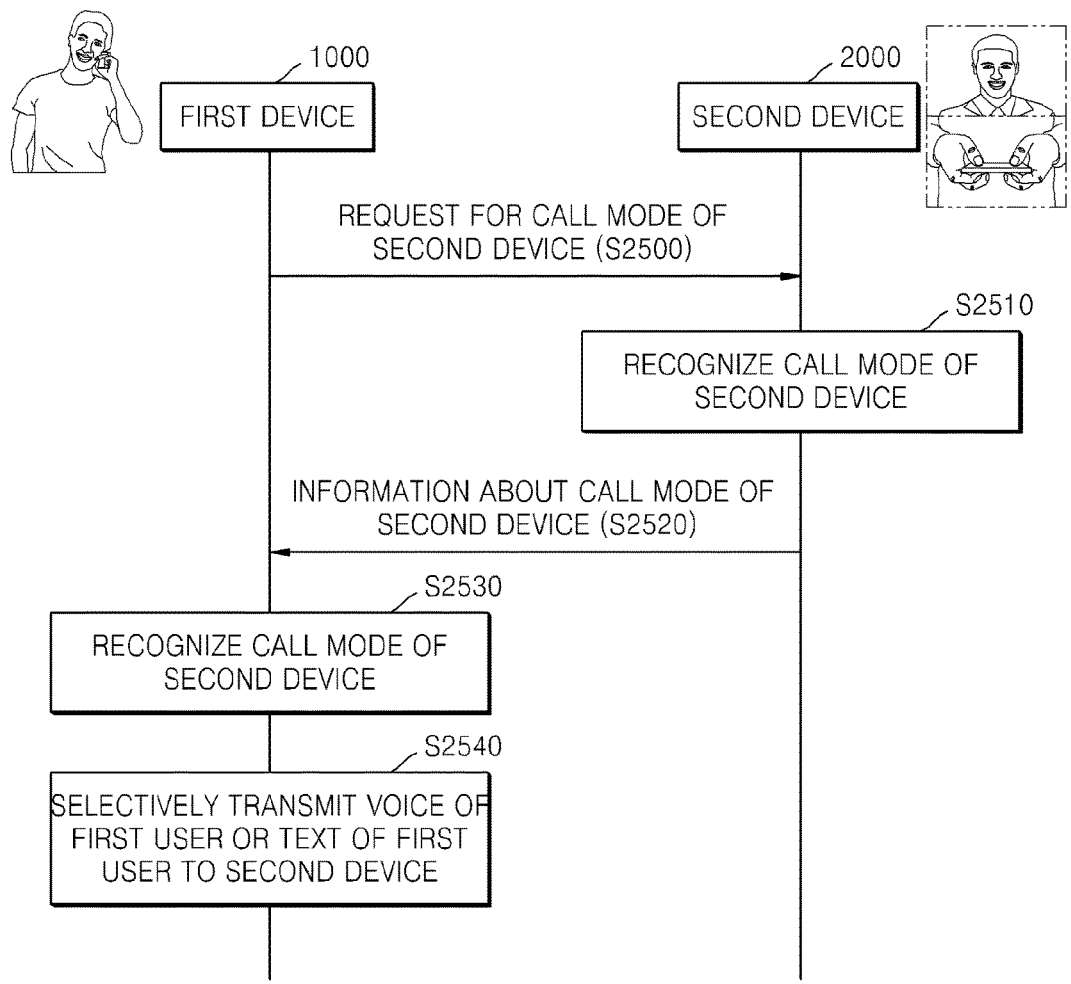
FIG. 25 is a flowchart of a method of recognizing a call mode of the second device, the method performed by the first device, according to an exemplary embodiment.

FIG. 25 is a flowchart of a method of recognizing a call mode of the second device 2000, the method performed by the first device 1000, according to an exemplary embodiment.

In operation S2500, the first device 1000 may request the second device 2000 for the call mode of the second device 2000. The first device 1000 may periodically request the second device 2000 for the call mode of the second device 2000, but one or more exemplary embodiments are not limited thereto. Alternatively, the first device 1000 may automatically request the second device 2000 for the call mode upon initiation of a call.

Also, in operation S2510, the second device 2000 may recognize its call mode, and in operation S2520, the second device 2000 may transmit information about the call mode of the second device 2000 to the first device 1000.

Referring to FIG. 25, the second device 2000 transmits the information about the call mode of the second device 2000, in response to the request by the first device 1000, but one or more exemplary embodiments are not limited thereto. For example, although the second device 2000 does not receive the request from the first device 1000, when the call mode of the second device 2000 is changed, the second device 2000 may transmit information about the changed call mode of the second device 2000 to the first device 1000.

In operation S2530, the first device 1000 may recognize the call mode of the second device 2000. The first device 1000 may recognize whether the call mode of the second device 2000 is a voice mode or a text mode, based on the information about the call mode of the second device 2000 which is received from the second device 2000.

In operation S2540, the first device 1000 may selectively transmit a voice of a first user or a text of the first user to the second device 2000. For one example, when the call mode of the second device 2000 is the voice mode, the first device 1000 may transmit the voice of the first user to the second device 2000. For another example, when the call mode of the second device 2000 is the text mode, the first device 1000 may transmit the text of the first user to the second device 2000.

FIG. 26 is a flowchart of a method of performing a voice-message call, the method performed by the first device 1000 that operates in a voice mode and the second device 2000 that operates in a text mode, according to an exemplary embodiment. In the embodiment of FIG. 26, the first device 1000 may convert a voice of a first user into a text, and the second device 2000 may convert a text of a second user into a voice.

In operation S2600, the first device 1000 and the second device 2000 are call-connected with each other. The first device 1000 may transmit a request for call-connection to the second device 2000 or may receive a call for call-connection from the second device 2000, so that the first device 1000 may be call-connected with the second device 2000.

In operation S2605, the first device 1000 may activate a voice-message call function. The first device 1000 may activate the voice-message call function, based on a user input. In operation S2605, the first device 1000 activates the voice-message call function after the first device 1000 is call-connected with the second device 2000. However, one or more exemplary embodiments are not limited thereto. For example, the first device 1000 may activate the voice-message call function when the first device 1000 sends a call or receives a call, or while the first device 1000 performs a call.

In operation S2610, the second device 2000 may activate a voice-message call function. The second device 2000 may activate the voice-message call function, based on a user input. In operation S2610, the second device 2000 activates the voice-message call function after the second device 2000 is call-connected with the first device 1000. However, one or more exemplary embodiments are not limited thereto. For example, the second device 2000 may activate the voice-message call function when the second device 2000 sends a call or receives a call, or while the second device 2000 performs a call.

In operation S2615, the first device 1000 may operate in the voice mode. When the first device 1000 approaches a face of the first user or receives a user input of allowing the first device 1000 to operate in the voice mode, the first device 1000 may operate in the voice mode.

In operation S2620, the first device 1000 may activate a microphone and a speaker in the first device 1000, and may hide a chat window for showing a conversation between the first user and the second user in a screen of the first device 1000.

In operation S2625, the second device 2000 may operate in the text mode. When the second device 2000 is distant from a face of the second user or receives a user input of allowing the second device 2000 to operate in the text mode, the second device 2000 may operate in the text mode.

In operation S2630, the second device 2000 may deactivate a speaker and a microphone in the second device 2000, and may display a chat window for showing a conversation between the first user and the second user on a screen of the second device 2000.

In operation S2635, the first device 1000 may receive an input of the voice of the first user, and in operation S2640, the first device 1000 may convert the voice of the first user into a text.

In operation S2645, the first device 1000 may transmit, to the second device 2000, the text that is converted from the voice of the first user. The first device 1000 may recognize that the second device 2000 operates in the text mode, and may transmit the text that is converted from the voice of the first user to the second device 2000.

In operation S2650, the second device 2000 may display the chat window for showing the conversation between the first user and the second user on the screen of the second device 2000, and in operation S2655, the second device 2000 may receive a text input by the second user via the chat window. Also, the second device 2000 may arrange the text received from the first device 1000 and the text input to the second device 2000 in a temporal order and may display the texts in the chat window.

In operation S2660, the second device 2000 may convert the text of the second user into a voice using text-to-speech (TTS). The second device 2000 may determine a tone of the voice that is converted from the text of the second user, in consideration of an age and a gender of the second user.

In operation S2665, the second device 2000 may transmit, to the first device 1000, the voice that is converted from the text of the second user, and the text of the second user.

In operation S2670, the first device 1000 may output the voice that is converted from the text of the second user, via the speaker of the first device 1000.

FIG. 27 is a flowchart of a method of performing a voice-message call, the method performed by the first device 1000 that operates in a voice mode and the second device 2000 that operates in a text mode, according to an exemplary embodiment. In the embodiment of FIG. 27, the first device 1000 may convert a voice of a first user into a text, and may convert a text of a second user into a voice. Accordingly, the first user may operate in the voice mode, while the second user may operate in the text mode.

Because operations S2700 through S2755 of FIG. 27 correspond to operations S2600 through S2655 of FIG. 26, descriptions about operations S2700 through S2755 are omitted here.

In operation S2760, the second device 2000 may transmit a text that is input by the second user (i.e., the text of the second user) to the first device 1000.

In operation S2765, the first device 1000 may convert the text of the second user into a voice. The first device 1000 may convert the text of the second user into a voice of the second user by using various TTS techniques. Also, the first device 1000 may previously obtain user information about a gender, an age, etc., of the second user, and may determine a tone of the voice that is converted from the text of the second user, in consideration of the gender, the age, etc., of the second user.

In operation S2770, the first device 1000 may output the voice that is converted from the text of the second user, via a speaker of the first device 1000. Accordingly, the second user may operate in the text mode, while the first user may operate in the voice mode.

FIG. 28 is a flowchart of a method of performing a voice-message call, the method performed by the first device 1000 that operates in a voice mode and the second device 2000 that operates in a text mode, according to an exemplary embodiment. In the embodiment of FIG. 28, the second device 2000 may convert a voice of a first user into a text, and may convert a text of a second user into a voice.

Since operations S2800 through S2835 of FIG. 28 correspond to operations S2700 through S2735 of FIG. 27, descriptions about operations S2700 through S2735 are omitted here.

In operation S2840, the first device 1000 may transmit the voice of the first user to the second device 2000.

In operation S2845, the second device 2000 may convert the voice of the first user into a text, and in operation S2850, the second device 2000 may display a text indicating a conversation between the first user and the second user in the chat window. Accordingly, the first user may operate in the voice mode and the second user may operate in the text mode.

In operation S2855, the second device 2000 may receive a text input by the second user via the chat window, and in operation S2860, the second device 2000 may convert the text that is input by the second user (i.e., the text of the second user) into a voice. For example, the second device 2000 may determine a tone of the converted voice, in consideration of a gender and an age of the second user.

In operation S2865, the second device 2000 may transmit, to the first device 1000, the voice that is converted from the text of the second user, the text that is converted from the voice of the first user, and the text of the second user.

In operation S2870, the first device 1000 may output the voice that is converted from the text of the second user, via a speaker of the first device 1000. Accordingly, the first user may operate in the voice mode and the second user may operate in the text mode.

Figure 29A:
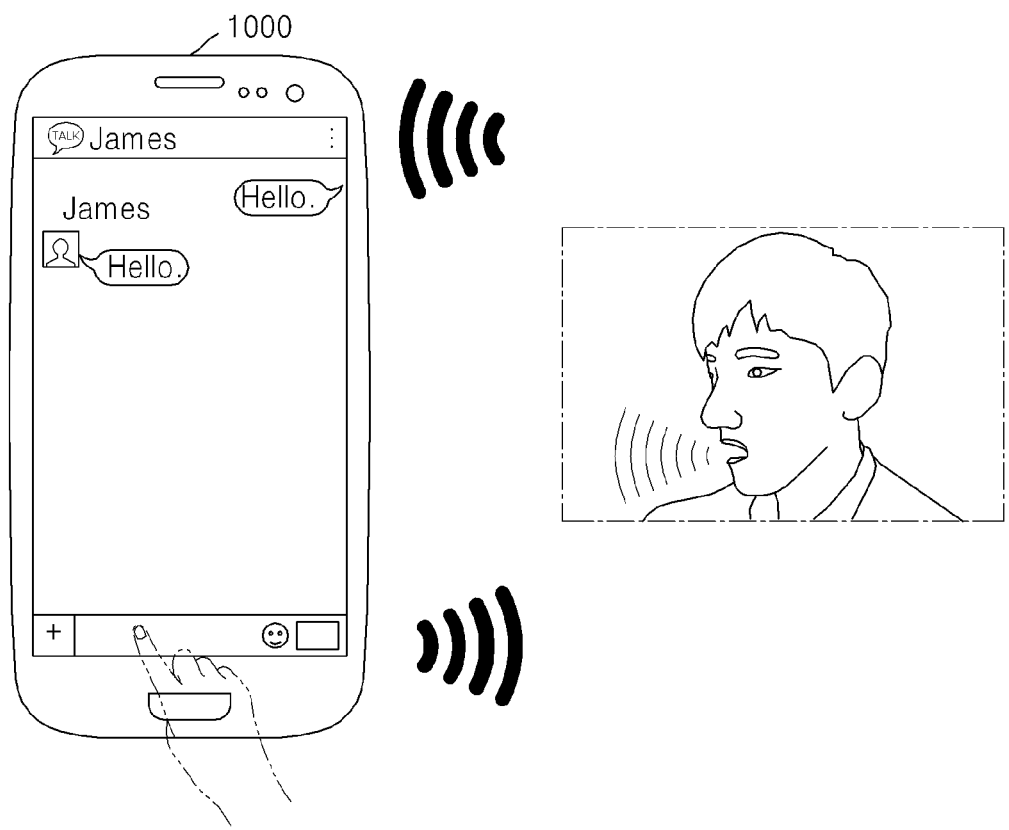
FIGS. 29A, 29B, and 29C illustrate examples of a combination mode that is one of call modes of a voice-message call, according to exemplary embodiments.
Figure 29B:
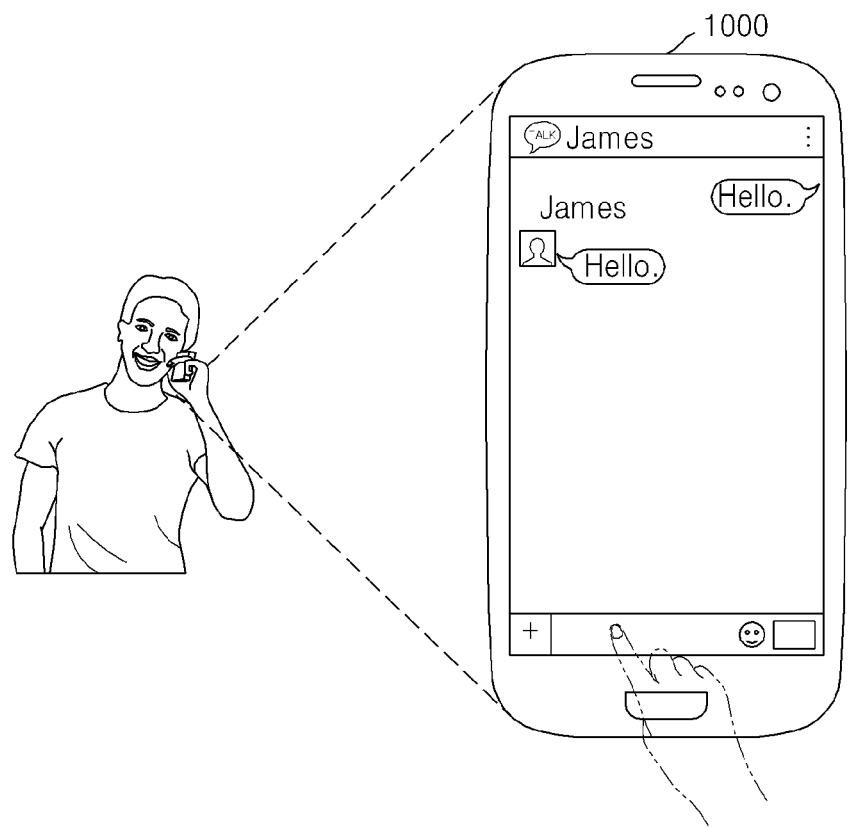
Figure 29C:
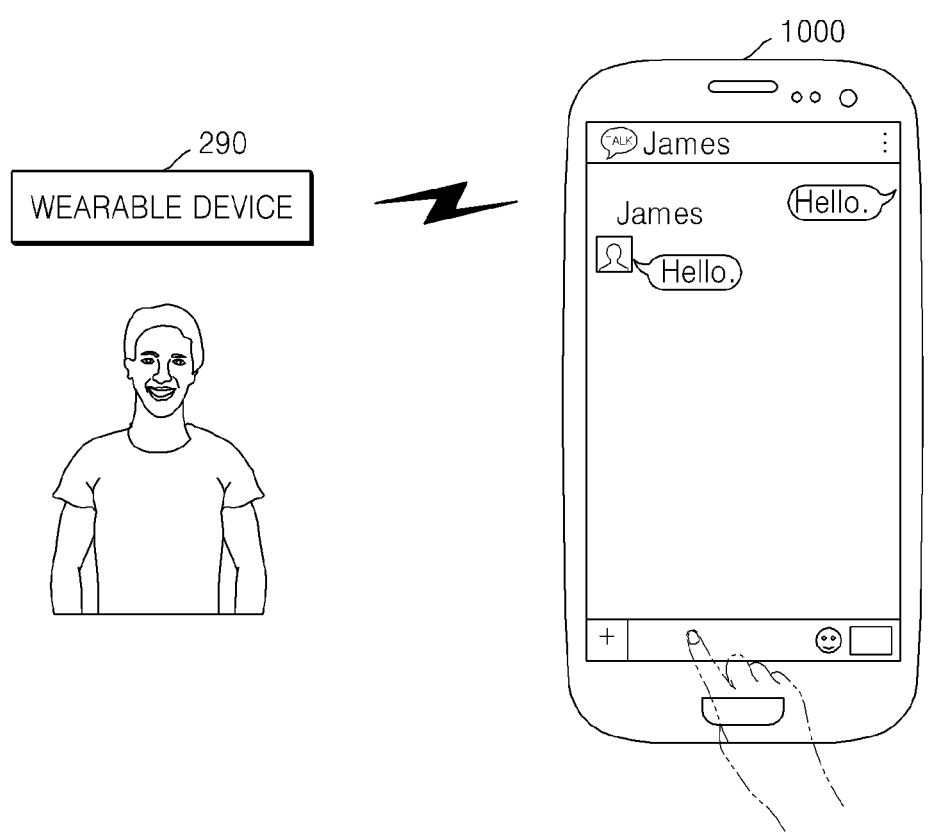

FIGS. 29A, 29B, and 29C illustrate examples of a combination mode that is one of call modes of a voice-message call, according to exemplary embodiments.

During the combination mode, while a voice input function and a voice output function for a voice call are activated, a text input function and a text output function for a text exchange may be activated. Thus, in the combination mode, a user may perform the text exchange while the user performs the voice call via the first device 1000.

Also, during the combination mode, while at least one of the voice input function and the voice output function for the voice call are activated, at least one of the text input function and the text output function for the text exchange may be activated.

For one example, during the combination mode, while the voice input function for the voice call is activated, the text input function and the text output function for the text exchange may be activated.

For another example, during the combination mode, while the voice output function for the voice call is activated, the text input function and the text output function for the text exchange may be activated.

For another example, during the combination mode, while the voice input function and the voice output function for the voice call are activated, the text input function for the text exchange may be activated.

For another example, during the combination mode, while the voice input function and the voice output function for the voice call are activated, the text output function for the text exchange may be activated.

Referring to FIG. 29A, a speakerphone function of the first device 1000 may be activated, and a message exchange function via a chat window that is displayed on a screen of the first device 1000 may be activated.

During the combination mode, the first device 1000 may also perform a message exchange with the second device 2000 while the first device 1000 performs the voice call with the second device 2000.

Referring to FIG. 29B, while a voice call function that does not involve using a speakerphone function of the first device 1000 is activated, a message exchange function via a chat window that is displayed on a screen of the first device 1000 may be activated. The voice call function that does not involve using the speakerphone function may indicate a voice call that is performed by using a speaker adjacent to an ear of a user and a microphone adjacent to a mouth of the user, while the first device 1000 is adjacent to a face of the user.

In this case, while the first device 1000 performs a voice input/output when the voice call function is activated, the first device 1000 may also perform a text input/output via a chat window for exchanging a message with the second device 2000.

Referring to FIG. 29C, while a user wears a wearable device 290 that is connected with the first device 1000 in a wired or wireless manner, the first device 1000 may perform a voice-message call during a combination mode. In this case, the first device 1000 may control the wearable device 290 to perform at least one of a voice input/output and a text input/output for the voice-message call during the combination mode.

For example, when the wearable device 290 is a headphone, the first device 1000 may control a voice from the first device 1000 to be output via the headphone while the first device 1000 performs the voice-message call during the combination mode.

For example, when the wearable device 290 is smart glasses, the first device 1000 may control a chat window, which is output from the first device 1000, to be output via the smart glasses while the first device 1000 performs the voice-message call during the combination mode.

Figure 30:
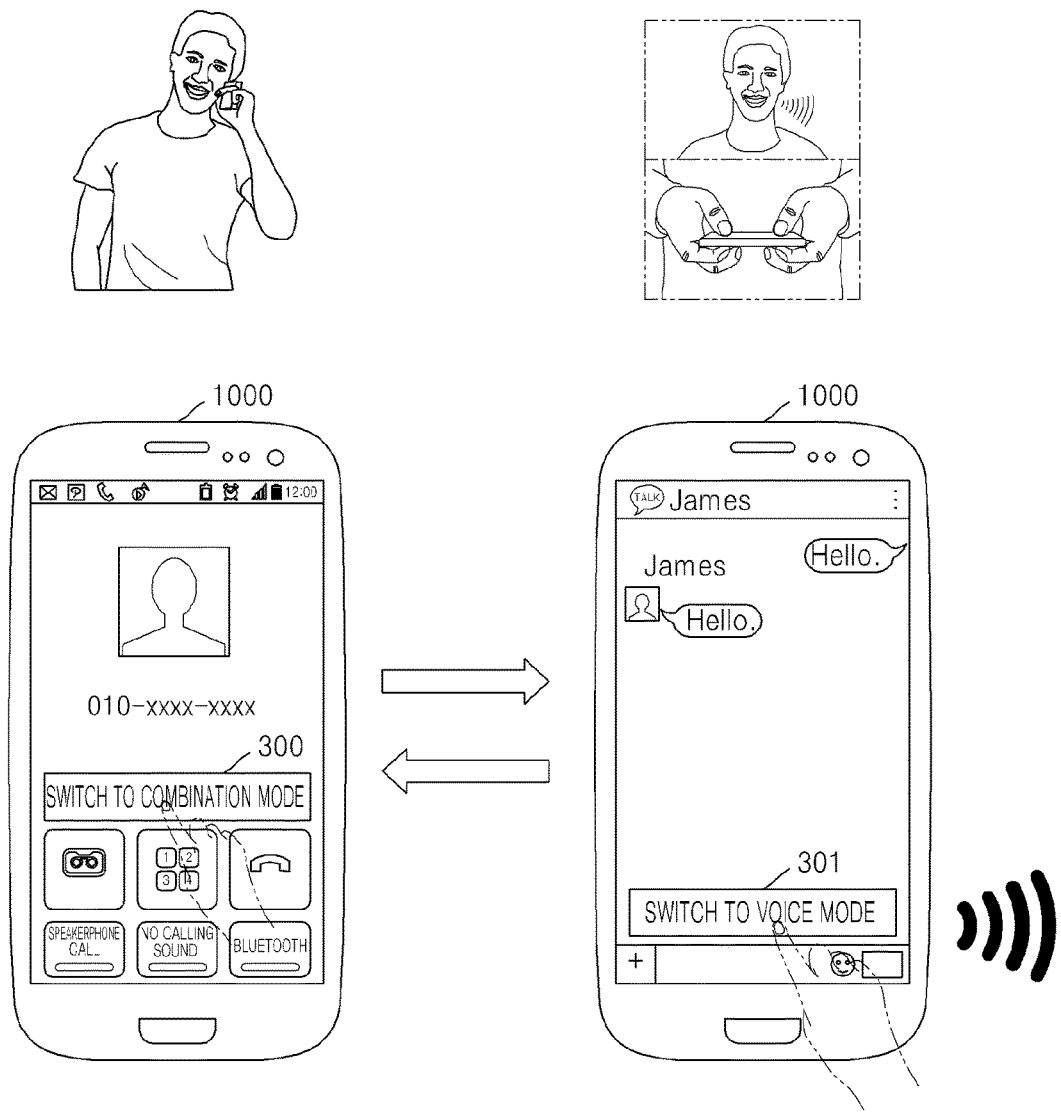
FIG. 30 illustrates an example where a call mode of the first device that performs a voice-message call is switched from a voice mode to a combination mode or is switched from the combination mode to the voice mode, according to an exemplary embodiment.

FIG. 30 illustrates an example where a call mode of the first device 1000 that performs a voice-message call is switched from a voice mode to a combination mode or is switched from the combination mode to the voice mode, according to an exemplary embodiment.

Referring to FIG. 30, when a button 300 displayed on a screen of the first device 1000 that performs the voice-message call during the voice mode is selected, the call mode of the first device 1000 may be switched from the voice mode to the combination mode. Also, when a button 301 displayed on the screen of the first device 1000 that performs the voice-message call during the combination mode is selected, the call mode of the first device 1000 may be switched from the combination mode to the voice mode.

Figure 31:
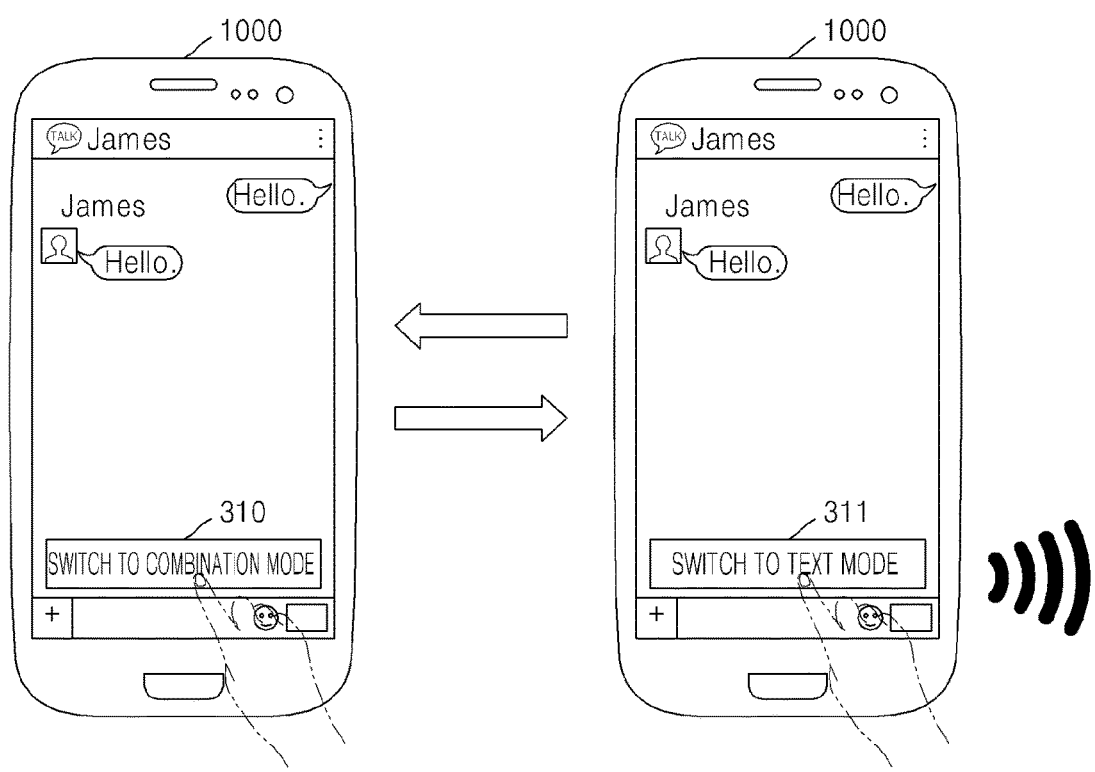
FIG. 31 illustrates an example where a call mode of the first device that performs a voice-message call is switched from a text mode to a combination mode or is switched from the combination mode to the text mode, according to an exemplary embodiment.

FIG. 31 illustrates an example where a call mode of the first device 1000 that performs a voice-message call is switched from a text mode to a combination mode or is switched from the combination mode to the text mode, according to an exemplary embodiment.

Referring to FIG. 31, when a button 310 displayed on a screen of the first device 1000 that performs the voice-message call during the text mode is selected, the call mode of the first device 1000 may be switched from the text mode to the combination mode. Also, when a button 311 displayed on the screen of the first device 1000 that performs the voice-message call during the combination mode is selected, the call mode of the first device 1000 may be switched from the combination mode to the text mode.

Figure 32:
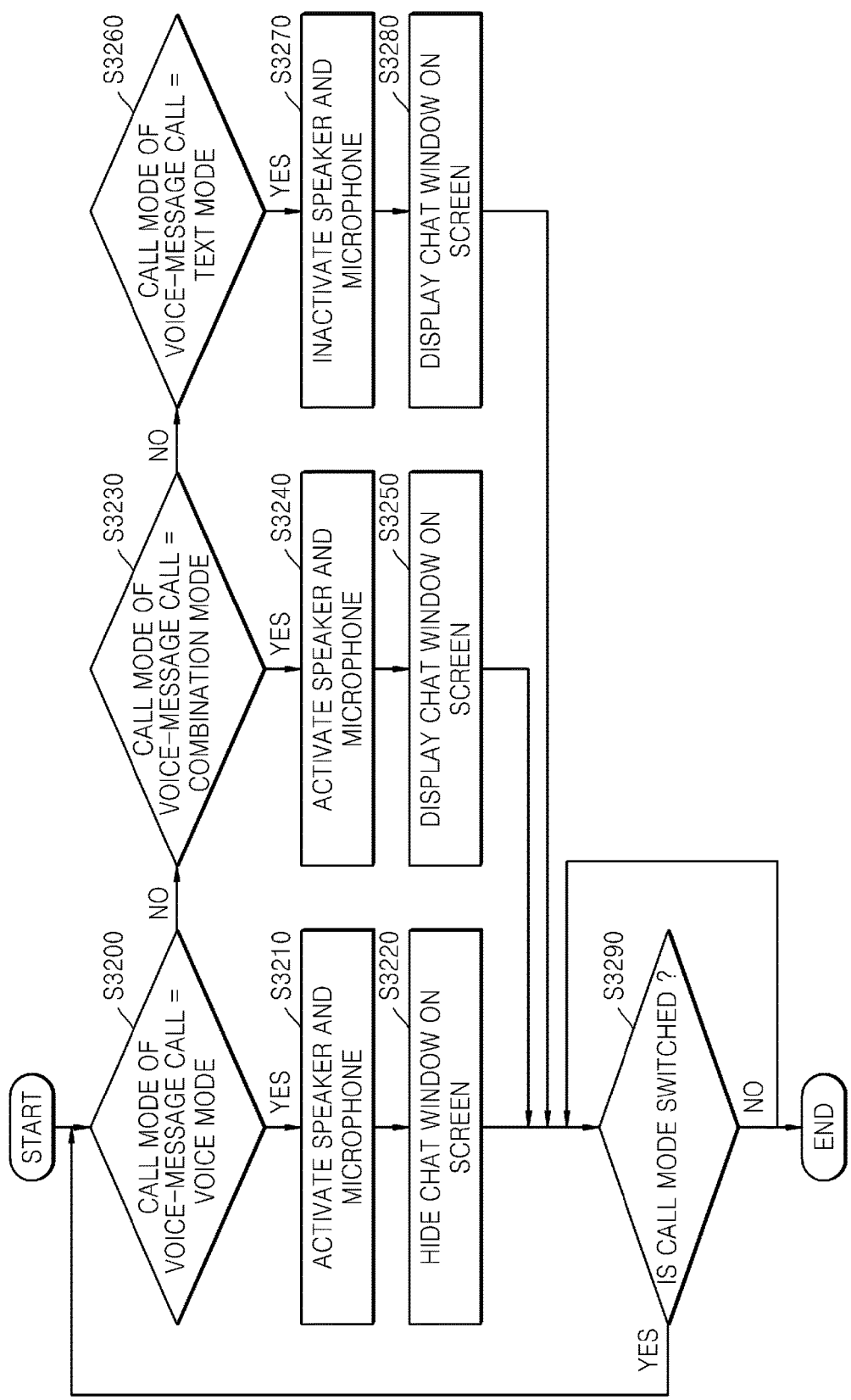
FIG. 32 is a flowchart of a method of switching a mode of a voice-message call, the method performed by the first device, according to an exemplary embodiment.

FIG. 32 is a flowchart of a method of switching a mode of a voice-message call, the method performed by the first device 1000, according to an exemplary embodiment.

Because operation S3200 through S3220, and operation S3260 through S3290 in the flowchart of FIG. 32 correspond to operation S2200 through S2220, and operation S2230 through S2260 of FIG. 22, descriptions about operation S3200 through S3220, and operation S3260 through S3290 are omitted here.

As a result of determination in operation S3200, if a call mode is not a voice mode, in operation S3230, the first device 1000 may determine whether the call mode of a voice-message call is a combination mode. For example, the first device 1000 may determine whether a button for switching to the combination mode is selected by a first user, and thus may determine whether the call mode is the combination mode.

As a result of determination in operation S3230, if it is determined that the call mode is the combination mode, in operation S3240, the first device 1000 may activate a speaker and a microphone in the first device 1000.

In operation S3250, the first device 1000 may display a chat window on a screen of the first device 1000. Also, the first device 1000 may display, in the chat window, a text that is input by the first user via the chat window. Also, the first device 1000 may display, in the chat window, a text that is converted from a voice of a second user and a text that is input to the second device 2000 by the second user.

As a result of the determination in operation S3230, if it is determined that the call mode is not the combination mode, the first device 1000 may perform operation S3260.

Figure 33:
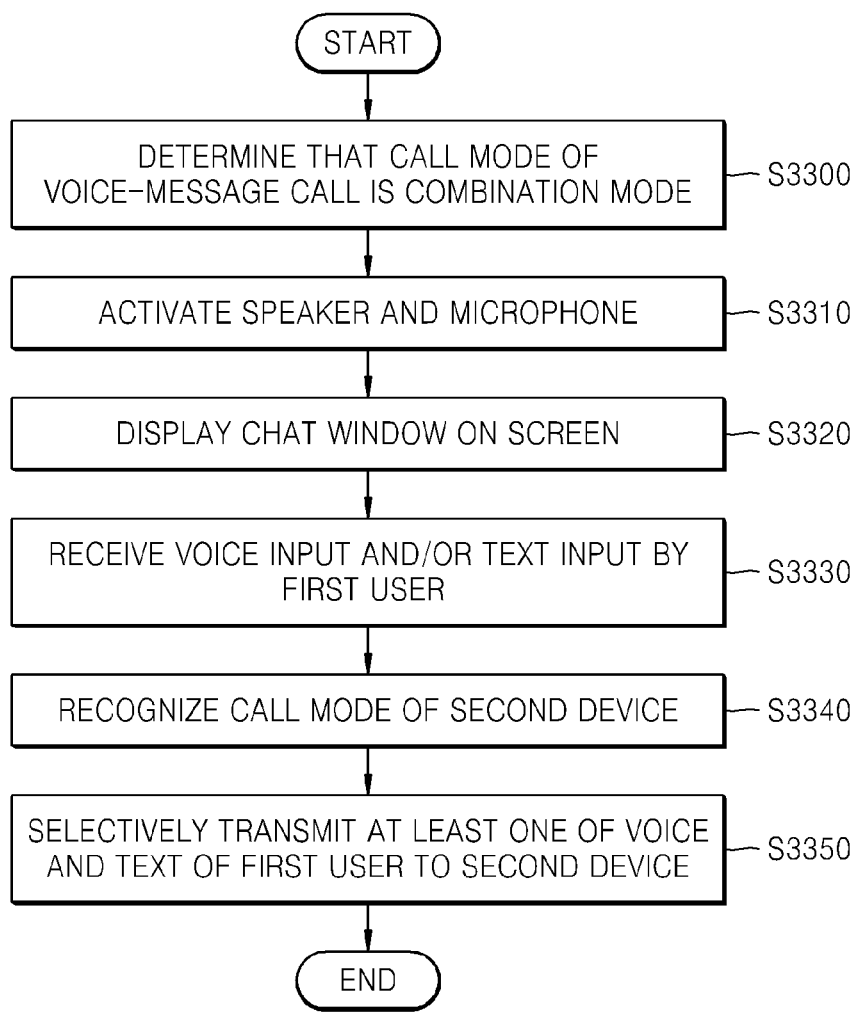
FIG. 33 is a flowchart of a method of performing a voice-message call during a combination mode, the method performed by the first device, according to an exemplary embodiment.

FIG. 33 is a flowchart of a method of performing a voice-message call during a combination mode, the method performed by the first device 1000, according to an exemplary embodiment.

In operation S3300, the first device 1000 may determine that a call mode of the voice-message call is the combination mode. For example, the first device 1000 may determine whether a button for switching to the combination mode is selected by a first user, and thus may determine that the call mode is the combination mode.

When the call mode is the combination mode, in operation S3310, the first device 1000 may activate a speaker and a microphone, and in operation S3320, the first device 1000 may display a chat window on a screen of the first device 1000. Also, the first device 1000 may display, in the chat window, a text that is input by the first user via the chat window. Also, the first device 1000 may display, in the chat window, a text that is converted from a voice of a second user and a text that is input to the second device 2000 by the second user.

In operation S3330, the first device 1000 may receive a voice input by the first user and/or a text input by the first user. The first device 1000 may receive the voice input by the first user via an activated microphone, and may receive the text input by the first user via a displayed chat window. The first device 1000 may convert a voice that is input by the first user into a text, or may convert a text that is input by the first user into a voice.

In operation S3340, the first device 1000 may recognize a call mode of the second device 2000. The second device 2000 may transmit information indicating the call mode of the second device 2000 to the first device 1000, and the first device 1000 may recognize the call mode of the second device 2000, based on the information indicating the call mode that is received from the second device 2000.

In operation S3350, the first device 1000 may selectively transmit at least one of the voice and the text of the first user to the second device 2000. The first device 1000 may selectively transmit, to the second device 2000, at least one of the voice that is input by the first user, the text that is input by the first user, a text that is converted from the voice input by the first user, and a voice that is converted from the text input by the first user.

For one example, when the call mode of the second device 2000 is a voice mode, the first device 1000 may transmit, to the second device 2000, the voice that is input by the first user, and the voice that is converted from the text input by the first user. For another example, when the call mode of the second device 2000 is a text mode, the first device 1000 may transmit, to the second device 2000, the text that is input by the first user, and the text that is converted from the voice input by the first user. However, one or more exemplary embodiments are not limited thereto.

FIG. 34 is a flowchart of a method of performing a voice-message call with the second device 2000, the method performed by the first device 1000 that operates in a combination mode, according to an exemplary embodiment.

In operation S3400, the first device 1000 is call-connected with the second device 2000. The first device 1000 may transmit a request for call-connection to the second device 2000 or may receive a request for call-connection from the second device 2000, so that the first device 1000 may be call-connected with the second device 2000.

In operation S3405, the first device 1000 may determine whether a call mode of the voice-message call is a combination mode. For example, the first device 1000 may determine whether a button for switching to the combination mode is selected by a first user, and thus may determine whether the call mode is the combination mode.

When the call mode is the combination mode, in operation S3410, the first device 1000 may activate a speaker and a microphone, and in operation S3415, the first device 1000 may display a chat window on a screen of the first device 1000.

In operation S3420, the first device 1000 may receive a voice input by the first user. The first device 1000 may receive the voice input by the first user via the activated microphone.

In operation S3425, the first device 1000 may transmit the voice that is input by the first user to the second device 2000, and in operation S3430, the first device 1000 may convert the voice that is input by the first user into a text. Also, the first device 1000 may display, in the chat window, the text that is converted from the voice input by the first user.

In operation S3435, the second device 2000 may transmit a voice of a second user to the first device 1000, and in operation S3440, the first device 1000 may output the voice of the second user. The first device 1000 may output the voice of the second user via the activated speaker.

In operation S3445, the first device 1000 may convert the voice of the second user into a text. Also, the first device 1000 may display, in the chat window, the text that is converted from the voice of the second user.

In operation S3450, the first device 1000 may receive a text input by the first user. The first device 1000 may receive the text input by the first user via the chat window, and may display the text input by the first user in the chat window.

In operation S3455, the first device 1000 may convert the text that is input by the first user into a voice. For example, the first device 1000 may determine a tone of the voice that is converted from the text input by the first user, in consideration of a gender and an age of the first user. However, one or more exemplary embodiments are not limited thereto, and the tone of the converted voice may be preset.

In operation S3460, the first device 1000 may transmit, to the second device 2000, the voice that is converted from the text input by the first user.

Figure 35A:
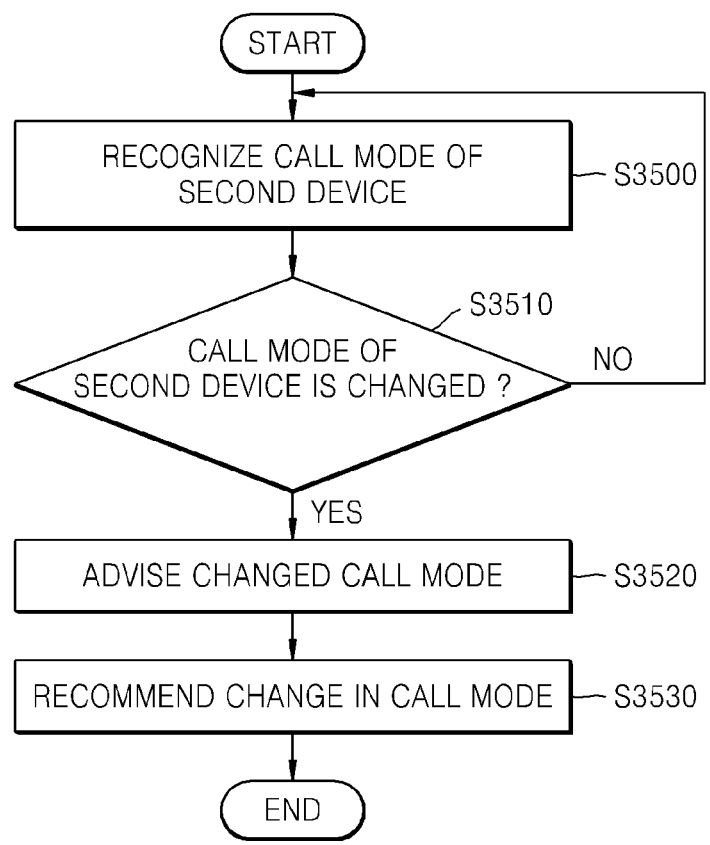
FIG. 35A is a flowchart of a method of advising a first user of a change in a call mode of the second device, and recommending a first user to change a call mode, the method performed by the first device, according to an exemplary embodiment.

FIG. 35A is a flowchart of a method of advising a first user of a change in a call mode of the second device 2000, and recommending a first user to change a call mode, the method performed by the first device 1000, according to an exemplary embodiment.

In operation S3500, the first device 100 may recognize a call mode of the second device 2000. The second device 2000 may transmit information indicating the call mode of the second device 2000 to the first device 1000, and the first device 1000 may recognize the call mode of the second device 2000, based on the information indicating the call mode that is received from the second device 2000.

In operation S3510, the first device 1000 may determine whether the call mode of the second device 2000 is changed. For example, the call mode of the second device 2000 may be changed from a voice mode to a text mode, may be changed from the voice mode to a combination mode, may be changed from the text mode to the voice mode, may be changed from the text mode to the combination mode, may be changed from the combination mode to the voice mode, or may be changed from the combination mode to the text mode. Here, the first device 1000 may poll the second device 2000 for information of the mode. Alternatively, the second device 2000 may inform the first device 1000 of a change in mode.

Also, the first device 1000 may determine whether an input method of the second device 2000 is changed. The first device 1000 may determine whether the second device 2000 receives only a voice input, only a text input, or a voice and text input for a voice-message call. Again, the first device may poll the second device for information about the input method, or the second device 2000 may inform the first device about the input method.

Also, the first device 1000 may determine whether an output method of the second device 2000 is changed. The first device 1000 may determine whether the second device 2000 provides only a voice output, only a text output, or a voice and text output for the voice-message call. The first device may poll the second device for information about the output method, or the second device 2000 may inform the first device about the output method.

As a result of the determination in operation S3510, when the first device 1000 determines that the call mode of the second device 2000 is changed, in operation S3520, the first device 1000 may advise the first user of the changed call mode of the second device 2000. For one example, when a call mode of the first device 1000 is a voice mode, the first device 1000 may output a voice to advise the change in the call mode of the second device 2000. For another example, when the call mode of the first device 1000 is a text mode, the first device 1000 may output, to a screen of the first device 1000, a text to advise the change in the call mode of the second device 2000. For another example, when the call mode of the first device 1000 is a combination mode, the first device 1000 may output, to the screen of the first device 1000, the text to advise the change in the call mode of the second device 2000 while the first device 1000 outputs the voice to advise the change in the call mode of the second device 2000. However, one or more exemplary embodiments are not limited thereto. Also, the first device 1000 may advise the first user of an output method during the changed call mode of the second device 2000.

Also, when the input method of the second device 2000 is changed, the first device 1000 may advise the first user of the changed input method. Also, when the output method of the second device 2000 is changed, the first device 1000 may advise the first user of the changed output method.

In operation S3530, the first device 1000 may recommend a change in the call mode of the first device 1000. For one example, while the first device 1000 that operates in the voice mode performs a voice-message call with the second device 2000, when the call mode of the second device 2000 is changed from the voice mode to the text mode, the first device 1000 may recommend the first user to change the call mode of the first device 1000 from the voice mode to the text mode. In this case, the first device 1000 may output a voice "Do you want to change a call mode to a text mode?" via a speaker, or message prompt. Also, when the first device 1000 changes the call mode from the voice mode to the text mode, the first device 1000 may provisionally cut a voice call channel established between the first device 1000 and the second device 2000.

For another example, while the first device 1000 that operates in the text mode performs a voice-message call with the second device 2000, when the call mode of the second device 2000 is changed from the text mode to the voice mode, the first device 1000 may recommend the first user to change the call mode of the first device 1000 from the text mode to the voice mode. In this case, the first device 1000 may display a text "Do you want to change a call mode to a voice mode?" in a chat window on a screen of the first device 1000, or output a voice prompt. When the first device 1000 changes the call mode from the text mode to the voice mode, the first device 1000 may provisionally cut a channel for a text exchange which is established between the first device 1000 and the second device 2000.

For example, when the call mode of the second device 2000 is changed, the first device 1000 may generate a vibration and may simultaneously display a message indicating a mode change on the screen of the first device 1000.

When the input method of the second device 2000 is changed, the first device 1000 may recommend an input method of the first device 1000 to perform a voice-message call. Also, when the input method of the second device 2000 is changed, the first device 1000 may recommend an output method of the first device 1000 to perform the voice-message call.

Also, when the output method of the second device 2000 is changed, the first device 1000 may recommend an input method of the first device 1000 to perform a voice-message call. Also, when the output method of the second device 2000 is changed, the first device 1000 may recommend an output method of the first device 1000 to perform the voice-message call.

Figure 35B:
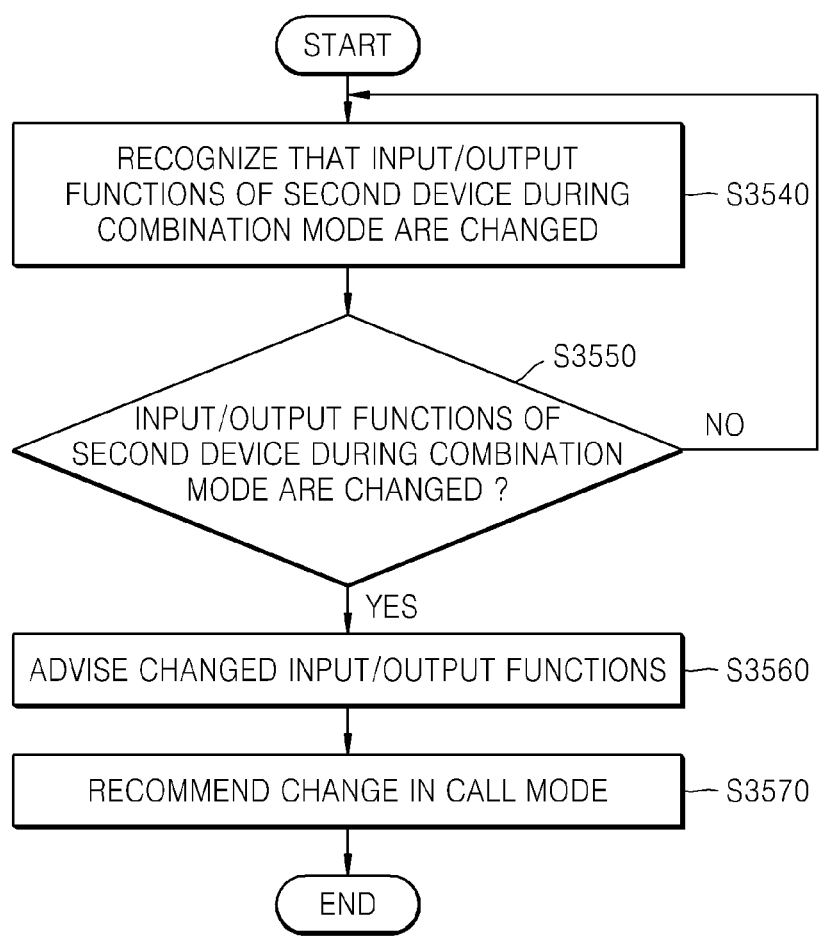
FIG. 35B is a flowchart of a method of advising a first user of a change in input/output functions of the second device during a combination mode, and recommending the first user to change a call mode, the method performed by the first device, according to an exemplary embodiment.

FIG. 35B is a flowchart of a method of advising a first user of a change in input/output functions of the second device 2000 during a combination mode, and recommending the first user to change a call mode, the method performed by the first device 1000, according to an exemplary embodiment.

In operation S3540, the first device 1000 may recognize that the input/output functions of the second device 2000 during the combination mode are changed. The second device 2000 may transmit, to the first device 1000, information indicating the change in the input/output functions of the second device 2000 during the combination mode, and the first device 1000 may recognize the change in the input/output functions of the second device 2000 during the combination mode, based on the information received from the second device 2000.

In operation S3550, the first device 1000 may determine whether the input/output functions of the second device 2000 during the combination mode are changed. For example, the first device 1000 may determine whether at least one of a voice input function and a voice output function for a voice call is changed or at least one of a text input function and a text output function for a text exchange is changed in the combination mode of the second device 2000.

Also, the first device 1000 may determine whether an input method of the second device 2000 is changed. The first device 1000 may determine whether the second device 2000 receives only a voice input, only a text input, or a voice and text input for a voice-message call.

Also, the first device 1000 may determine whether an output method of the second device 2000 is changed. The first device 1000 may determine whether the second device 2000 provides only a voice output, only a text output, or a voice and text output for the voice-message call.

As a result of the determination in operation S3550, when the first device 1000 determines that the input/output functions of the second device 2000 during the combination mode are changed, in operation S3560, the first device 1000 may advise the first user of changed input/output functions of the second device 2000. For example, the first device 1000 may advise the first user of a changed output method of the second device 2000. Also, when the input method of the second device 2000 is changed, the first device 1000 may advise the first user of a changed input method of the second device 2000. When the output method of the second device 2000 is changed, the first device 1000 may advise the first user of a changed output method of the second device 2000.

In operation S3570, the first device 1000 may recommend a change in the call mode of the first device 1000. In this case, the first device 1000 may recommend the first user of a call mode of the first device 1000, according to the change in the input/output functions of the second device 2000 during the combination mode.

When the input method of the second device 2000 is changed, the first device 1000 may recommend an input method of the first device 1000 to perform a voice-message call. Also, when the input method of the second device 2000 is changed, the first device 1000 may recommend an output method of the first device 1000 to perform the voice-message call.

Also, when the output method of the second device 2000 is changed, the first device 1000 may recommend an input method of the first device 1000 to perform a voice-message call. Also, when the output method of the second device 2000 is changed, the first device 1000 may recommend an output method of the first device 1000 to perform the voice-message call.

Figure 36:
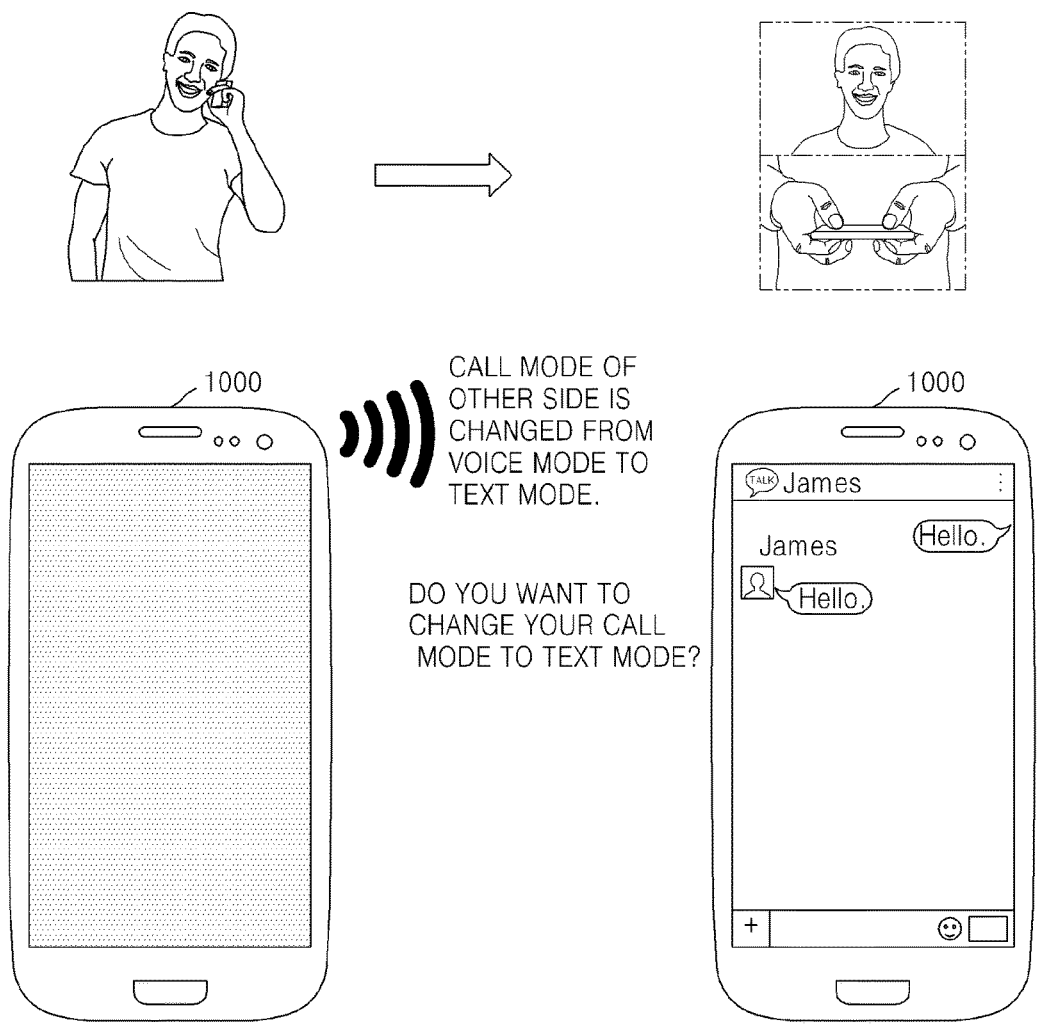
FIG. 36 illustrates an example where the first device recommends a first user to change a call mode from a voice mode to a text mode, according to an exemplary embodiment.

FIG. 36 illustrates an example where the first device 1000 recommends a first user to change a call mode from a voice mode to a text mode, according to an exemplary embodiment.

Referring to FIG. 36, the first device 1000 may perform a voice-message call while the first device 1000 operates during the voice mode, and then when a call mode of the second device 2000 is changed from a voice mode to a text mode, the first device 1000 may output a voice "Call mode of the other side is changed from a voice mode to a text mode. Do you want to change your call mode to a text mode?" via a speaker of the first device 1000.

Also, the first user may have the first device 1000 distant from a face of the first user, and thus, the first device 1000 may change the call mode from the voice mode to the text mode.

Figure 37:
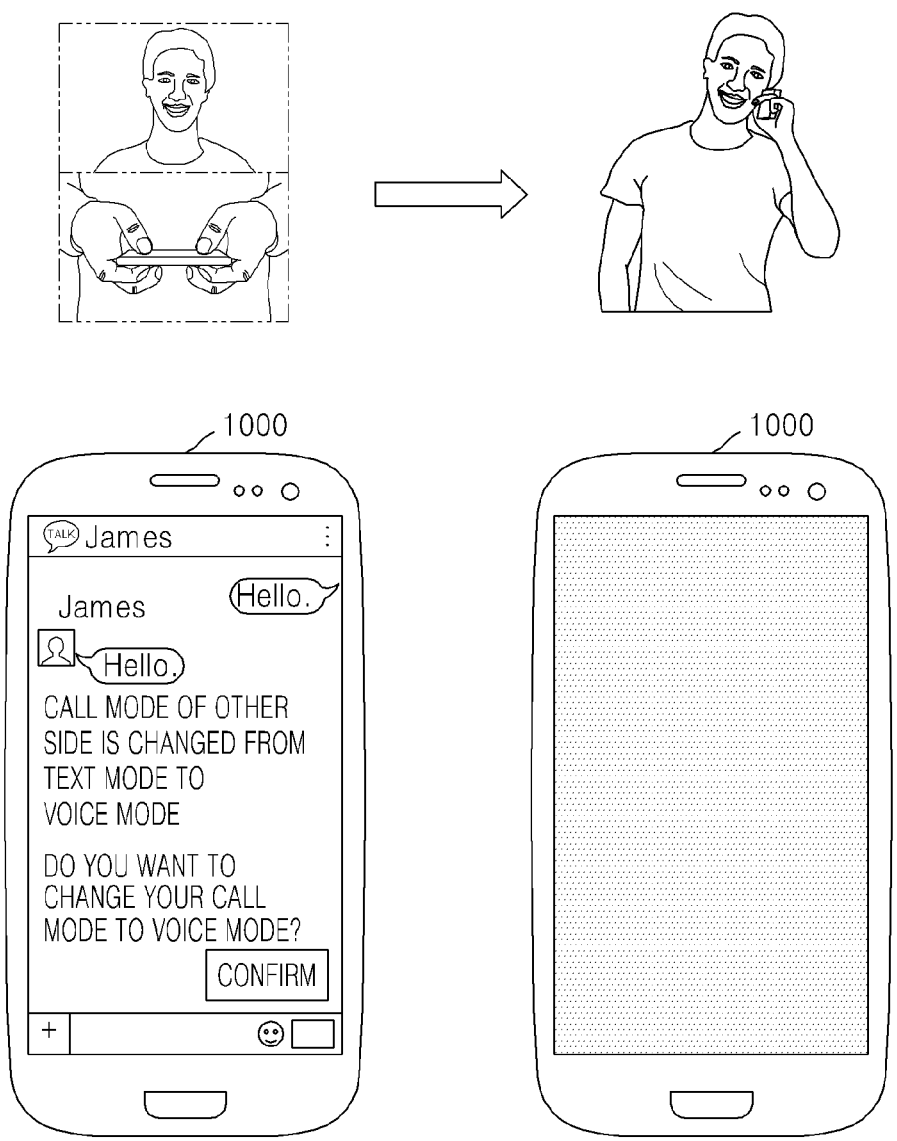
FIG. 37 illustrates an example where the first device recommends a first user to change a call mode from a text mode to a voice mode, according to an exemplary embodiment.

FIG. 37 illustrates an example where the first device 1000 recommends a first user to change a call mode from a text mode to a voice mode, according to an exemplary embodiment.

Referring to FIG. 37, the first device 1000 may perform a voice-message call while the first device 1000 operates during the text mode, and then when a call mode of the second device 2000 is changed from a text mode to a voice mode, the first device 1000 may output a voice "Call mode of the other side is changed from a text mode to a voice mode. Do you want to change your call mode to a voice mode?" via a speaker of the first device 1000.

Also, the first user may make the first device 1000 adjacent to a face of the first user, and thus the first device 1000 may change the call mode from the text mode to the voice mode.

Figure 38:
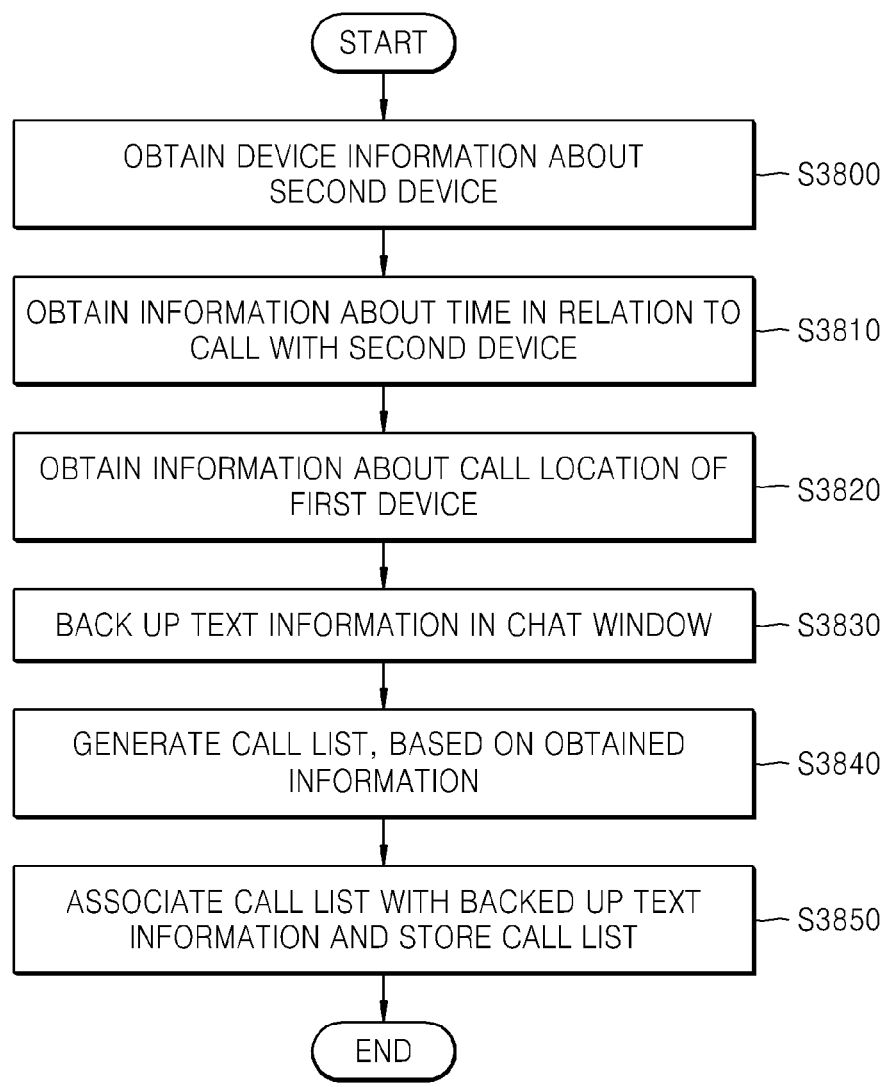
FIG. 38 is a flowchart of a method of generating a call list in relation to voice-message calls, the method performed by the first device, according to an exemplary embodiment.

FIG. 38 is a flowchart of a method of generating a call list in relation to voice-message calls, the method performed by the first device 1000, according to an exemplary embodiment.

In operation S3800, the first device 1000 may obtain device information about the second device 2000 that performs a voice-message call with the first device 1000. For example, the first device 1000 may obtain information about a Service Set Identifier (SSID) of the second device 2000, a telephone number of the second device 2000, a name of a second user of the second device 2000, and a type of the second device 2000.

In operation S3810, the first device 1000 may obtain information about a time in relation to a call with the second device 2000. For example, the first device 1000 may obtain information about a time when the first device 1000 and the second device 2000 initiate the voice-message call, a time when the first device 1000 and the second device 2000 end the voice-message call, and a time period during which the first device 1000 and the second device 2000 perform the voice-message call.

In operation S3820, the first device 1000 may obtain information about a call location of the first device 1000. The first device 1000 may obtain information about a location of the first device 1000 while the first device 1000 and the second device 2000 perform the voice-message call.

In operation S3830, the first device 1000 may back up text information about a text in a chat window generated during the voice-message call. The first device 1000 may back up the text in the chat window which indicates a conversation between the first user and the second user. The text may be backed up in the device 1000 or a server that mediates connection between the device 1000 and the device 2000.

Also, the first device 1000 may back up a text that is obtained for a preset time period before a predetermined event occurs. For example, the predetermined event may include an end of a call between the first device 1000 and the second device 2000, reception of a user input for a text backup, or the like. For example, when the call between the first device 1000 and the second device 2000 ends, the first device 1000 may back up a text that is obtained by the first device 1000 for five minutes before the call ends. For example, when the first device 1000 receives the user input for the text backup, the first device 1000 may back up a text that is obtained by the first device 1000 for three minutes before the user input is received. However, a type of the event and a time value that are set for the text backup are not limited thereto.

Also, the first device 1000 may back up a part of the text indicating the conversation between the first user and the second user in the first device 1000, and may back up all of the text indicating the conversation between the first user and the second user in the server 3000.

In operation S3840, the first device 1000 may generate the call list, based on a plurality of pieces of the information obtained in operations S3800 through S3820.

In operation S3850, the first device 1000 may associate the generated call list with the text information that is backed up in operation S3830 and may store the call list. Because the call list is associated with the backed up text information and then is stored, the first device 1000 may provide the first user with conversation content that corresponds to the call list, according to a user input in relation to the call list. In this case, when a first button is selected from the call list, the first device 1000 may first display a part of the conversation content that corresponds to the call list on a screen of the first device 1000, and when a second button is selected in the screen on which the part of the conversation content is displayed, the first device 1000 may display all of the conversation content that corresponds to the call list on the screen of the first device 1000.

Figure 39:
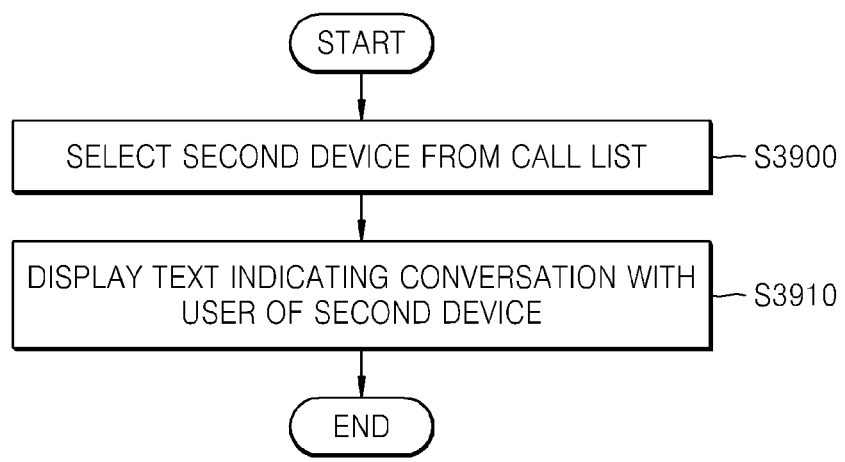
FIG. 39 is a flowchart of a method of displaying a text indicating a conversation between a first user and a second user via a call list of the first device, according to an exemplary embodiment.

FIG. 39 is a flowchart of a method of displaying a text indicating a conversation between a first user and a second user via a call list of the first device 1000, according to an exemplary embodiment.

In operation S3900, the first device 1000 may select the second device 2000 from the call list of the first device 1000. The first device 1000 may select a telephone number of the second device 2000 or a name of the second user from the call list, based on a user input.

In operation S3910, according to selection of the second device 2000, the first device 1000 may display the text indicating the conversation between the first user and the second user on a screen of the first device 1000.

Figure 40:
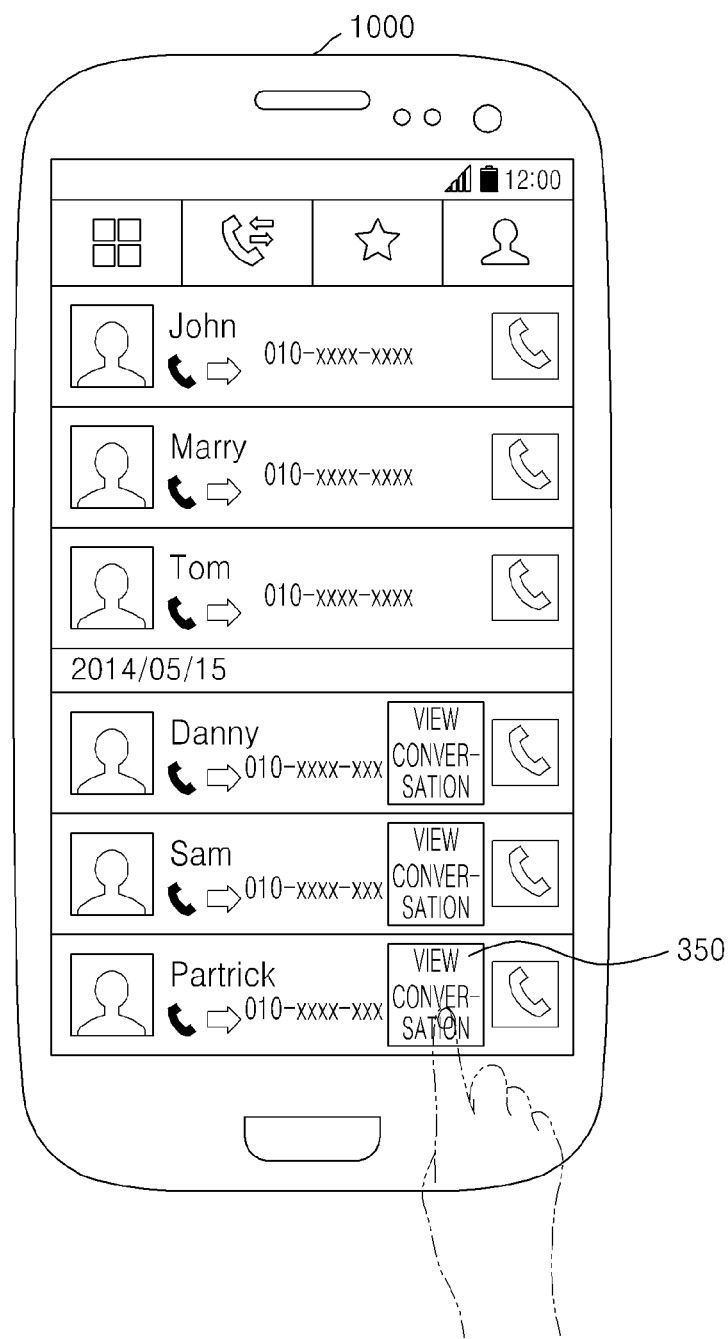
FIGS. 40 through 42 illustrate examples of a call list, according to exemplary embodiments.
Figure 41:
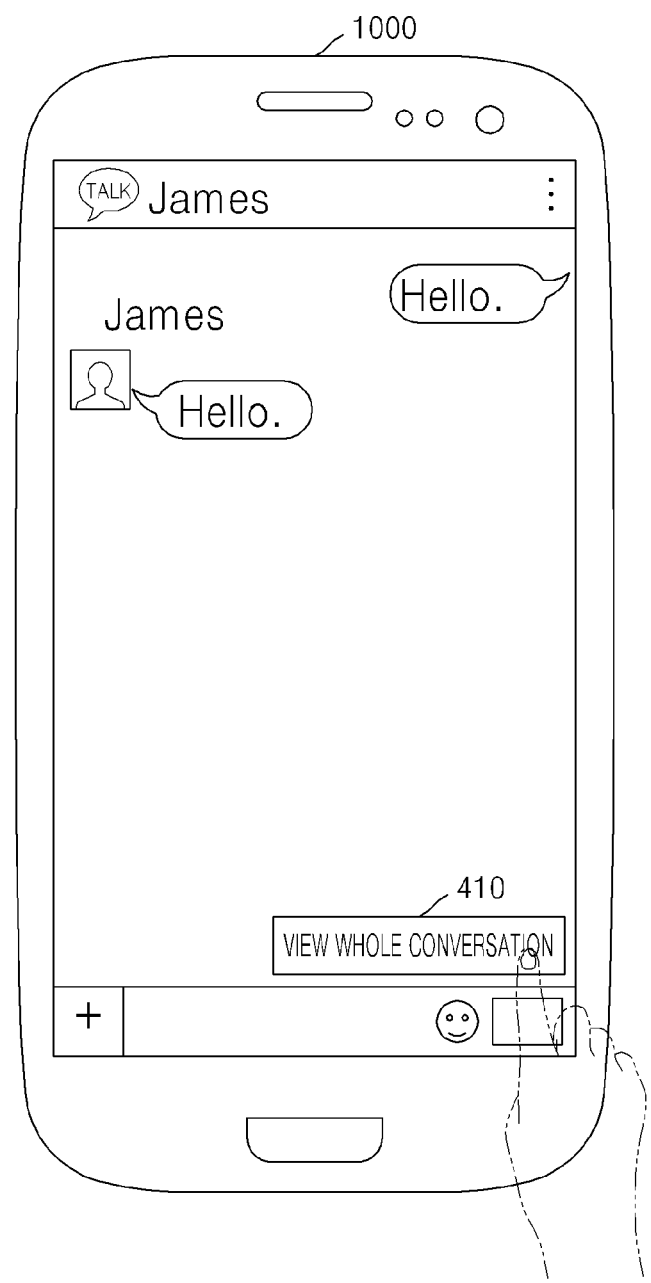
Figure 42:
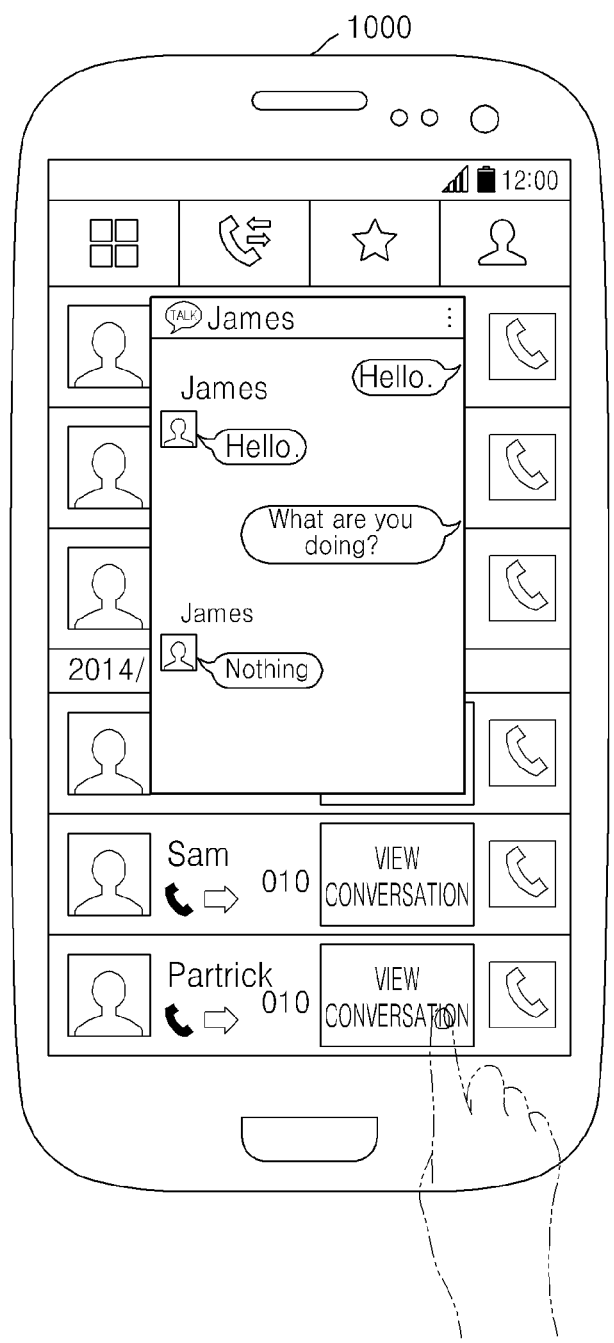

FIGS. 40 through 42 illustrate examples of a call list, according to exemplary embodiments.

Referring to FIG. 40, telephone numbers of a plurality of the second devices 2000 may be displayed in the call list that is displayed in a screen of the first device 1000. Also, in order to see conversation content related to a specific call, a first user may select a button 350 in the call list. In this regard, a user may view a history of the conversation with another user.

When the first user selects the button 350, a text indicating conversation content that corresponds to the selected button 350 may be displayed on an entire portion of the screen of the first device 1000, as illustrated in FIG. 41. In this case, the text that indicates the conversation content may correspond to a part of the conversation content. Also, the text that indicates the part of the conversation content may be stored in the first device 1000, but one or more exemplary embodiments are not limited thereto.

Also, referring to FIG. 41, a button 410 for showing all of the conversation content may be displayed in a window that includes the text that indicates the part of the conversation content. When the first user presses the button 410, the first device 1000 may display a text indicating all of the conversation content on the screen of the first device 1000. In this case, the text indicating all of the conversation content may be stored in the server 3000, and the first device 1000 may receive the text indicating all of the conversation content from the server 3000 and may display the text.

When the first user selects the button 350, a pop-up window that includes a text indicating conversation content corresponding to the selected button 350 may be displayed on a portion of the screen of the first device 1000, as shown in FIG. 42.

When the first user selects the button 350, all of the conversation content that corresponds to the selected button 350 may be displayed, but one or more exemplary embodiments are not limited thereto.

Figure 43:
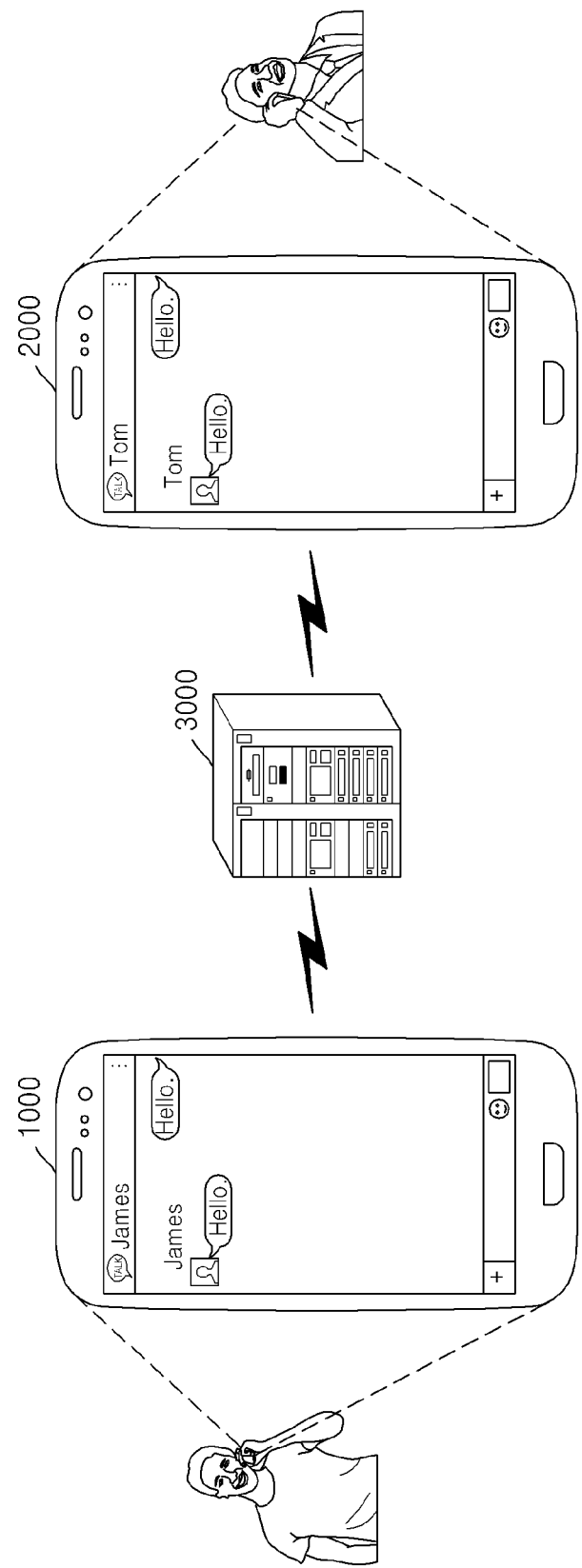
FIG. 43 illustrates an example where the first device and the second device perform a voice-message call via the server, according to an exemplary embodiment.

FIG. 43 illustrates an example where the first device 1000 and the second device 2000 perform a voice-message call via the server 3000, according to an exemplary embodiment.

Referring to FIG. 43, the first device 1000 may perform the voice-message call with the second device 2000 via the server 3000. Also, the server 3000 may perform a TTS function and an STT function for the voice-message call.

For example, the server 3000 may convert a first user's voice that is input via the first device 1000 into a text, and a first user's text that is input via the first device 1000 into a voice. Also, the server 3000 may convert a second user's voice that is input via the second device 2000 into a text, and a second user's text that is input via the second device 2000 into a voice.

Figure 44:
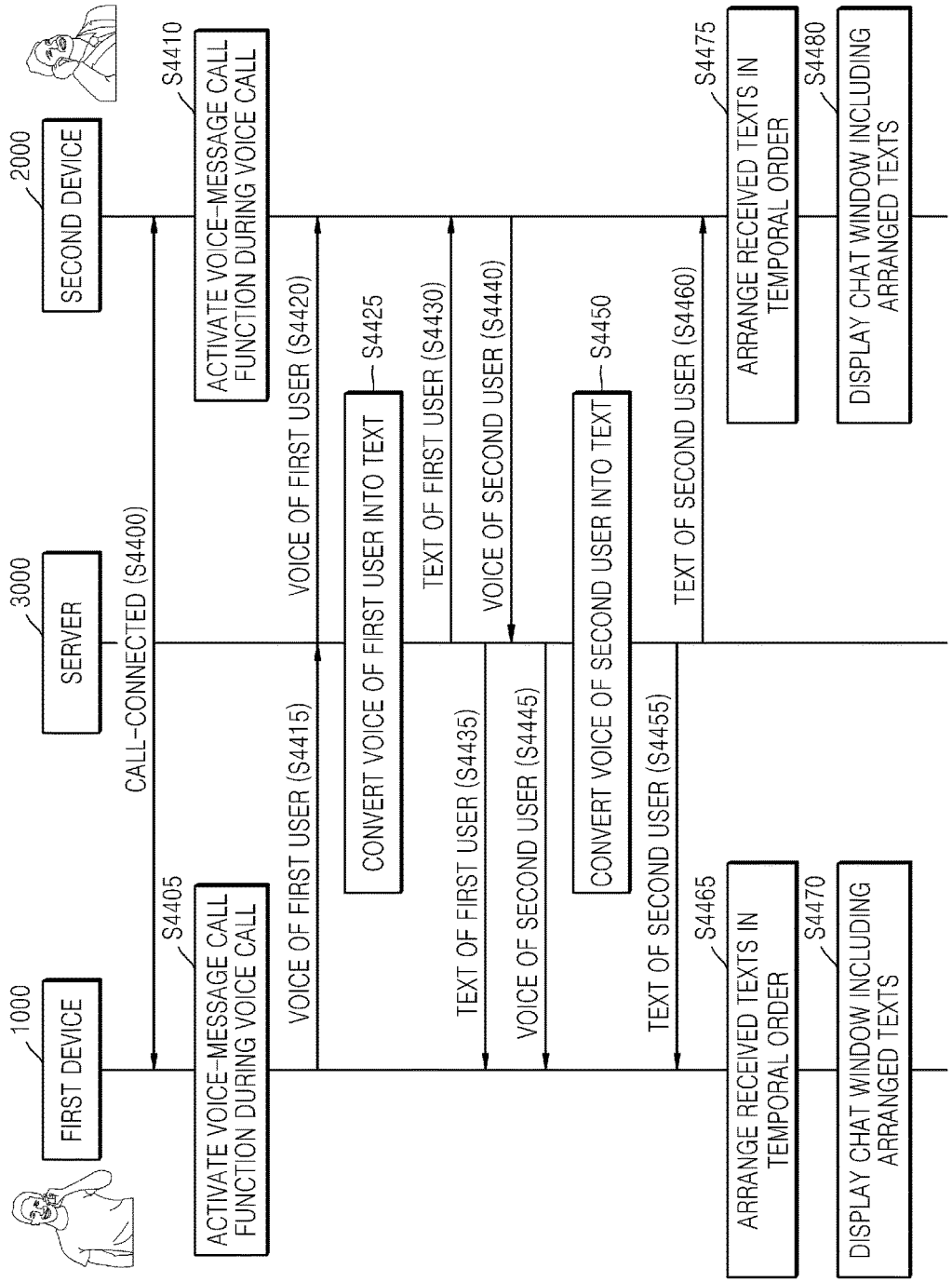
FIG. 44 is a flowchart of a method of supporting a voice-message call between the first device and the second device by converting voices of first and second users into texts, the method performed by the server, according to an exemplary embodiment.

FIG. 44 is a flowchart of a method of supporting a voice-message call between the first device 1000 and the second device 2000 by converting voices of first and second users into texts, the method performed by the server 3000, according to an exemplary embodiment.

In operation S4400, the first device 1000 and the second device 2000 are call-connected with each other. The first device 1000 may be call-connected with the second device 2000 by transmitting a request for call-connection to the second device 2000, or by receiving a request for call-connection from the second device 2000.

In operation S4405, the first device 1000 may activate a voice-message call function. The first device 1000 may activate the voice-message call function, based on a user input. In operation S4405, the first device 1000 activates the voice-message call function after the first device 1000 is call-connected with the second device 2000. However, one or more exemplary embodiments are not limited thereto. For example, the first device 1000 may activate the voice-message call function when the first device 1000 sends a call or receives a call, or while the first device 1000 performs a call.

In operation S4410, the second device 2000 may activate a voice-message call function. The second device 2000 may activate the voice-message call function, based on a user input. In operation S4410, the second device 2000 activates the voice-message call function after the second device 2000 is call-connected with the first device 1000. However, one or more exemplary embodiments are not limited thereto. For example, the second device 2000 may activate the voice-message call function when the second device 2000 sends a call or receives a call, or while the second device 2000 performs a call.

In operation S4415, the first device 1000 may transmit a voice of the first user to the server 3000. The first device 1000 may obtain the voice of the first user via a microphone in the first device 1000, and may transmit the obtained voice to the server 3000.

In operation S4420, the server 3000 may transmit the voice of the first user to the second device 2000.

In operation S4425, the server 3000 may convert the voice of the first user into a text. The server 3000 may convert the voice of the first user into the text by using various STT techniques.

In operation S4430, the server 3000 may transmit the text that is converted from the voice of the first user to the second device 2000, and in operation S4435, the server 3000 may transmit the text that is converted from the voice of the first user to the first device 1000.

In operation S4440, the second device 2000 may transmit the voice of the second user to the server 3000. The second device 2000 may obtain the voice of the second user via a microphone in the second device 2000 and may transmit the obtained voice to the server 3000.

In operation S4445, the server 3000 may transmit the voice of the second user to the first device 1000.

In operation S4450, the server 3000 may convert the voice of the second user into a text. The server 3000 may convert the voice of the second user into the text by using the various STT techniques.

In operation S4455, the server 3000 may transmit the text that is converted from the voice of the second user to the first device 1000, and in operation S4460, the server 3000 may transmit the text that is converted from the voice of the second user to the second device 2000.

In operation S4465, the first device 1000 may arrange the received texts in a temporal order. For one example, according to a time when the voice of the first user is input to the first device 1000 and a time when the voice of the second user is received, the first device 1000 may arrange the text that is converted from the voice of the first user and the text that is converted from the voice of the second user. For another example, according to the time when the voice of the first user is input to the first device 1000 and a time when the voice of the second user is input to the second device 2000, the first device 1000 may arrange the text that is converted from the voice of the first user and the text that is converted from the voice of the second user. However, one or more exemplary embodiments are not limited thereto.

In operation S4470, the first device 1000 may display a chat window including the arranged texts on a screen of the first device 1000. The first device 1000 may display the chat window on the screen of the first device 1000 while the first device 1000 performs the voice-message call. Also, the first device 1000 may display the chat window on the screen of the first device 1000 or may hide the chat window in the screen of the first device 1000, depending on a call mode of the voice-message call.

In operation S4475, the second device 2000 may arrange the received texts in a temporal order. For one example, according to a time when the voice of the second user is input to the second device 2000 and a time when the voice of the first user is received, the second device 2000 may arrange the text that is converted from the voice of the first user and the text that is converted from the voice of the second user. For another example, according to the time when the voice of the second user is input to the second device 2000 and a time when the voice of the first user is input to the second device 2000, the second device 2000 may arrange the text that is converted from the voice of the first user and the text that is converted from the voice of the second user. However, one or more exemplary embodiments are not limited thereto.

In operation S4480, the second device 2000 may display a chat window including the arranged texts on a screen of the second device 2000. The second device 2000 may display the chat window on the screen of the second device 2000 while the second device 2000 performs the voice-message call. Also, the second device 2000 may display the chat window on the screen of the second device 2000 or may hide the chat window in the screen of the second device 2000, depending on a call mode of the voice-message call.

As discussed above, the server 3000 may mediate the connection between the first device 1000 and the second device 2000. Accordingly, the server 3000 may perform conversion between text and voice as necessary. Further, the server may perform storage functions, thereby storing text and voice data as necessary.

Figure 45:
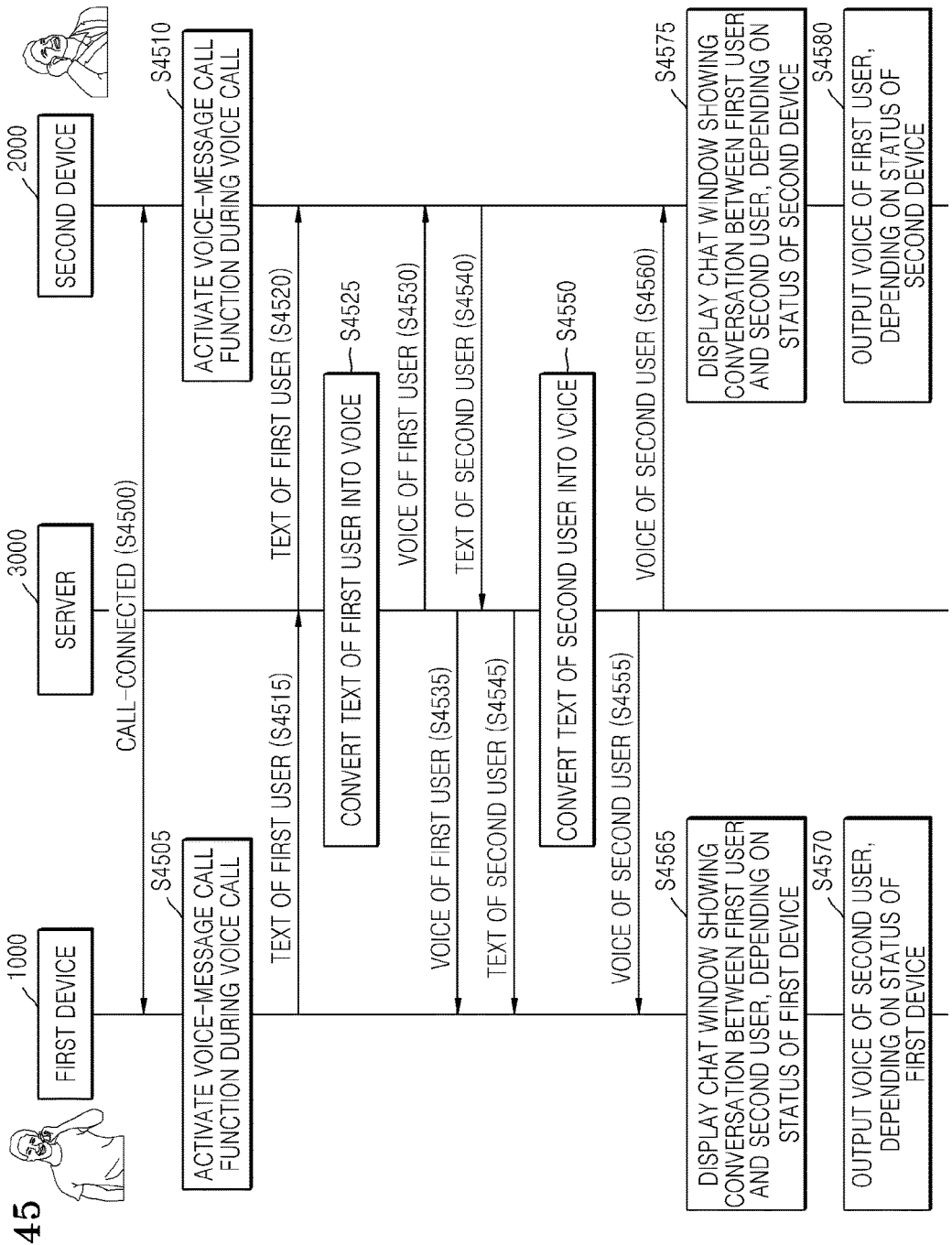
FIG. 45 is a flowchart of a method of supporting a voice-message call between the first device and the second device by converting texts of first and second users into voices, the method performed by the server, according to an exemplary embodiment.

FIG. 45 is a flowchart of a method of supporting a voice-message call between the first device 1000 and the second device 2000 by converting texts of first and second users into voices, the method performed by the server 3000, according to an exemplary embodiment.

Because operations S4500 through S4510 of FIG. 45 correspond to operations S4400 through S4410 of FIG. 44, descriptions thereof are omitted here.

In operation S4515, the first device 1000 may transmit the text that is input by the first user to the server 3000, and in operation S4520, the server 3000 may transmit the text that is input by the first user to the second device 2000.

In operation S4525, the server 3000 may convert the text that is input by the first user into a voice. The server 3000 may determine a tone of the voice that is converted from the text of the first user, in consideration of user information (e.g., a gender and an age) about the first user.

In operation S4530, the server 3000 may transmit, to the second device 2000, the voice that is converted from the text of the first user, and in operation S4535, the server 3000 may transmit, to the first device 1000, the voice that is converted from the text of the first user.

In operation S4540, the second device 2000 may transmit the text that is input by the second user to the server 3000, and in operation S4545, the server 3000 may transmit the text that is input by the second user to the first device 1000.

In operation S4550, the server 3000 may convert the text that is input by the second user into a voice. The server 3000 may determine a tone of the voice that is converted from the text of the second user, in consideration of user information (e.g., a gender and an age) about the second user.

In operation S4555, the server 3000 may transmit, to the first device 1000, the voice that is converted from the text of the second user, and in operation S4560, the server 3000 may transmit, to the second device 2000, the voice that is converted from the text of the second user.

In operation S4565, the first device 1000 may display a chat window that shows a conversation between the first user and the second user, depending on a status of the first device 1000. For example, when a call mode of the first device 1000 is a text mode or a combination mode, the first device 1000 may display the chat window that shows the conversation between the first user and the second user on the screen of the first device 1000.

In operation S4570, the first device 1000 may output the voice of the second user, depending on a status of the first device 1000. For example, when the call mode of the first device 1000 is a voice mode or the combination mode, the first device 1000 may output the voice of the second user.

In operation S4575, the second device 2000 may display a chat window that shows a conversation between the first user and the second user, depending on a status of the second device 2000. For example, when a call mode of the second device 2000 is a text mode or a combination mode, the second device 2000 may display the chat window that shows the conversation between the first user and the second user on the screen of the second device 2000.

In operation S4580, the second device 2000 may output the voice of the first user, depending on a status of the second device 2000. For example, when a call mode of the second device 2000 is a voice mode or the combination mode, the second device 2000 may output the voice of the first user.

As discussed above, the server 3000 may mediate the connection between the first device 1000 and the second device 2000. Accordingly, the server 3000 may perform conversion between text and voice as necessary. Further, the server may perform storage functions, thereby storing text and voice data as necessary.

Figure 46:
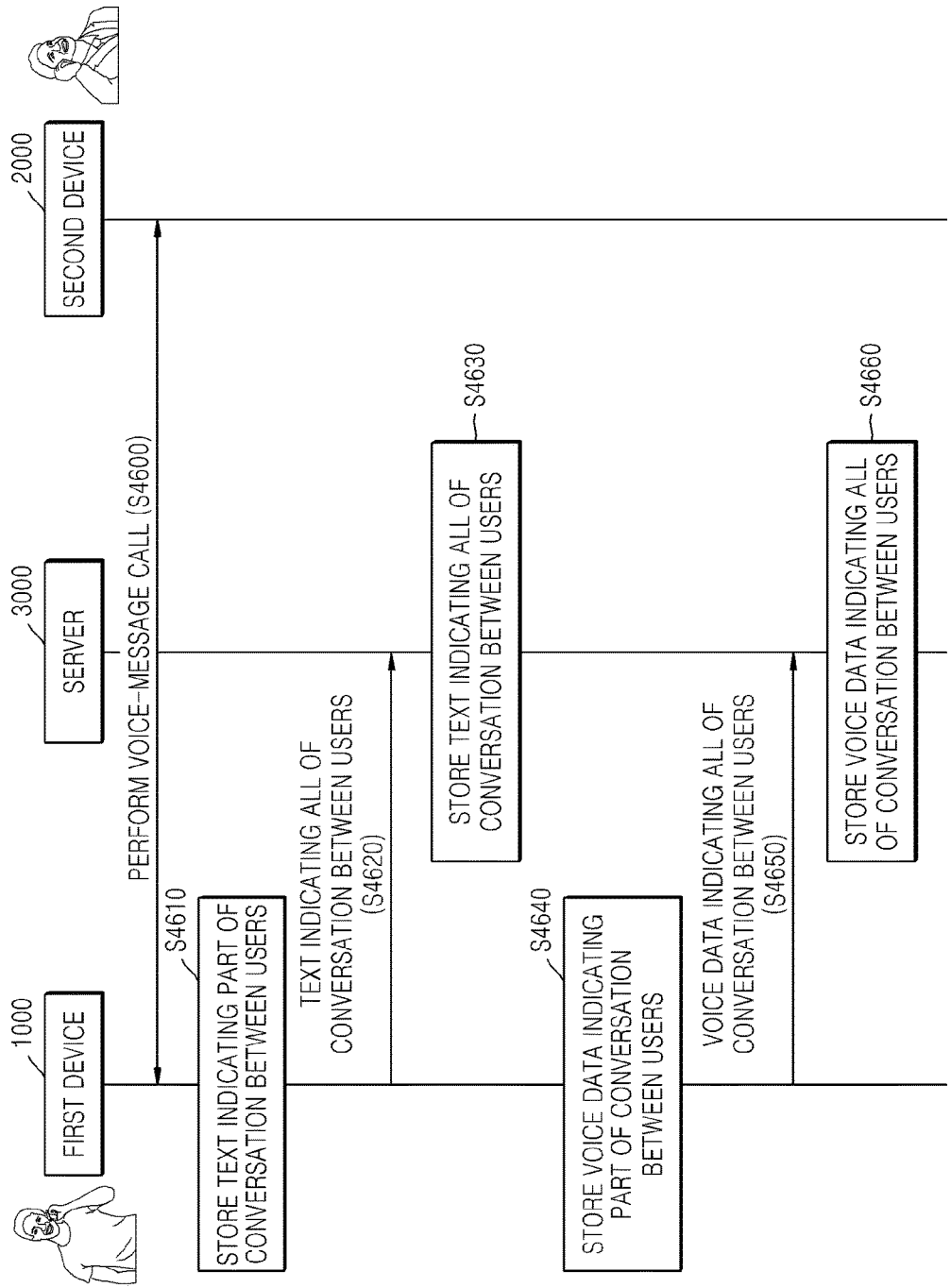
FIG. 46 is a flowchart of a method of storing voice data and text data related to a voice-message call between the first device and the second device, the method performed by the server, according to an exemplary embodiment.

FIG. 46 is a flowchart of a method of storing voice data and text data related to a voice-message call between the first device 1000 and the second device 2000, the method performed by the server 3000, according to an exemplary embodiment.

In operation S4600, the first device 1000 may perform the voice-message call with the second device 2000. The first device 1000 and the second device 2000 may perform the voice-message call via the server 3000, but one or more exemplary embodiments are not limited thereto. The first device 1000 may directly perform the voice-message call with the second device 2000.

In operation S4610, the first device 1000 may store a text that indicates a part of a conversation between users. The first device 1000 may obtain a text that is converted from a voice that a first user inputs to the first device 1000, a text that is converted from a voice that a second user inputs to the second device 2000, a text that the first user inputs to the first device 1000, and a text that the second user inputs to the second device 2000.

Also, the first device 1000 may obtain a text indicating the conversation between users from at least one of the first device 1000, the second device 2000, and the server 3000. Also, the first device 1000 may store a part of the obtained text in the first device 1000.

In operation S4620, the first device 1000 may transmit a text indicating all of the conversation between users to the server 3000, and in operation S4630, the server 3000 may store the text indicating all of the conversation between users. In operations S4620 and S4630, the server 3000 receives the text indicating all of the conversation between users from the first device 1000 and stores the conversation, but one or more exemplary embodiments are not limited thereto. The server 3000 may receive the text indicating a part of the conversation between users from the first device 1000, may receive a text indicating a part of the conversation between users from the second device 2000, and may directly generate a text indicating a part of the conversation between users. Also, the server 3000 may obtain the text indicating all of the conversation between users by combining the text received from the first device 1000, the text received from the second device 2000, and the text generated by the server 3000.

In operation S4640, the first device 1000 may store voice data that indicates the text indicating the part of the conversation between users. The first device 1000 may obtain voice data that is converted from a text that the first user inputs to the first device 1000, voice data that is converted from a text that the second user inputs to the second device 2000, voice data that the first user inputs to the first device 1000, and voice data that the second user inputs to the second device 2000.

Also, the first device 1000 may obtain voice data that indicates the conversation between users from at least one of the first device 1000, the second device 2000, and the server 3000. Also, the first device 1000 may store a part of the obtained voice data in the first device 1000.

In operation S4650, the first device 1000 may transmit voice data indicating all of the conversation between users to the server 3000, and in operation S4660, the server 3000 may store the voice data indicating all of the conversation between users. In operation S4650 and S4660, the server 3000 receives the voice data indicating all of the conversation between users from the first device 1000 and stores it, but one or more exemplary embodiments are not limited thereto. The server 3000 may receive voice data indicating a part of the conversation between users from the first device 1000, may receive voice data indicating a part of the conversation between users from the second device 2000, and may directly generate voice data indicating a part of the conversation between users. Also, the server 3000 may obtain the voice data indicating all of the conversation between users by combining the voice data received from the first device 1000, the voice data received from the second device 2000, and the voice data generated by the server 3000.

Figure 47:
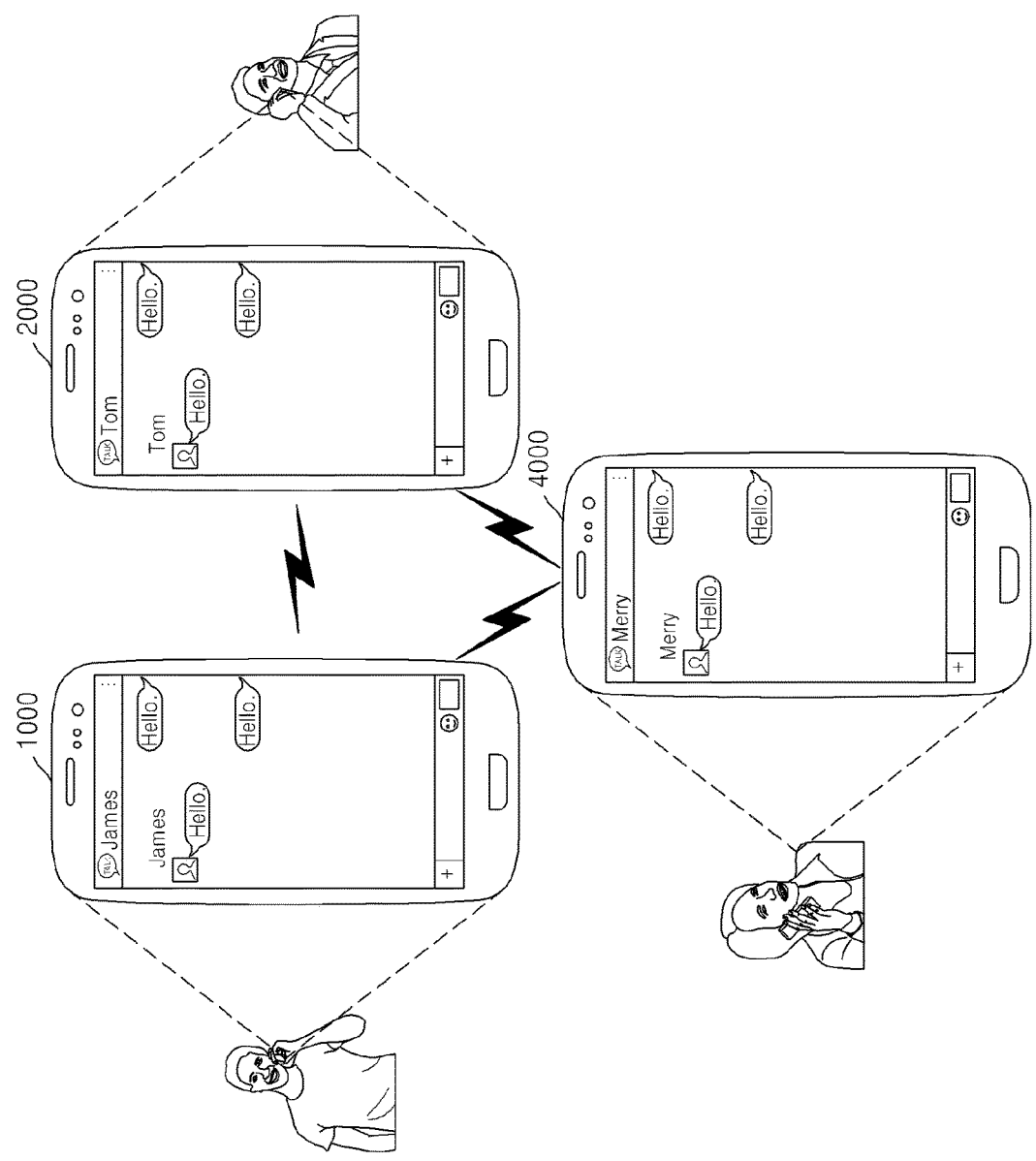
FIG. 47 illustrates in example where the first device, the second device, and a third device perform a voice-message call with each other, according to an exemplary embodiment.

FIG. 47 illustrates in example where the first device 1000, the second device 2000, and a third device 4000 perform a voice-message call with each other, according to an exemplary embodiment.

Referring to FIG. 47, the voice-message call may be performed among the first device 1000, the second device 2000, and the third device 4000. For example, while the first device 1000 and the second device 2000 perform a voice-message call, the third device 4000 may participate in the voice-message call that the first device 1000 and the second device 2000 perform. Alternatively, for example, the first device 1000, the second device 2000, and the third device 4000 may initiate a voice-message call together. Although three devices are illustrated, any number of devices may participate in a voice-message call.

When the voice-message call is performed among the first device 1000, the second device 2000, and the third device 4000, i) one or more operations between the first device 1000 and the second device 2000 to perform the voice-message call, ii) one or more operations between the first device 1000 and the third device 4000 to perform the voice-message call, and iii) one or more operations between the second device 2000 and the third device 4000 to perform the voice-message call may correspond to the operations that are illustrated and described with reference to FIGS. 1 through 42.

Figure 48:
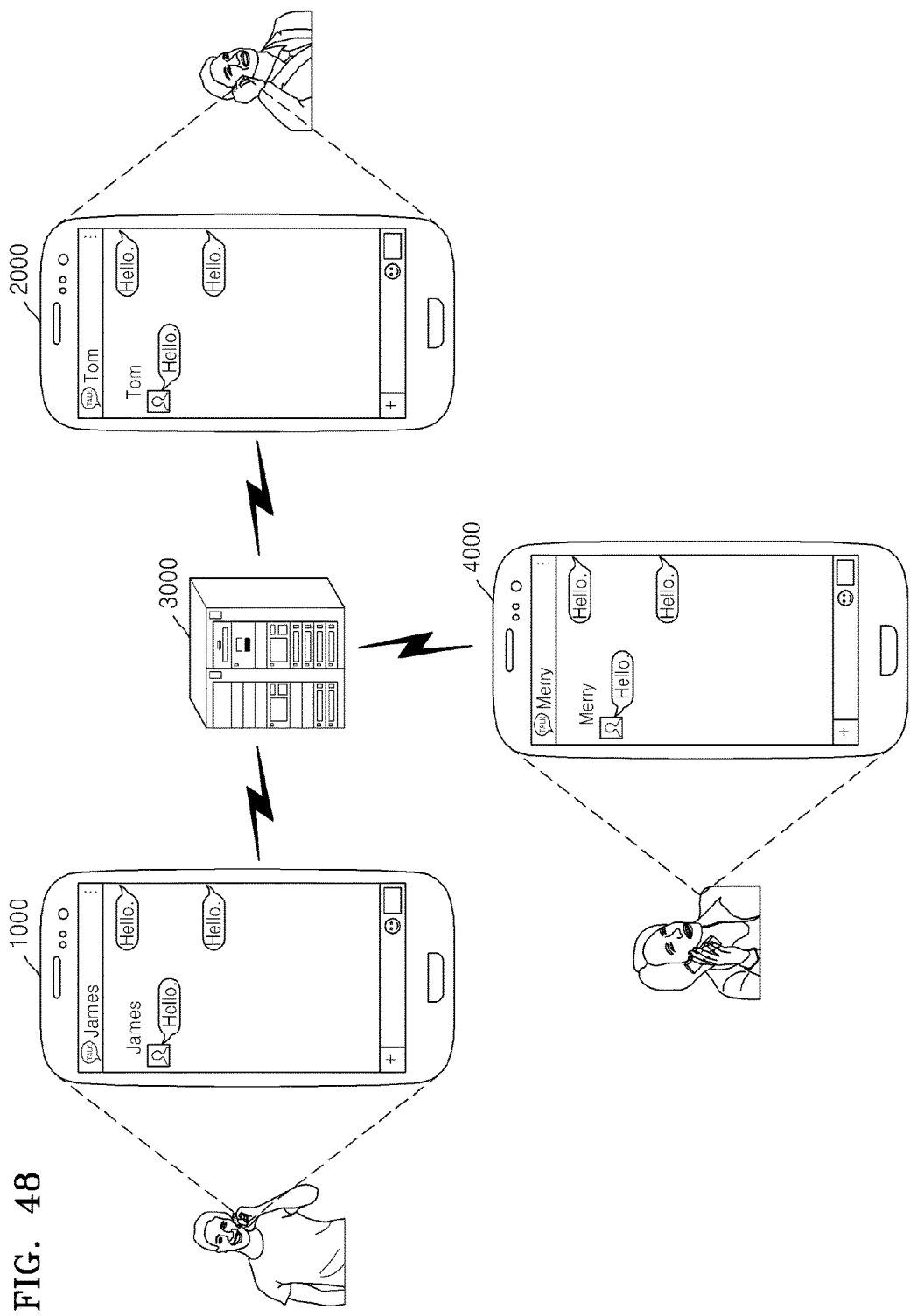
FIG. 48 illustrates an example where the first device, the second device, and the third device perform a voice-message call with each other via the server, according to an exemplary embodiment.

FIG. 48 illustrates an example where the first device 1000, the second device 2000, and the third device 4000 perform a voice-message call with each other via the server 3000, according to an exemplary embodiment.

Referring to FIG. 48, when the first device 1000, the second device 2000, and the third device 4000 perform the voice-message call with each other via the server 3000, a voice that is input to the first device 1000, a voice that is input to the second device 2000, and a voice that is input to the third device 4000 may be completely or partly converted into texts by the server 3000. Also, a text that is input to the first device 1000, a text that is input to the second device 2000, and a text that is input to the third device 4000 may be completely or partly converted into voices by the server 3000.

Also, when the first device 1000, the second device 2000, and the third device 4000 perform the voice-message call with each other via the server 3000, i) one or more operations between the first device 1000, the second device 2000, and the server 3000 to perform the voice-message call, ii) one or more operations between the first device 1000, the third device 4000, and the server 3000 to perform the voice-message call, and iii) one or more operations between the second device 2000, the third device 4000, and the server 3000 to perform the voice-message call may correspond to the operations that are illustrated and described with reference to FIGS. 43 through 46.

Figure 49:
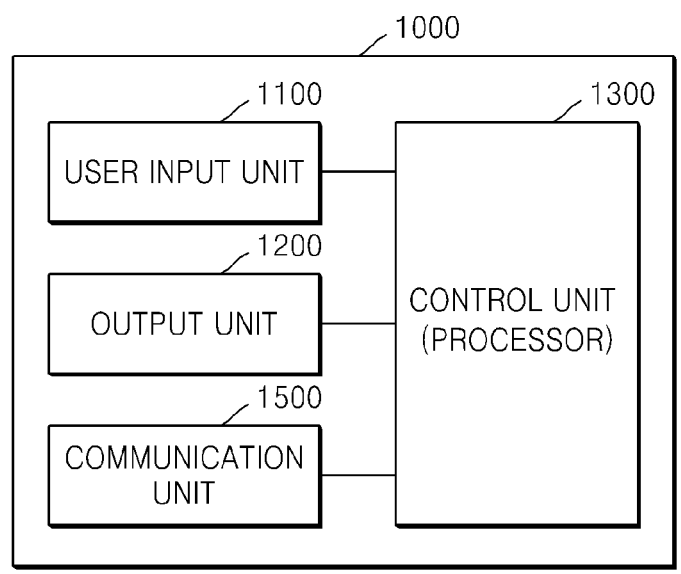
FIGS. 49 and 50 are block diagrams of the first device, according to exemplary embodiments.
Figure 50:
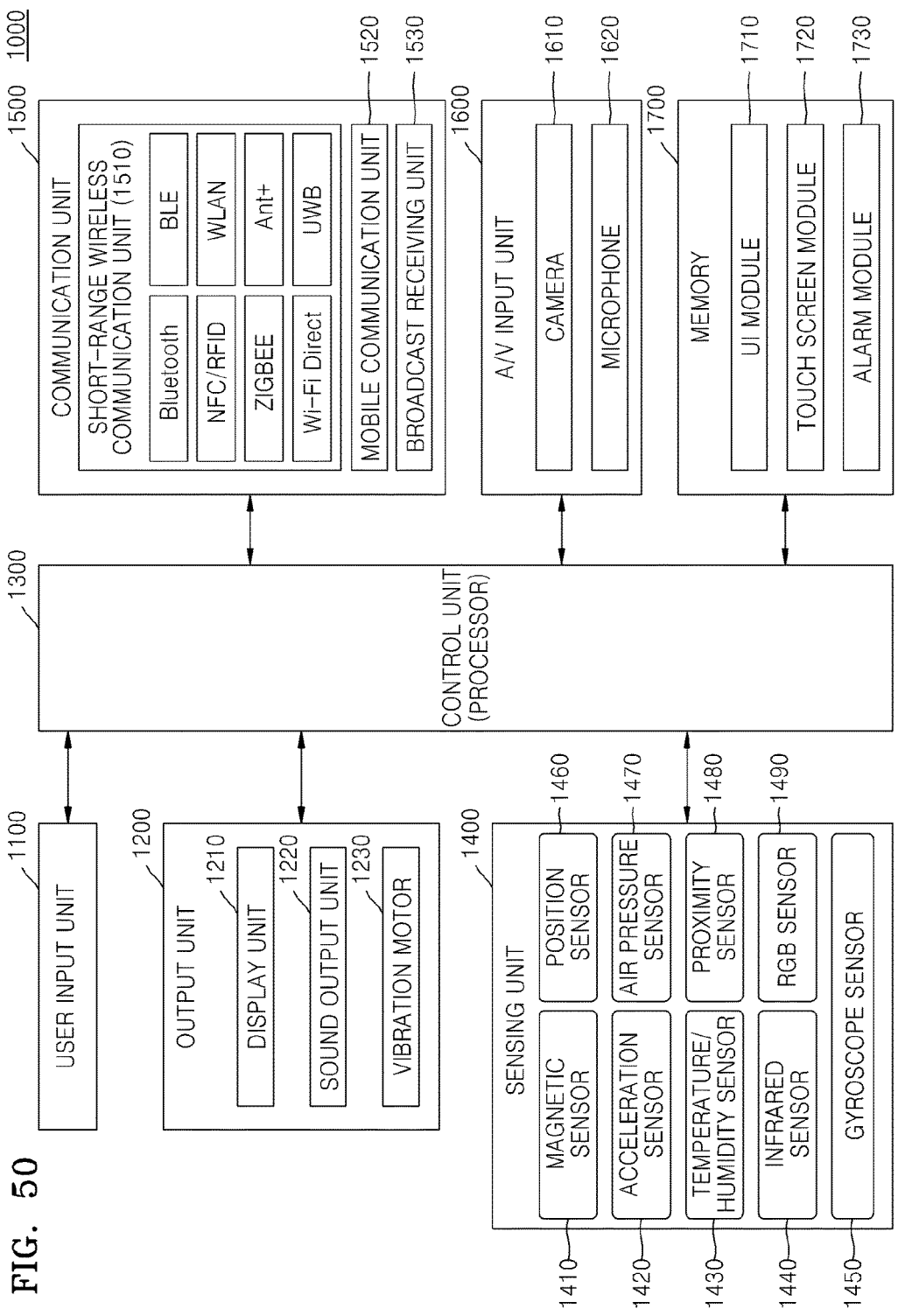

FIGS. 49 and 50 are block diagrams of the first device 1000, according to embodiments of the present invention.

As illustrated in FIG. 49, the first device 1000 may include a user input unit 1100, an output unit 1200, a control unit 1300, and a communication unit 1500. However, the first device 1000 may be embodied with more or less elements than the elements shown in FIG. 49.

For example, as illustrated in FIG. 50, the first device 1000 may further include a sensing unit 1400, an audio/video (A/V) input unit 1600, and a memory 1700 in addition to the user input unit 1100, the output unit 1200, the control unit 1300, and the communication unit 1500.

The user input unit 1100 may be a unit by which a user inputs data to control the first device 1000. For example, the user input unit 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, and a jog switch, but one or more exemplary embodiments are not limited thereto.

The user input unit 1100 may receive a user input for a voice-message call. For example, the user input unit 1100 may receive a user's voice input, a user's text input, and a user's touch input.

The output unit 1200 may function to output an audio signal, a video signal, or a vibration signal and may include a display unit 1210, a sound output unit 1220, a vibration motor 1230, or the like.

The display unit 1210 may display and output information that is processed in the first device 1000. For example, the display unit 1210 may display a chat window that includes a text indicating a conversation between users during the voice-message call.

When the display unit 1210 and a touch pad form a mutual layer structure and then are formed as a touch screen, the display unit 1210 may be used as both an output device and input device. The display unit 1210 may include at least one of a liquid crystal display (LCD), a thin film transistor-liquid crystal display (TFT-LCD), an organic light-emitting diode display, a flexible display, a three-dimensional (3D) display, and an electrophoretic display. Also, according to a type of the first device 1000, the first device 1000 may include at least two display units 1210. Here, the at least two display units 1210 may face each other by using a hinge.

The sound output unit 1220 may output audio data that is received from the communication unit 1500 or is stored in the memory 1700. Also, the sound output unit 1220 outputs a sound signal (e.g., a call signal receiving sound, a message receiving sound, an alarm sound, or the like) related to capabilities performed by the first device 1000. The sound output unit 1220 may include a speaker, a buzzer, or the like.

The vibration motor 1230 may output a vibration signal. For example, the vibration motor 1230 may output the vibration signal that corresponds to an output of the audio data (e.g., the call signal receiving sound, the message receiving sound, or the like) or video data. Also, when a touch is input via a touch screen, the vibration motor 1230 may output a vibration signal.

The control unit 1300 may generally control all operations of the first device 1000. For example, the control unit 1300 may control the user input unit 1100, the output unit 1200, the sensing unit 1400, the communication unit 1500, the A/V input unit 1600, etc. by executing programs stored in the memory 1700. The control unit 1300 may generally control the user input unit 1100, the output unit 1200, the sensing unit 1400, the communication unit 1500, the A/V input unit 1600, etc. to perform operations of the first device 1000 in FIGS. 1 through 49.

In more detail, the control unit 1300 may activate a voice-message call function. When the first device 1000 sends a call to the second device 2000, the control unit 1300 may activate the voice-message call function. Alternatively, when the first device 1000 receives a call from the second device 2000, the control unit 1300 may activate the voice-message call function. Alternatively, while the first device 1000 performs a call with the second device 2000, the control unit 1300 may activate the voice-message call function.

Also, when the voice-message call function is activated, the control unit 1300 may advise the second device 2000 that the voice-message call function is activated in the first device 1000. In this case, the control unit 1300 may advise the second device 2000 of a call mode of the voice-message call of the first device 1000.

The control unit 1300 may obtain texts that are converted from a voice of a user of the first device 1000 and a voice of a user of the second device 2000. The control unit 1300 may convert the voice of the user of the first device 1000 into a text and thus may obtain the converted text. Also, the control unit 1300 may receive the voice of the user of the second device 2000 from the second device 2000 via the communication unit 1500, may convert the voice into a text, and thus may obtain the converted text. However, a method of obtaining the converted text, the method performed by the first device 1000, is not limited thereto. The voice of the user of the first device 1000 and the voice of the user of the second device 2000 may be converted into texts by various devices or a server, and the first device 1000 may receive the converted texts from the various devices and the server via the communication unit 1500.

The control unit 1300 may obtain a text that is input by a user. The control unit 1300 may obtain a text that is input by the user of the first device 1000 during a voice-message call. Also, during the voice-message call, the control unit 1300 may receive, from the second device 2000, a text that is input to the second device 2000 by the user of the second device 2000.

The control unit 1300 may arrange the converted texts and the input texts in a temporal order and may display the converted texts and the input texts on a screen of the first device 1000 during a call between the users. The control unit 1300 may arrange the converted texts and the input texts in the temporal order, based on input times of the voices and the texts. For example, based on a time when the user of the first device 1000 inputs the voice into the first device 1000, a time when the user of the second device 2000 inputs the voice into the second device 2000, a time when the user of the first device 1000 inputs the text into the first device 1000, and a time when the user of the second device 2000 inputs the text into the second device 2000, the control unit 1300 may arrange the converted texts and the input texts.

The control unit 1300 may back up original voice data of the converted texts in the memory 1700 or the server 3000. The control unit 1300 may back up voice data of the first user that corresponds to the text that is converted from the voice of the first user. Also, the control unit 1300 may back up voice data of the second user that corresponds to the text that is converted from the voice of the second user.

The control unit 1300 may display a chat window on the screen of the first device 1000 during a call between the first user and the second user. The control unit 1300 may display the chat window on the screen of the first device 1000 to show contents of a conversation between the first user and the second user.

The control unit 1300 may obtain a text that is input by the first user via the chat window. Also, the control unit 1300 may receive, from the second device 2000, a text that the second user inputs to the second device 2000 during the voice-message call.

The control unit 1300 may arrange the converted texts and the input texts in a temporal order and may display the converted texts in the chat window. The control unit 1300 may arrange the converted texts and the input texts in the temporal order, based on input times of the voices and the texts. For example, the control unit 1300 may arrange the converted texts and the input texts, based on a time when the first user inputs the voice into the first device 1000, a time when the second user inputs the voice into the second device 2000, a time when the first user inputs the text into the first device 1000, and a time when the second user inputs the text into the second device 2000.

The control unit 1300 may distinguish between the converted texts and the input texts and may display them. The control unit 1300 may distinguish the text converted from the voice of the first user and the text converted from the voice of the second user from the text input by the first user and the text input by the second user, and may display them.

In order to distinctively display the converted texts, the control unit 1300 may display a separate icon around the converted texts. Alternatively, the control unit 1300 may distinctively display a color, a thickness, or a font of the converted texts. However, one or more exemplary embodiments are not limited thereto.

When at least one converted text among the converted texts is selected, the control unit 1300 may output original voice data of the selected converted text. When the converted text is selected in the chat window by the first user, the control unit 1300 may extract the original voice data of the selected converted text from a memory, and may output the extracted original voice data via a speaker in the first device 1000.

The control unit 1300 may back up a text among the arranged texts, wherein the text is obtained for a preset time period before a predetermined event occurs. For example, the predetermined event may include an end of a call between the first device 1000 and the second device 2000, reception of a user input for a text backup, or the like. For one example, when the call between the first device 1000 and the second device 2000 ends, the first device 1000 may back up a text that is obtained by the first device 1000 for five minutes before the call ends. For another example, when the first device 1000 receives the user input for the text backup, the control unit 1300 may back up a text that is obtained by the first device 1000 for three minutes before the user input is received. However, a type of the event and a time value that are set for the text backup are not limited thereto.

The control unit 1300 may back up all of the arranged texts in the server 3000. In this case, the control unit 1300 may back up some of the arranged texts in the first device 1000 and may back up all of the arranged texts in the server 3000. Alternatively, the first device 1000 may back up some of the arranged texts and all of the arranged texts in the server 3000.

The control unit 1300 may analyze a conversation between the users by performing various natural language-based analyzing methods on all of the arranged texts, and may extract a part from the arranged texts which indicates important contents of the conversation between the users. Also, the control unit 1300 may back up a text indicating the extracted part of the conversation in the first device 1000.

The control unit 1300 may activate a voice-message call function and may determine a chat application to be used during a voice-message call. For one example, the control unit 1300 may determine a chat application that is executable by interoperating with the voice-message call function of the first device 1000, as the chat application to be used during the voice-message call. For another example, the control unit 1300 may determine a chat application that is installed in all of the first device 1000 and the second device 2000, as the chat application to be used during the voice-message call. However, one or more exemplary embodiments are not limited thereto.

The control unit 1300 may execute the determined chat application, and may input a text, which is converted from a voice, into the executed chat application. For example, the control unit 1300 may install a plug-in for a text automatic input in the executed chat application, and may input the text converted from the voice into the chat application via the installed plug-in. However, one or more exemplary embodiments are not limited thereto.

The control unit 1300 may display a chat window on the screen of the first device 1000 during a call between users. The control unit 1300 may arrange, in the chat window, a text that is converted from a voice of the first user, a text that is input to the first device 1000 by the first user, a text that is converted from a voice of the second user, and a text that is input to the second device 2000 by the second user.

Also, the control unit 1300 may display the chat window on the screen of the first device 1000 or may hide the chat window in the screen of the first device 1000, depending on a call mode of the voice-message call of the first device 1000.

The control unit 1300 may initiate a voice-message call while the first device 1000 and the second device 2000 use a chat service.

The control unit 1300 may recognize that a call mode of the first device 1000 is changed during the voice-message call. The call mode may include a voice mode, a text mode, and a combination mode. When the call mode is changed, the control unit 1300 may activate or inactivate at least one of the speaker and a microphone of the first device 1000. Also, when the call mode is changed, the control unit 1300 may display or hide the chat window used in the voice-message call on the screen of the first device 1000. Also, the control unit 1300 may selectively provide a voice or a text of a user to the second device 2000, depending on a call mode of the second device 2000.

The control unit 1300 may advise the first user of a change in the call mode of the second device 2000, and may recommend the first user to change the call mode of the first device 1000. Also, the control unit 1300 may advise the first user of a change in input/output functions of the second device 2000 during a combination mode, and may recommend the first user to change the call mode of the first device 1000.

The control unit 1300 may back up a part or all of text information about a text in the chat window in the first device 1000 or the server 3000. The control unit 1300 may associate the text information in the chat window with a call list and may store the call list.

The sensing unit 1400 may sense the status of the first device 1000 or a status of surroundings around the first device 1000, and may deliver information about the sensed statuses to the control unit 1300.

The sensing unit 1400 may include at least one of a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480, and an RGB sensor (i.e., a luminance sensor) 1490, but one or more embodiments of the present invention are not limited thereto. Functions of the sensors may be intuitionally deduced by one of ordinary skill in the art by referring to names of the sensors, thus, detailed descriptions thereof are omitted here.

The communication unit 1500 may include one or more elements allowing the first device 1000 to perform communication at least one of the second device 2000, the third device 4000, and the server 3000. For example, the communication unit 1500 may include a short-range communication unit 1510, a mobile communication unit 1520, and a broadcast receiving unit 1530.

The short-range communication unit 1510 may include, but is not limited thereto, a Bluetooth communication unit, a BLE communication unit, an NFC/RFID unit, a Wi-Fi communication unit, a ZigBee communication unit, an IrDA communication unit, a WFD communication unit, a UWB communication unit, an Ant+ communication unit, or the like.

The mobile communication unit 1520 transmits and receives a wireless signal with at least one of a base station, an external terminal, and a server on a mobile communication network. The wireless signal may include various types of data according to communication of a sound call signal, a video call signal, or a text/multimedia message.

The broadcast receiving unit 1530 receives a broadcast signal and/or information related to broadcast from the outside through a broadcast channel. The broadcast channel may include a satellite channel and a ground wave channel. According to an embodiment, the first device 1000 may not include the broadcast receiving unit 1530.

The communication unit 1500 may allow the first device 1000 to exchange information for a voice-message call with at least one of the second device 2000, the third device 4000, and the server 3000.

The A/V input unit 1600 may receive an input of an audio signal or a video signal and may include a camera 1610 and a microphone 1620. The camera 1610 may obtain an image frame such as a still image or a moving picture via an image sensor during a video call mode or an image-capturing mode. An image that is captured via the image sensor may be processed by the control unit 1300 or a separate image processing unit (not shown).

The image frame that is processed by the camera 1610 may be stored in the memory 1700 or may be transmitted to an external source via the communication unit 1500. According to configuration of the first device 1000, two or more cameras 1610 may be arranged.

The microphone 1620 receives an external sound signal as an input and processes the received sound signal into electrical voice data. For example, the microphone 1620 may receive a sound signal from an external device or a speaker. In order to remove noise that occurs while the sound signal is externally input, the microphone 1620 may use various noise removing algorithms.

The memory 1700 may store a program for processing and controlling the control unit 1300, or may store a plurality of pieces of data that are input to the first device 1000 or output from the first device 1000.

The memory 1700 may include a storage medium of at least one type of a flash memory, a hard disk, a multimedia card type memory, a card type memory such as an SD or XD card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The programs stored in the memory 1700 may be classified into a plurality of modules according to their functions, for example, into a user interface (UI) module 1710, a touch screen module 1720, an alarm module 1730, etc.

The UI module 1710 may provide a specialized UI or a graphical user interface (GUI) in connection with the first device 1000 for each application. The touch screen module 1720 may detect a user's touch gesture on a touch screen and transmit information related to the touch gesture to the control unit 1300. The touch screen module 1720 may recognize and analyze a touch code. The touch screen module 1720 may be configured by additional hardware including a controller.

Various sensors may be arranged in or near the touch screen to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or that exists nearby, by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture (i.e., an input) of the user may include a tap gesture, a touch & hold gesture, a double tap gesture, a drag gesture, a panning gesture, a flick gesture, a drag & drop gesture, a swipe gesture, or the like.

The alarm module 1730 may generate a signal for alarming occurrence of an event. Examples of the event that occurs in the first device 1000 may include a call signal reception, a message reception, a key signal input, schedule notification, or the like. The alarm module 1730 may output a video-format alarm signal via the display unit 1210, may output an audio-format alarm signal via the sound output unit 1220, or a vibration signal via the vibration motor 1230.

Figure 51:
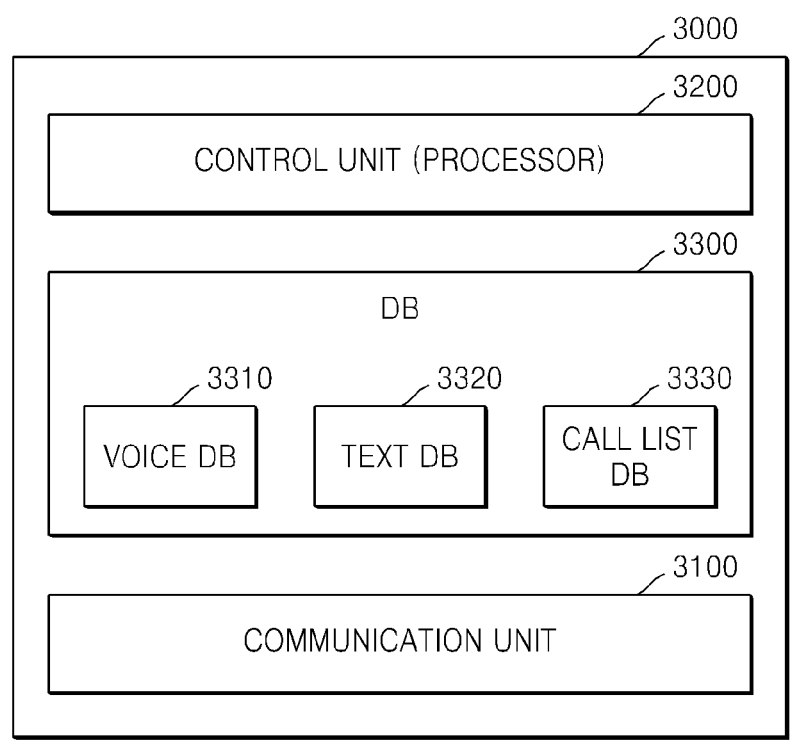
FIG. 51 is a block diagram of the server, according to an exemplary embodiment.

FIG. 51 is a block diagram of the server 3000, according to an exemplary embodiment.

Referring to FIG. 51, the server 3000 may include a communication unit 3100, a control unit 3200, and a database (DB) 3300. The DB 3300 may include a voice DB 3310, a text DB 3320, and a call list DB 3330.

The communication unit 3100 may transmit data that is required to perform a voice-message call between at least two of the first device 1000, the second device 2000, and the third device 4000, to at least two of the first device 1000, the second device 2000, and the third device 4000.

The control unit 3200 may generally control all operations of the server 3000. For example, the control unit 3200 may control all operations of the server 3000, by executing programs stored in the DB 3300.

In more detail, the control unit 3200 may convert at least one of a text of a first user that is received from the first device 1000 and a text of a second user that is received from the second device 2000 into a voice. The control unit 3200 may determine a tone of a voice that is converted from the text of the first user, in consideration of user information (e.g., a gender and an age) about the first user. Also, the control unit 3200 may determine a tone of a voice that is converted from the text of the second user, in consideration of user information (e.g., a gender and an age) about the second user.

Also, the control unit 3200 may transmit the voice that is converted from the text of the first user to at least one of the first device 1000 and the second device 2000 via the communication unit 3100. Also, the control unit 3200 may transmit the voice that is converted from the text of the second user to at least one of the first device 1000 and the second device 2000 via the communication unit 3100.

Also, the control unit 3200 may receive a text that is input by the first user from the first device 1000 via the communication unit 3100, and may transmit the received text to the second device 2000. Also, the control unit 3200 may receive a text that is input by the second user from the second device 2000 via the communication unit 3100, and may transmit the received text to the first device 1000.

The control unit 3200 may convert at least one of a voice of the first user that is received from the first device 1000 and a voice of the second user that is received from the second device 2000 into a text.

The control unit 3200 may transmit a text that is converted from the voice of the first user to at least one of the first device 1000 and the second device 2000 via the communication unit 3100. Also, the control unit 3200 may transmit a text that is converted from the voice of the second user to at least one of the first device 1000 and the second device 2000 via the communication unit 3100.

The control unit 3200 may receive a voice that is input by the first user from the first device 1000 via the communication unit 3100, and may transmit the received voice to the second device 2000. Also, the control unit 3200 may receive a voice that is input by the second user from the second device 2000 via the communication unit 3100, and may transmit the received voice to the first device 1000.

The control unit 3200 may store a text indicating a conversation between users who perform a voice-message call. The control unit 3200 may store a part and/or all of the text indicating the conversation between users who perform the voice-message call. The control unit 3200 may obtain a text that is converted from a voice that the first user inputs to the first device 1000, a text that is converted from a voice that the second user inputs to the second device 2000, a text that the first user inputs to the first device 1000, and a text that the second user inputs to the second device 2000.

The control unit 3200 may obtain the text indicating the conversation between users from at least one of the first device 1000, the second device 2000, and the server 3000. Also, the control unit 3200 may store a part and/or all of the obtained text in the DB 3300.

The control unit 3200 may store voice data indicating a conversation between users who perform a voice-message call. The control unit 3200 may store a part and/or all of the voice data indicating the conversation between users who perform the voice-message call. The control unit 3200 may obtain voice data that is converted from a text that the first user inputs to the first device 1000, voice data that is converted from a text that the second user inputs to the second device 2000, voice data that the first user inputs to the first device 1000, and voice data that the second user inputs to the second device 2000.

The control unit 3200 may obtain the voice data indicating the conversation between users from at least one of the first device 1000, the second device 2000, and the server 3000. Also, the control unit 3200 may store a part and/or all of the obtained voice data in the DB 3300.

The control unit 3200 may generate a call list in relation to a voice-message call between users. Also, the control unit 3200 may match the stored text and the stored voice data with the call list in relation to the voice-message call between users.

The DB 3300 may store data for a voice-message call between at least two of the first device 1000, the second device 2000, and the third device 4000.

The voice DB 3310 may store a plurality of pieces of voice data of the users. The voice DB 3310 may store voice data that is input by a user and voice data that is converted from a text that the user inputs. Also, the voice DB 3310 may store a plurality of pieces of attribute information about the plurality of pieces of voice data of the users. The attribute information about voice data may be used to distinguish between a voice that is input by the user and a voice that is converted from a text that is input by the user. However, one or more embodiments of the present invention are not limited thereto.

The text DB 3320 may store texts of the users. The text DB 3320 may store a text that is input by the user and a text that is converted from a voice input by the user. Also, the text DB 3320 may store a plurality of pieces of attribute information about the texts of the users. The attribute information about a text may be used to distinguish between a text that is input by the user and a text that is converted from a voice that is input by the user. However, one or more embodiments of the present invention are not limited thereto.

The call list DB 3330 may store the call list in relation to the voice-message call between users. The call list DB 3330 may also store various types of information about the call list DB 3330. Data stored in the call list DB 3330 may mutually match with data stored in the voice DB 3310 and data stored in the text DB 3320.

The exemplary embodiments may be embodied as computer readable code/instructions on a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium includes computer-readable commands, a data structure, a program module, other data as modulation-type data signals such as carrier signals, or other transmission mechanism, and includes other information transmission mediums.

Throughout the specification, a term "unit" indicates a hardware component such as a processor or a circuit, and/or a software component that is executed by a hardware component such as a processor.

It should be understood that the exemplary embodiments described herein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and then executed.

While the exemplary embodiments have been particularly shown and described, it will be understood by those of ordinary skill in the art that various changes in form and details may be made therein without departing from the spirit and scope of the present disclosure as defined by the following claims.

What is claimed is:

1. A system for providing a call between a first electronic device and a second electronic device, the system comprising:
 a server comprising:
  a memory storing first instructions, and
  a processor configured to execute the first instructions to at least:
   control to obtain voice data originating from the first electronic device during the call between the first electronic device and the second electronic device, and
   control to generate a first text to be sent to the second electronic device by converting the voice data into the first text; and
 the second electronic device comprising:
  a memory storing second instructions, and
  a processor configured to execute the second instructions to at least:
   control to execute an application to perform the call between the first electronic device and the second electronic device,
   control to obtain, via the application, a second text input by a user of the second electronic device during the call between the first electronic device and the second electronic device,
   control to obtain, via the application, the first text and the voice data during the call between the first electronic device and the second electronic device, and
   control to provide, via the application, the first text, the second text, and the voice data during the call between the first electronic device and the second electronic device.

2. The system of claim 1, wherein the processor of the server is further configured to control to store the first text.

3. The system of claim 2, wherein the processor of the server is further configured to control to store the voice data originating from the first electronic device.

4. The system of claim 1, wherein the first text and the second text are arranged on the screen in a temporal order.

5. The system of claim 4, wherein the first text and the second text are arranged on the screen in the temporal order in a chat window.

6. A method of providing a call between a first electronic device and a second electronic device, the method comprising:

obtaining, by a server, voice data of the call originating from the first electronic device during the call between the first electronic device and the second electronic device;

generating, by the server, a first text to be sent to the second electronic device by converting the voice data into the first text;

sending, by the server, the first text to the second electronic device;

executing, by the second electronic device, an application to perform the call between the first electronic device and the second electronic device;

obtaining, via the application by the second electronic device, a second text input by a user of the second electronic device during the call between the first electronic device and the second electronic device;

obtaining, via the application by the second electronic device, the first text from the server during the call between the first electronic device and the second electronic device; and providing, via the application by the second electronic device, the first text, the second text, and the voice data during the call between the first electronic device and the second electronic device.

7. The method of claim 6, further comprising:
storing, by the server, the first text.

8. The method of claim 6, further comprising:
storing, by the server, the voice data originating from the first electronic device.

9. The method of claim 6, wherein the providing comprises providing the first text and the second text arranged on the screen in a temporal order.

10. The method of claim 9, wherein the first text and the second text are arranged on the screen in the temporal order in a chat window.

11. A server for providing a text converted from voice data towards both a first electronic device and a second electronic device during a call between the first electronic device and the second electronic device, the server comprising:
one or more memories storing instructions, and
one or more processors configured to execute the instructions to, during the call between the first electronic device and the second electronic device, at least:
control to obtain first voice data of the call originating from the first electronic device, wherein the first voice data of the call is to be sent towards the second electronic device,
control to obtain second voice date of the call originating from the second electronic device, wherein the second voice data of the call is to be sent towards the first electronic device,
control to generate a second text by converting the second voice data into the second text,
control to send the second text towards the first electronic device, and
control to send the second text towards the second electronic device,
wherein the first text, the second text, and the second voice data are provided, via an application, at the first electronic device while the first electronic device is performing the call with the second electronic device,
wherein the first text, the second text, and the first voice data are provided, via an application, at the second electronic device while the second electronic device is performing the call with the first electronic device.

12. The server of claim 11, wherein the one or more processors are configured to execute the instructions, during the call between the first electronic device and the second electronic device, further to control to store the first text and the second text.

13. The server of claim 11, wherein the one or more processors are configured to execute the instructions, during the call between the first electronic device and the second electronic device, further to control to store the first voice data originating from the first electronic device and the second voice data originating from the second electronic device.

14. A method of a server providing a text converted from voice data towards both a first electronic device and a second electronic device during a call between the first electronic device and the second electronic device, the method comprising:
obtaining first voice data of the call originating from the first electronic device during the call between the first electronic device and the second electronic device, wherein the first voice data of the call is to be sent towards the second electronic device;
generating a first text by converting the first voice data into the first text, during the call between the first electronic device and the second electronic device;
sending the first text to the second electronic device during the call between the first electronic device and the second electronic device such that the first text is displayed at the second electronic device;
sending the first text to the first electronic device during the call between the first electronic device and the second electronic device such that the first text is displayed at the first electronic device;
obtaining second voice data of the cell originating from the second electronic device during the call between the first electronic device and the second electronic device, wherein the second voice data of the call is to be sent towards the first electronic device:
generating a second text by converting the second voice data into the second text during the call between the first electronic device and the second electronic device;
sending the second text to the second electronic device during the call between the first electronic device and the second electronic device such that the second text is displayed at the second electronic device; and
sending the second text to the first electronic device during the call between the first electronic device and the second electronic device such that the second text is displayed at the first electronic device.

15. The method of claim 14, further comprising:
storing the first text and the second text during the call between the first electronic device and the second electronic device.

16. The method of claim 14, further comprising:
storing the first voice data originating from the first electronic device and the second voice data originating from the second electronic device during the call between the first electronic device and the second electronic device.

17. A server for providing a text converted from voice data towards both a first electronic device and a second electronic device during a call between the first electronic device and the second electronic device, the server comprising:
one or more memories storing instructions, and
one or more processors configured to execute the instructions to, during the call between the first electronic device and the second electronic device, at least:

control to obtain first voice data of the call originating from the first electronic device, wherein the first voice data of the call is to be sent towards the second electronic device, control to generate a first text by converting the first voice data into the first text, control to obtain a second text input by a user of the first electronic device, control to send the first text towards the second electronic device, control to send the first text towards the first electronic device, and control to send the second text towards the second electronic device, wherein the first text and the second text are provided in a temporal order, via an application, at the second electronic device while the second electronic device is performing the call with the first electronic device.

* * * * *

UNITED STATES PATENT AND TRADEMARK OFFICE
CERTIFICATE OF CORRECTION

PATENT NO.         : 9,906,641 B2                                    Page 1 of 1
APPLICATION NO.    : 14/721352
DATED              : February 27, 2018
INVENTOR(S)        : Hong-chul Kim, Seon-ae Kim and Hyun-jae Shin It is certified that error appears in the above-identified patent and that said Letters Patent is hereby corrected as shown below:

In the Claims

At Column 46, Line 28, after the phrase "control to obtain voice data" insert --of the call--
At Column 46, Line 56, after the phrase "server is" delete "further"
At Column 46, Line 56, after the phrase "configured to" insert --execute the first instructions further to--
At Column 46, Line 58, after the phrase "server is" delete "further"
At Column 46, Line 58, after the phrase "configured to" insert --execute the first instructions further to--
At Column 46, Line 61, after the phrase "second text are arranged on" delete "the" and insert --a--
At Column 47, Line 32, before the phrase "screen in a temporal order" delete "the" and insert --a--
At Column 47, Line 47, after the phrase "electronic device," insert
--control to generate a first text by converting the first voice data into the first text,
control to send the first text towards the second electronic device,
control to send the first text towards the first electronic device,--
At Column 47, Line 48, after the phrase "control to obtain second voice" delete "date" and insert --data--
At Column 48, Line 33, after the phrase "obtaining second voice data of the" delete "cell" and insert --call--
At Column 48, Line 37, after the phrase "towards the first electronic" delete "device:" and insert --device;--

Signed and Sealed this
Fourth Day of June, 2019

Andrei Iancu
*Director of the United States Patent and Trademark Office*